US012003940B2

(12) United States Patent
Pinkerton et al.

(10) Patent No.: US 12,003,940 B2
(45) Date of Patent: Jun. 4, 2024

(54) ELECTROACOUSTIC DRIVERS AND LOUDSPEAKERS CONTAINING SAME

(71) Applicant: Clean Energy Labs, LLC, Austin, TX (US)

(72) Inventors: Joseph F. Pinkerton, Austin, TX (US); David A. Badger, Lago Vista, TX (US); James A. Andrews, Austin, TX (US); William Martin Lackowski, Austin, TX (US); William Neil Everett, Cedar Park, TX (US)

(73) Assignee: Brane Audio, LLC, Austin, TX (US)

(*) Notice: Subject to any disclaimer, the term of this patent is extended or adjusted under 35 U.S.C. 154(b) by 0 days.

(21) Appl. No.: 18/112,034

(22) Filed: Feb. 21, 2023

(65) Prior Publication Data

US 2023/0217183 A1 Jul. 6, 2023

Related U.S. Application Data

(63) Continuation of application No. 17/794,567, filed as application No. PCT/US2020/051633 on Sep. 18, 2020.

(Continued)

(51) Int. Cl.

*H04R 1/02* (2006.01)
*H04R 1/28* (2006.01)

(Continued)

(52) U.S. Cl.

CPC ............... *H04R 9/06* (2013.01); *H04R 1/025* (2013.01); *H04R 1/2803* (2013.01); *H04R 3/00* (2013.01);

(Continued)

(58) Field of Classification Search

CPC . H04R 1/00; H04R 1/02; H04R 1/021; H04R 1/025; H04R 1/026; H04R 1/2803;

(Continued)

(56) References Cited

U.S. PATENT DOCUMENTS

| | | | | |
|---|---|---|---|---|
| 2,026,994 A | | 1/1936 | Messick | |
| 4,327,257 A | * | 4/1982 | Schwartz | H04R 9/045 181/171 |

(Continued)

FOREIGN PATENT DOCUMENTS

| | | | |
|---|---|---|---|
| EP | 508570 | A2 | 10/1992 |
| WO | 2019213422 | A1 | 11/2019 |

(Continued)

OTHER PUBLICATIONS

International Searching Authority, International Preliminary Report on Patentability for PCT/US2020/051633 dated Jul. 26, 2022; 12 pages.

(Continued)

*Primary Examiner* — Thang V Tran

(74) *Attorney, Agent, or Firm* — Dickinson Wright PLLC; Ross Spencer Garsson

(57) ABSTRACT

Electroacoustic drivers that can be utilized in loudspeaker systems that utilize drivers having a magnetic negative spring (MNS) (such as reluctance assist drivers (RAD) and permanent magnet crown (PMC) drivers). The electroacoustic drivers can be used at all audio frequencies, including subwoofer frequencies. The magnetic negative springs of the electroacoustic drivers can cancel, or partially cancel, the large pressure forces on a sound panel (of an audio speaker) so that substantial subwoofer notes can be efficiently and cost effectively produced in small/portable speakers. The electroacoustic drivers can include a stabilizing/centering (Continued)

mechanism to overcome the destabilizing forces of a MNS that are too large for a voice coil alone to produce.

20 Claims, 41 Drawing Sheets

Related U.S. Application Data

(60) Provisional application No. 63/048,393, filed on Jul. 6, 2020, provisional application No. 63/022,125, filed on May 8, 2020, provisional application No. 62/963,833, filed on Jan. 21, 2020.

(51) Int. Cl.

| | |
|---|---|
| ***H04R 3/00*** | (2006.01) |
| ***H04R 9/02*** | (2006.01) |
| ***H04R 9/04*** | (2006.01) |
| ***H04R 9/06*** | (2006.01) |
| ***H04R 11/02*** | (2006.01) |
| ***H04R 17/00*** | (2006.01) |
| ***H04R 29/00*** | (2006.01) |

(52) U.S. Cl.
CPC ............ *H04R 9/025* (2013.01); *H04R 9/041* (2013.01); *H04R 9/046* (2013.01); *H04R 11/02* (2013.01); *H04R 17/00* (2013.01); *H04R 29/001* (2013.01); *H04R 29/003* (2013.01); *H04R 2400/07* (2013.01)

(58) Field of Classification Search
CPC . H04R 3/00; H04R 9/02; H04R 9/025; H04R 9/04; H04R 9/041; H04R 9/046; H04R 9/06; H04R 9/063; H04R 11/02; H04R 17/00; H04R 19/02; H04R 29/001; H04R 29/003; H04R 2400/07
See application file for complete search history.

(56) References Cited

U.S. PATENT DOCUMENTS

| | | | | |
|---|---|---|---|---|
| 6,542,617 | B1 * | 4/2003 | Fujihira | H04R 9/04 381/407 |
| 7,551,749 | B2 * | 6/2009 | Rosen | B60R 13/02 381/186 |
| 9,826,313 | B2 | 11/2017 | Pinkerton et al. | |
| 11,800,290 | B2 * | 10/2023 | Landick | G06F 1/163 |
| 2004/0131223 | A1 * | 7/2004 | Stiles | H04R 9/063 381/412 |
| 2004/0156527 | A1 * | 8/2004 | Stiles | H04R 9/063 381/412 |
| 2005/0025317 | A1 | 2/2005 | Fedigan | |
| 2005/0190946 | A1 * | 9/2005 | Stiles | H04R 9/025 381/421 |
| 2009/0141926 | A1 * | 6/2009 | Clair | H04R 1/403 381/404 |
| 2010/0034418 | A1 | 2/2010 | Bonin | |
| 2019/0261092 | A1 * | 8/2019 | Landick | G06F 1/1688 |
| 2020/0112793 | A1 * | 4/2020 | Børresen | H01F 27/28 |
| 2021/0021935 | A1 * | 1/2021 | Yan | H04R 9/025 |
| 2023/0199401 | A1 | 6/2023 | Pinkerton et al. | |
| 2023/0199403 | A1 | 6/2023 | Pinkerton et al. | |
| 2023/0209274 | A1 | 6/2023 | Pinkerton et al. | |
| 2023/0217183 | A1 | 7/2023 | Pinkerton et al. | |
| 2023/0247364 | A1 | 8/2023 | Pinkerton et al. | |

FOREIGN PATENT DOCUMENTS

| | | | |
|---|---|---|---|
| WO | 2020086852 | A9 | 4/2020 |
| WO | 2021150278 | A1 | 7/2021 |

OTHER PUBLICATIONS

International Searching Authority, International Search Report and Written Opinion for PCT/US2020/051633 dated Jan. 12, 2021; 18 pages.

* cited by examiner

ELECTROACOUSTIC DRIVERS AND LOUDSPEAKERS CONTAINING SAME

This application is a continuation of U.S. patent application Ser. No. 17/794,567, filed Jul. 21, 2022, entitled "Electroacoustic Drivers And Loudspeakers Containing Same," which is the 35 U.S.C § 371 national application of PCT Application No. PCT/US20/51633, filed on Sep. 18, 2020, entitled "Electroacoustic Drivers And Loudspeakers Containing Same", which claims priority to U.S. Provisional Patent Appl. Ser. No. 62/963,833, filed Jan. 21, 2020, U.S. Provisional Patent Appl. Ser. No. 63/022,125, filed May 8, 2020, and U.S. Provisional Patent Appl. Ser. No. 63/048,393, filed Jul. 6, 2020 which are each entitled "Electroacoustic Drivers And Loudspeakers Containing Same." These patent applications are commonly owned by the owner of the present inventions. These patent applications are hereby incorporated by reference in their entirety for all purposes.

This application is related to U.S. Patent Appl. Ser. No. 63/034,556, filed Jun. 4, 2020, which is entitled "Voice Coil Actuator And Loudspeakers Containing Same."

This application is related to U.S. Patent Appl. Ser. No. 62/932,971 filed Nov. 8, 2019 (the "Pinkerton '971 patent application") and to U.S. Patent Appl. Ser. No. 62/962,770, filed Jan. 17, 2020 (the "Pinkerton '770 patent application"), each of which is entitled "Improved Electroacoustic Drivers And Loudspeakers Containing Same This application is also related to International Patent Application No. PCT/US19/30438, filed May 2, 2019, to Joseph F. Pinkerton et al., entitled "Loudspeaker System And Method Of Use Thereof," which claims priority to (a) U.S. Provisional Patent Application Ser. No. 62/666,002, filed on May 2, 2018, to Joseph F. Pinkerton et al., and entitled "Audio Speakers," and (b) U.S. Provisional Patent Application Ser. No. 62/805,210, filed on Feb. 13, 2019, to Joseph F. Pinkerton et al., and entitled "Loudspeaker System And Method Of Use Thereof."

This application is also related to U.S. Pat. No. 9,826,313, issued Nov. 21, 2017, to Joseph F. Pinkerton et al., and entitled "Compact Electroacoustic Transducer And Loudspeaker System And Method Of Use Thereof," which issued from U.S. patent application Ser. No. 14/717,715, filed May 20, 2015.

This application is also related to International Patent Application No. PCT/US19/057871, filed Oct. 24, 2019, to David A Badger et al., entitled "Stereophonic Loudspeaker System And Method Of Use Thereof," which claims priority to U.S. Provisional Patent Application Ser. No. 62/749,938, filed on Oct. 24, 2018, 2018, to David A. Badger et al., and entitled "Stereophonic Loudspeaker System And Method Of Use Thereof."

All of the above-identified patent applications are commonly assigned to the Assignee of the present invention and are hereby incorporated herein by reference in their entirety for all purposes.

TECHNICAL FIELD

The present invention relates to electroacoustic drivers and loudspeakers that have and use same, and in particular drivers having a magnetic negative spring (MNS) (such as reluctance assist drivers (RAD) and permanent magnet crown (PMC) drivers) and loudspeakers that have and use same.

BACKGROUND

FIG. 1 is a prior art audio force transducer 100 that includes a fixed magnetic flux path 101 (soft iron) having permanent magnets 102 and a sliding coil holder 103 having electric coil 104. The permanent magnets 102 are separated from the electric coil 104 with an air gap 105. The magnetic forces will cause the coil holder 103 to slide inward and outward in the z-axis direction (as shown in FIG. 1), which moves the panels of the loudspeakers (not shown) to produce the auditory sound.

Such prior art audio force transducers, as shown in FIG. 1, are unable to create substantial subwoofer notes in small/portable speakers because they cannot produce the required forces without being heavy, expensive, and high power. Due to the size of small/portable speakers, the amount of pressure forces necessary to move the sound panel (of an audio speaker) to produce low frequency sound is quite substantial; thus the corresponding power to produce such subwoofer notes is great. As the power for small/portable speakers is generally a small mobile power source (such as batteries), there are constraints to the amount of power one can use, which limits the production of such subwoofer sound. Otherwise the small mobile power source would be quickly discharged, necessitating either a significant increase in the size and amount of mobile power sources (i.e., a large increase in the batteries utilized), which would dramatically increase the size and weight of the device and/or connection of the speaker to a non-mobile power source (such as being plugged in). All this additional weight and power consumption is generally undesirable for small/portable speakers and their use.

Accordingly, a need exists to cancel, or partially cancel, the large pressure forces on a sound panel (of an audio speaker) so that substantial subwoofer notes can be created in small/portable speakers.

SUMMARY OF THE INVENTION

The present invention is directed to electroacoustic drivers and loudspeakers that have and use same, and in particular drivers having a magnetic negative spring (MNS) (such as reluctance assist drivers (RAD) and permanent magnet crown (PMC) drivers) and loudspeakers that have and use same.

In general, in one aspect, the invention features a loudspeaker that includes a sealed enclosure. The loudspeaker further includes a sound panel mechanically connected to the sealed enclosure. The loudspeaker further includes an actuator operable to convert electrical energy into mechanical energy. The actuator is mechanically connected to the sound panel. The loudspeaker further includes a magnetic negative spring (MNS) that is mechanically connected to the sound panel.

Implementations of the invention can include one or more of the following features:

The actuator can be a voice coil.

The voice coil and the MNS can share the same magnetic circuit.

The actuator can be an electromagnet.

The actuator can be a piezoelectric transducer.

The loudspeaker can further include a position sensor that senses the position of the sound panel.

The position sensor can be an infrared position sensor.

The position sensor can be a capacitive position sensor.

The position sensor can be an inductive position sensor.

The MNS can include at least one stationary magnet and a moveable armature.

The stationary magnet can be a permanent magnet.

The stationary magnet can be a ring-shaped permanent magnet.

The ring-shaped permanent magnet can be a radially polarized magnet.

The stationary magnet can include at least four ring-shaped permanent magnets.

The stationary magnet can include at least six ring-shaped permanent magnets.

The stationary magnet can be an electromagnet.

The stationary magnet can be an electromagnet combined with a permanent magnet.

The moveable armature can include a ferromagnetic element.

The ferromagnetic element can include at least one triangle-shaped steel element.

The ferromagnetic element can include a serrated steel ring.

The ferromagnetic element can include laminated steel.

The moveable armature can include an armature permanent magnet.

The polarity of the armature permanent magnet can be opposite the polarity of the stationary magnet when the armature is in a centered position.

The polarity of the armature permanent magnet can be opposite the polarity of the stationary magnet for most positions of the armature.

The armature permanent magnet can be triangle shaped.

The armature permanent magnet can include an array of triangle-shaped elements.

The armature permanent magnet can be diamond-shaped.

The armature permanent magnet can include an array of diamond-shaped elements.

The moveable armature can include a voice coil.

The moveable armature can include a ferromagnetic element and a voice coil.

The moveable armature can include an armature permanent magnet and a voice coil.

The armature permanent magnet can be triangle-shaped.

The armature permanent magnet can be diamond-shaped.

The loudspeaker can further include an armature centering mechanism.

The centering mechanism can include a motor.

The centering mechanism can include a gear motor.

The centering mechanism can include an air pump.

The loudspeaker can further include a flexible mechanical armature support.

The flexible mechanical armature support can share the same axis as the armature.

The flexible mechanical armature support can have a different axis than the armature.

In general, in another aspect, the invention features an electroacoustic transducer that includes a sound panel. The electroacoustic transducer further includes an actuator operable to convert electrical energy into mechanical energy. The actuator is mechanically connected to the sound panel. The electroacoustic transducer further includes a magnetic negative spring (MNS) that is mechanically connected to the sound panel.

Implementations of the invention can include one or more of the following features:

The actuator can be a voice coil.

The voice coil and the MNS can share the same magnetic circuit.

The actuator can be an electromagnet.

The actuator can be a piezoelectric transducer.

The electroacoustic transducer can further include a position sensor.

The position sensor can be an infrared position sensor.

The position sensor can be a capacitive position sensor.

The position sensor can be an inductive position sensor.

The MNS can include a stationary magnet and a moveable armature.

The stationary magnet can be a permanent magnet.

The stationary magnet can be a ring-shaped permanent magnet.

The ring-shaped permanent magnet can be a radially polarized magnet.

The stationary magnet can include at least four ring-shaped permanent magnets.

The stationary magnet can include at least six ring-shaped permanent magnets.

The stationary magnet can be an electromagnet.

The stationary magnet can be an electromagnet combined with a permanent magnet.

The moveable armature can include a ferromagnetic element.

The ferromagnetic element can include at least one triangle-shaped steel element.

The ferromagnetic element can include a serrated steel ring.

The ferromagnetic element can include laminated steel.

The moveable armature can include at least one armature permanent magnet.

The polarity of the armature permanent magnet can be opposite the polarity of the stationary magnet when the armature is in a centered position.

The polarity of the armature permanent magnet can be opposite the polarity of the stationary magnet for most positions of the armature.

The armature permanent magnet can be triangle-shaped.

The armature permanent magnet can include an array of triangle-shaped elements.

The armature permanent magnet can be diamond-shaped.

The armature permanent magnet can include an array of diamond-shaped elements.

The moveable armature can include a voice coil.

The moveable armature can include a ferromagnetic element and a voice coil.

The moveable armature can include an armature permanent magnet and a voice coil.

The armature permanent magnet can be triangle-shaped.

The armature permanent magnet can be diamond-shaped.

The electroacoustic transducer can further include an armature centering mechanism.

The centering mechanism can include a motor.

The centering mechanism can include a gear motor.

The centering mechanism can include an air pump.

The electroacoustic transducer can further include a flexible mechanical armature support.

The flexible mechanical armature support can share the same axis as the armature.

The flexible mechanical armature support can have a different axis than the armature.

In general, in another aspect, the invention features a system that includes a first electroacoustic transducer and a second electroacoustic transducer, as described above. The first electroacoustic transducer is positioned 180 degrees from the second electroacoustic transducer.

In general, in another aspect, the invention features an electroacoustic transducer that includes a sound panel. The electroacoustic transducer further includes an actuator operable to convert electrical energy into mechanical energy. The actuator is mechanically connected to the sound panel. The electroacoustic transducer further includes a magnetic negative spring (MNS) that is mechanically connected to the sound panel. The electroacoustic transducer further includes a centering mechanism.

In general, in another aspect, the invention features an electroacoustic transducer that includes a sound panel. The electroacoustic transducer further includes an actuator operable to convert electrical energy into mechanical energy. The actuator is mechanically connected to the sound panel. The electroacoustic transducer further includes a magnetic negative spring (MNS) that is mechanically connected to the sound panel. The electroacoustic transducer further includes a position sensor.

In general, in another aspect, the invention features an electroacoustic transducer that includes a sound panel. The electroacoustic transducer further includes an actuator operable to convert electrical energy into mechanical energy. The actuator is mechanically connected to the sound panel. The electroacoustic transducer further includes a magnetic negative spring (MNS) that is mechanically connected to the sound panel. The electroacoustic transducer further includes a flexible mechanical armature support.

In general, in another aspect, the invention features a method of making an electroacoustic transducer. The method includes the step of mounting a sound panel to a sealed enclosure. The method further includes the step of mounting a magnetic negative spring (MNS) having an armature to the sound panel. The method further includes the step of mounting an actuator operable to convert electrical energy into mechanical energy to the sound panel such that mechanical force on the sound panel due to a change in pressure within the sealed enclosure is at least partially canceled by the magnetic force from the MNS.

Implementations of the invention can include one or more of the following features:

The electroacoustic transducer in the method is an electroacoustic transducer, as described above.

In general, in another aspect, the invention features a method of utilizing an electroacoustic transducer. The method includes the step of selecting an electroacoustic transducer, as described above. The electroacoustic transducer is within a sealed chamber. The method further includes the step of utilizing the electroacoustic transducer such that mechanical force resulting from a change in pressure within the sealed enclosure is at least partially canceled by the magnetic force from the magnetic negative spring of the electroacoustic transducer.

Implementations of the invention can include one or more of the following features:

The method can further include the step of monitoring electrical energy to automatically adjust the average position of the armature of the electroacoustic transducer to minimize the consumption of electrical energy of the actuator.

The actuator can be a voice coil.

In general, in another aspect, the invention features a magnetic negative spring (MNS) that includes a stationary magnetic circuit. The MNS further includes a moveable armature. The MNS further includes a position sensor. The MNS further includes a voice coil mounted to the moveable armature. The MNS further includes a permanent magnet mounted to the moveable armature.

DETAILED DESCRIPTION

The present invention is directed to electroacoustic drivers and loudspeakers that have and use same, and in particular drivers having a magnetic negative spring (MNS) (such as reluctance assist drivers (RAD) and permanent magnet crown (PMC) drivers) and loudspeakers that have and use same. It has been discovered that large pressure forces on a sound panel (of an audio speaker) can be cancelled, or partially cancelled, by using the magnetic negative spring as part of a reluctance assist driver or permanent magnet crown driver.

Reluctance Assist Driver (RAD)

Figure 1:
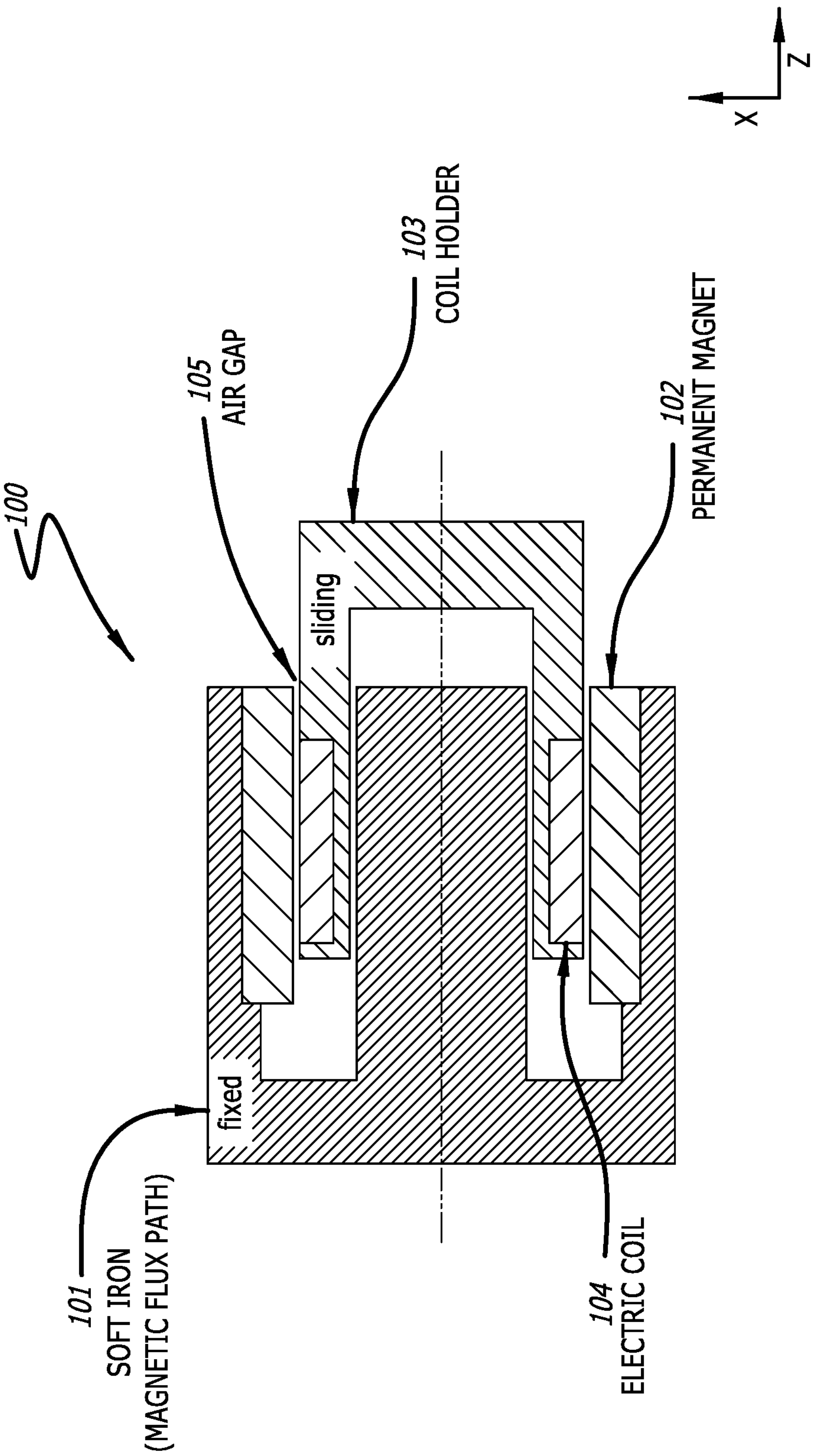
FIG. 1 (Prior Art)
FIG. 1 is a schematic of a cross-sectional view of a prior art audio force transducer.
Figure 2A:
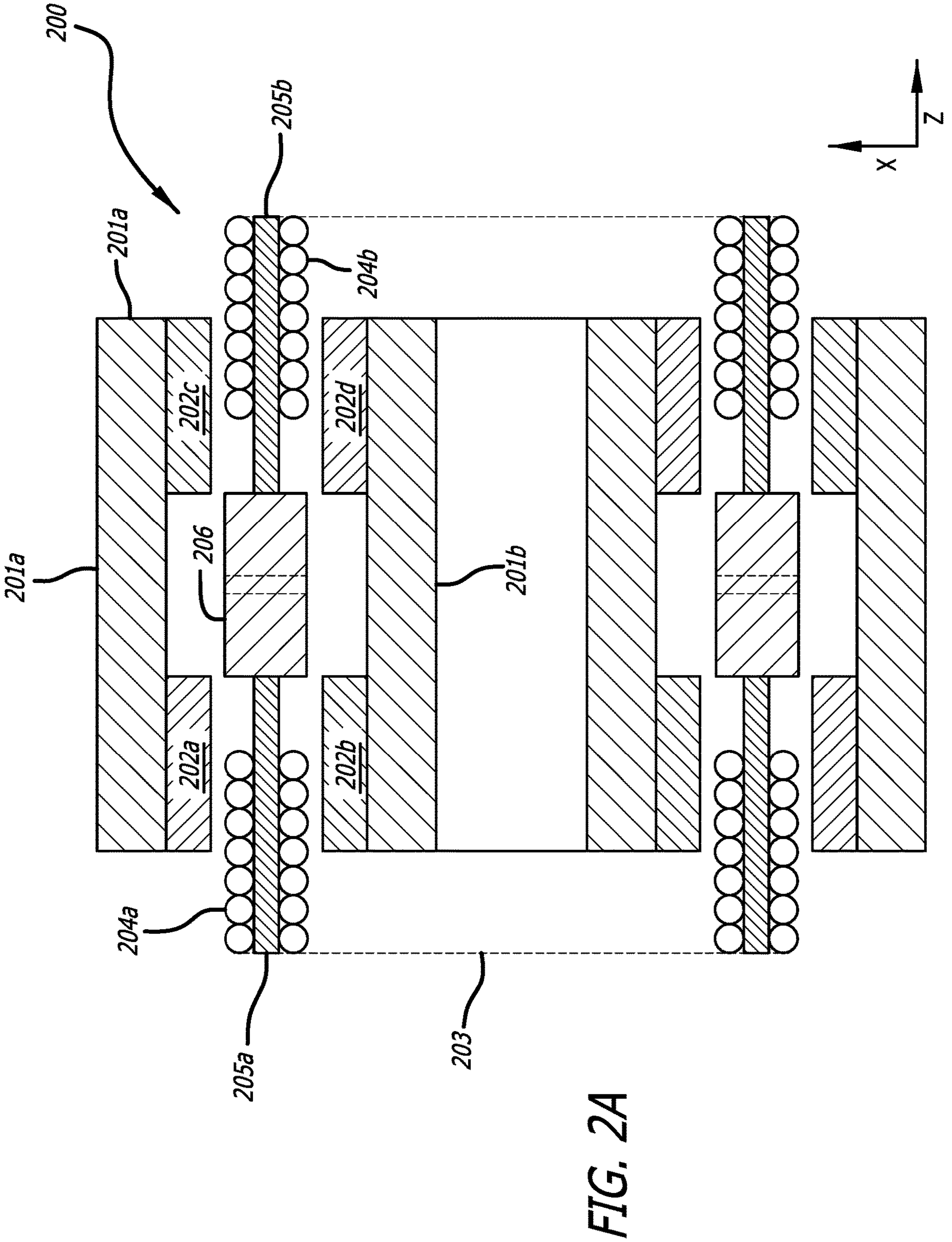
FIG. 2A is a schematic of a cross-sectional view of an electroacoustic driver utilizing a coil holder having a magnetic negative spring (MNS) that utilizes a high permeability serrated cylindrical shell.

FIG. 2A is a schematic of an electroacoustic driver 200 having a coil holder 203 having a magnetic negative spring moveable element 206 (a high permeability serrated cylindrical shell). As used herein, the term "reluctance assist driver" (or "RAD") refers to an electroacoustic driver that utilizes a magnetic negative spring in conjunction with one or more voice coil. The coil holder 203 is shown in more detail in FIGS. 2B-2C. Coil holder 203 is made of a non-magnetic/non-conductive material 205*a*-205*b* (such as fiberglass), which mechanically supports magnet wire coils 204*a*-204*b* (such as a copper magnet wire coils) and the magnetic negative spring moveable element 206. Magnetic negative spring moveable element 206 is a high permeability cylindrical shell (such as made of a magnetic steel) that has several triangle-shaped protrusions that are parallel with a centerline of electroacoustic driver 200.

While not shown in FIG. 2A, one side of the non-magnetic/non-conductive material 205*a*-205*b* is attached to a sound panel that, when moved, produces sound. In the orientation of FIG. 2A (shown by the x-z axis shown therein, with the y-direction perpendicular thereto), the sound panel moves outward and inward in the z-direction due to the sliding movement of the coil holder 203 relative to the elements 201*a*-201*b* (made of iron/steel), which have permanent magnet rings 202*a*-202*d*. Such movement occurs due to the magnetic fields generated thereby, such as known in the art and similar to that utilized in the audio force transducer 100.

When the sound panel is in its neutral/relaxed position, there are no forces acting on the sound panel. When a sound panel (that is connected to non-magnetic/non-conductive material 205*b*) moves in the positive z-direction, this creates a partial vacuum in the sealed chamber of the audio speaker (not shown). Under such circumstance an audio speaker having a prior art audio force transducer 100, the sound panel actuator (voice coil, electromagnet, etc.) must overcome this large force and burn a significant amount of electrical power to do so. However, in electroacoustic driver 200 (which is a reluctance assist driver as it utilizes a magnetic negative spring), this force can be partially or totally canceled with the variable reluctance force of the steel triangle members of the magnetic negative spring moving element 206 entering a radially directed magnetic field. This variable reluctance force is approximately proportional to the width of the triangle that is immersed in the magnetic field. Thus, this force increases as the steel triangle moves in the z-direction (just as the pressure force on the panel in the negative z-direction increases as the panel moves in the positive z-direction). When the panel pressure force is to the negative z-direction, the variable reluctance force is to the positive z-direction, and, thus, these forces can be made to cancel.

When the sound panel, coil holder 203, and magnetic negative spring moveable element 206 move in the negative z-direction, the panel pressure force will be towards the positive z-direction and the magnetic force will be to the negative z-direction, and, thus, these forces will likewise be partially or totally cancelled.

For the above, the magnetic negative spring operates based upon the interaction of magnetic negative spring moving element 206 with annular soft iron elements 201*a*-201*b* and permanent magnet rings 202*a*-202*d*. Since the structure of permanent magnet rings 202*a*-202*d*, annular soft iron elements 201*a*-201*b*, and the magnetic negative spring moveable element 206 consume approximately zero electrical power to cancel the large pressure forces, electroacoustic driver 200 will consume much less power (10 to 100 times less) to produce a given sound pressure level than prior art electroacoustic actuators.

Figure 2B:
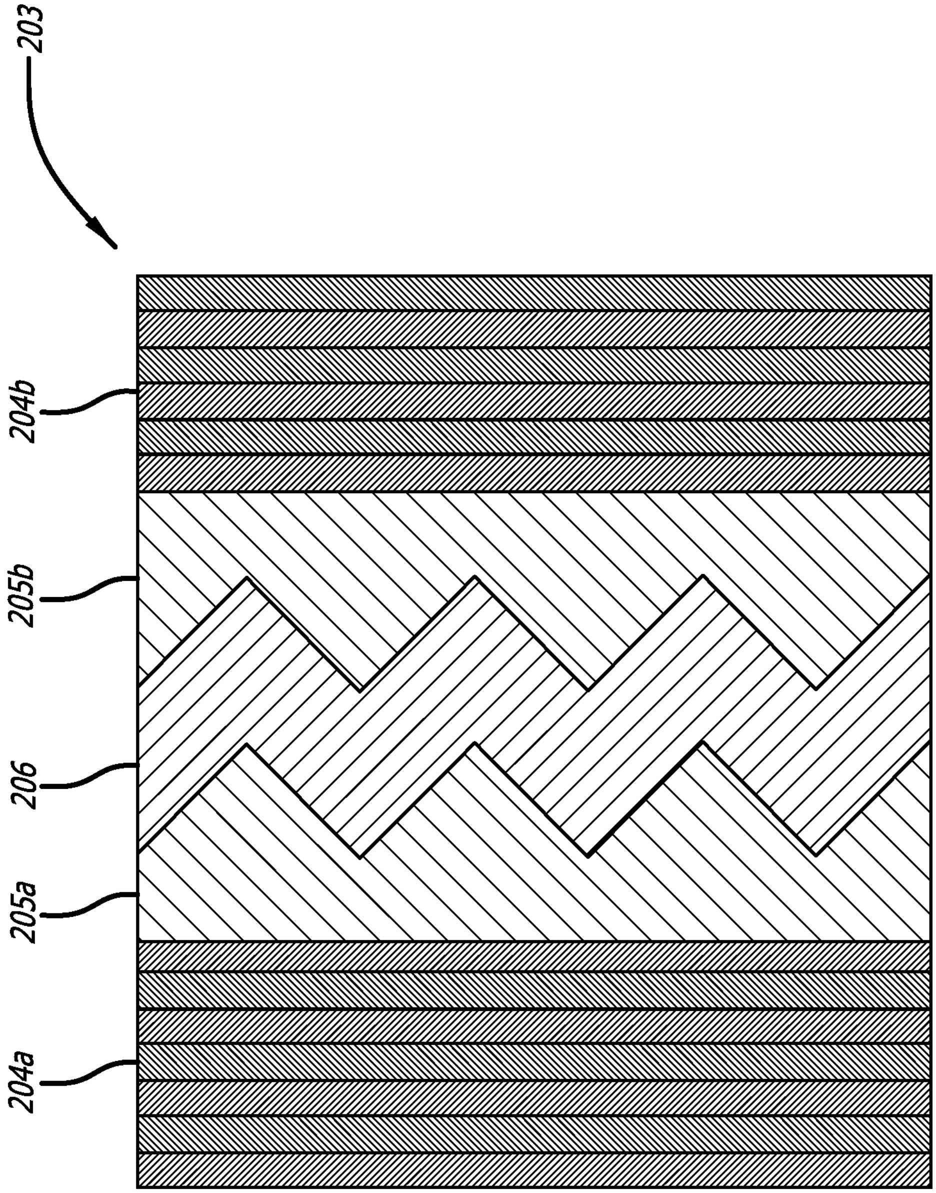
FIGS. 2B-2C are, respectively, a side view and a perspective view focusing in on the coil holder in FIG. 2A.
Figure 2C:
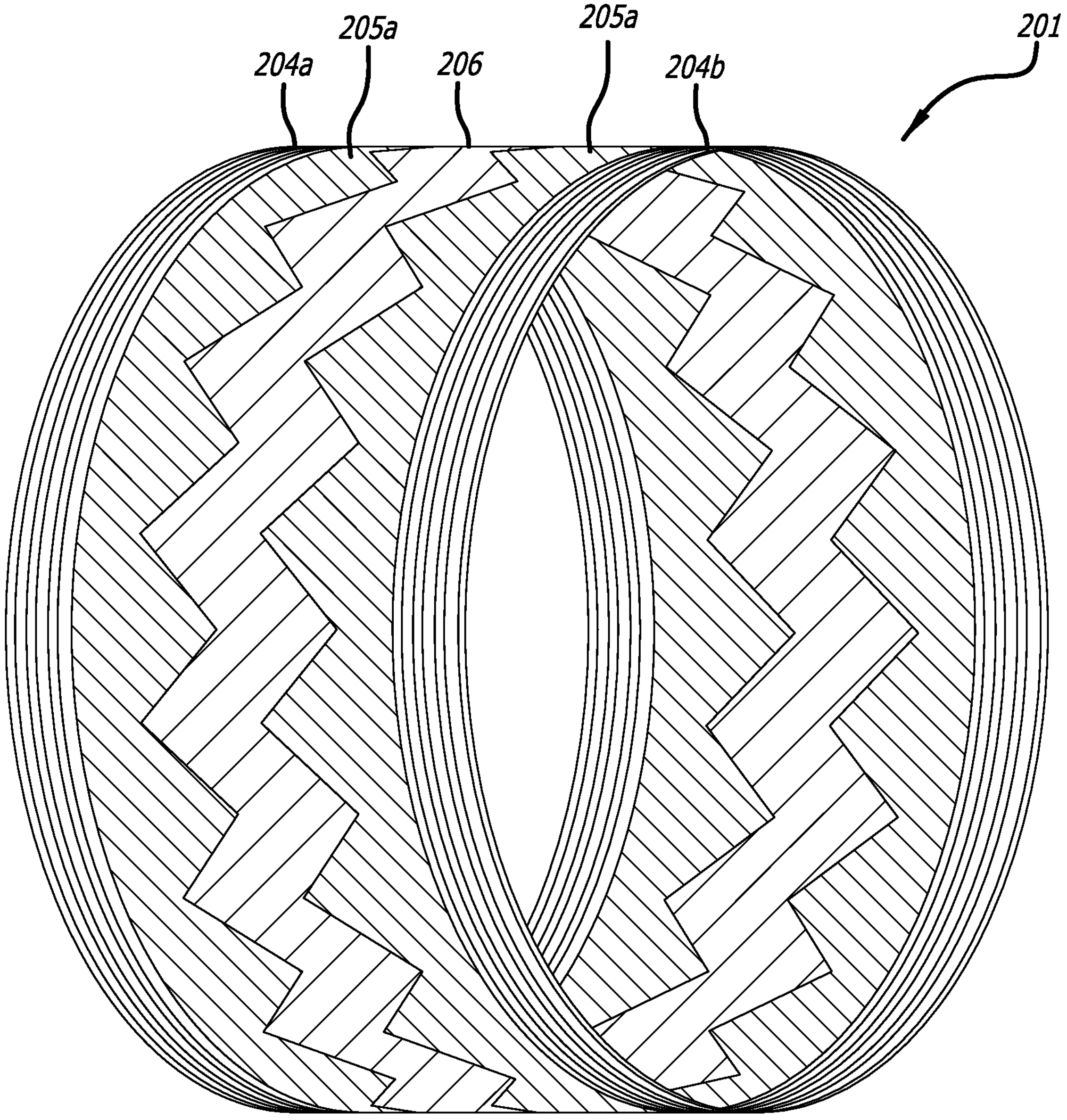

The active force actuator (generally voice coils) can also be much smaller (less expensive) because it needs to produce much lower forces. Although the magnetic negative spring moveable element 206 and magnet structure is shown in FIGS. 2A-2C as round, they could be flat/planer.

FIG. 2A shows a coil holder 203 with magnetic negative spring moveable element 206 and an integral voice coil (magnet wire coils 204*a*-204*b*) as the actuator used to drive a sound panel. In some embodiments, it may be advantageous to have the voice coil have its own magnetic circuit so that each magnetic circuit can be optimized. The magnetic negative spring moveable element 206 and voice coil (or other actuator like an electromagnet actuator) can (and generally should) be mounted on the same moveable structure that is connected to the sound panel.

No lever is needed in this system to amplify mechanical motion and the system can likely be operated without position sensor feedback (when a voice is used as an actuator). As can be seen in electroacoustic driver 200 of FIG. 2A, it is designed such that there is always the same amount of voice coil immersed in a magnetic field at any one time as the non-conductive cylindrical shell moves a measureable distance (which is the max amplitude of the motion) in the negative or positive z-direction. This design will assist in keeping the voice coil force approximately constant for a given current at all positions (which results in undistorted music since the voice coil force is always linear with the current).

In some embodiments, the variable reluctance force of the magnetic negative spring moveable element 206 (which is referred sometimes as the high permeability serrated cylindrical shell) interacting with the permanent magnets 202*a*-202*d* will almost cancel with the air pressure force (due to the motion of the sound panels changing the effective air volume of the sealed chamber) and mechanical spring force (due to the mechanical stiffness of the sound panel flexible support). If this net force (pressure plus spring minus magnetic forces) is linear with displacement in the z-direction, the system should be able to operate in an "open loop" way (no position sensors or active position feedback required).

Sharing a magnetic circuit (the voice coil and magnetic negative spring moveable element 206) can reduce size, weight and cost. The incremental cost of the magnetic negative spring moveable element 206 structure is low (since the voice coil requires the magnetic circuit) but it can significantly reduce power losses in the voice coil and also reduce the size/cost of the voice coil (by reducing the net force that the voice coil must produce).

The design of electroacoustic driver 200 causes the voice coil force to be dependent on the position of the magnetic negative spring moveable elements. However, the shape of the teeth of the magnetic negative spring moveable elements can be made to compensate for this effect and thus maintain a linear relationship between voice coil current and voice current force at all positions within the +/− of a pre-set distance range. The shape of the negative magnetic spring moveable element steel teeth can be shaped to create an ideal force profile for each speaker design.

Another way to compensate for this magnetic field variation effect is to reduce the density of voice coil windings on the outside edge of the voice coil (since these coil elements will experience a higher magnetic field than the central parts of the coil).

Figure 3A:
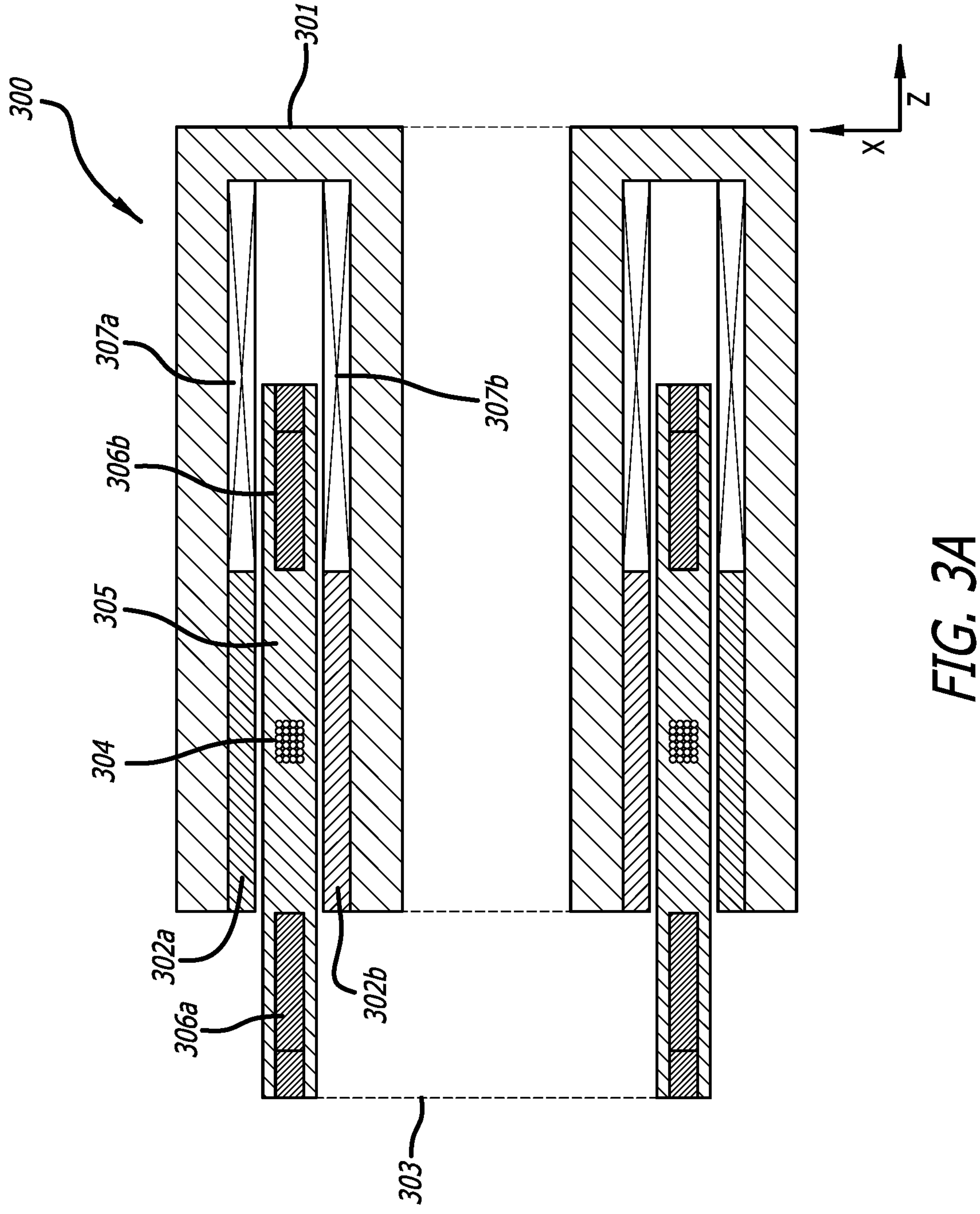
FIG. 3A is a schematic of a cross-sectional view of an alternative embodiment of an electroacoustic driver utilizing a coil holder having a magnetic negative spring that utilizes a pair of high permeability serrated cylindrical shells.
Figure 3B:
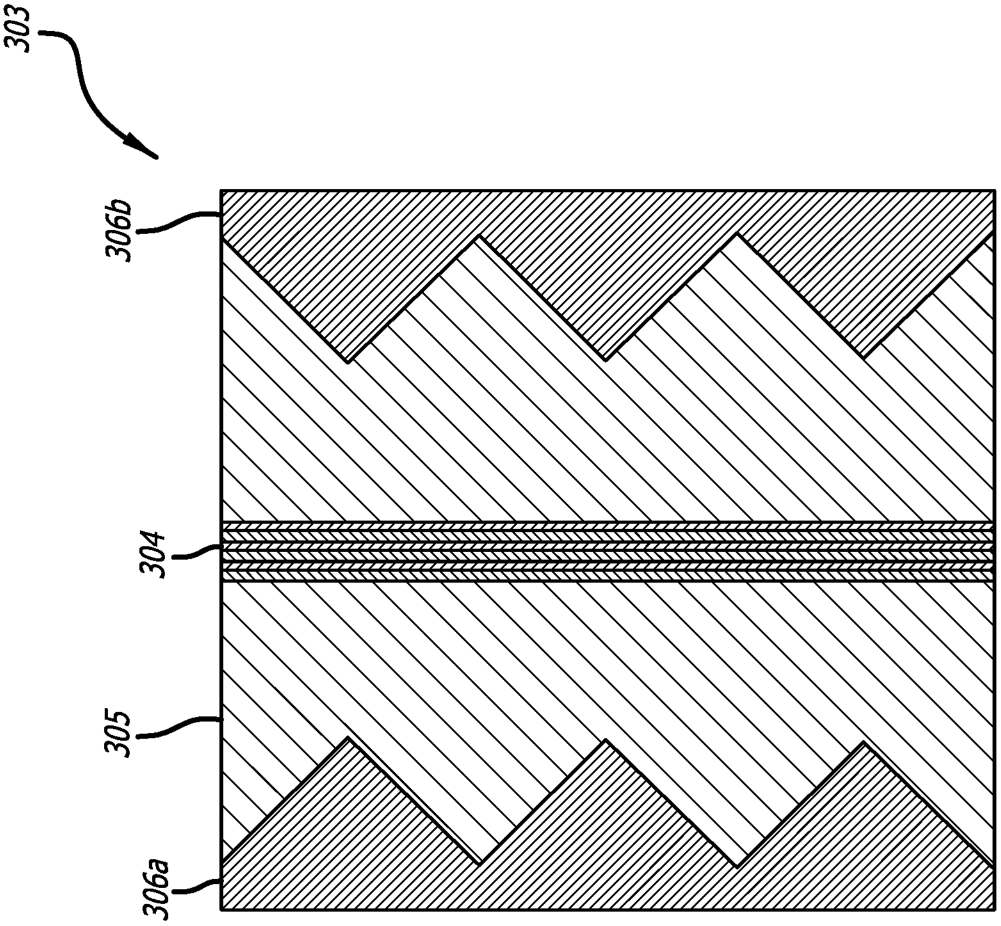
FIGS. 3B-3C are, respectively, a side view and a perspective view focusing in on the coil holder in FIG. 3A.
Figure 3C:
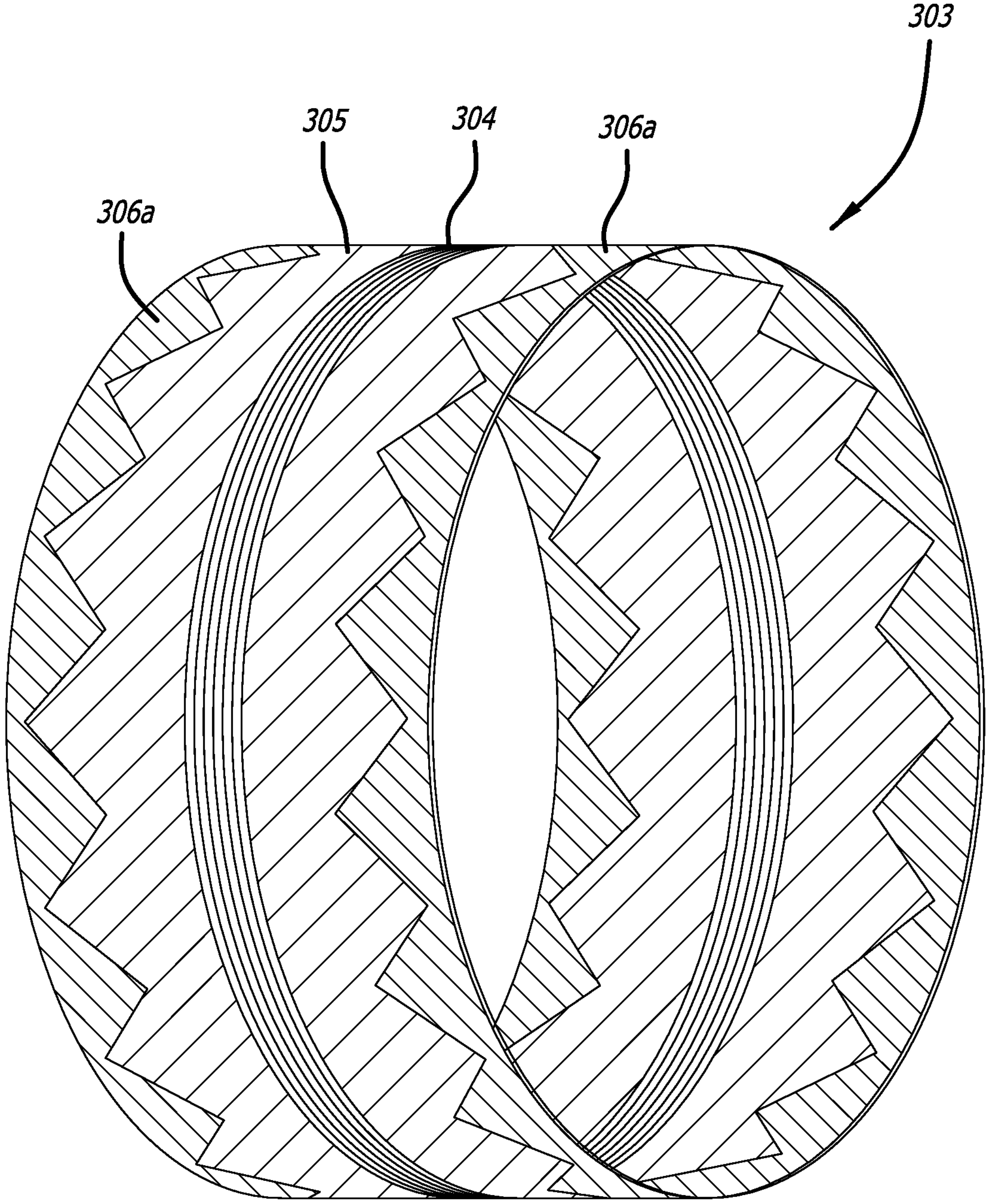

FIG. 3A is a schematic of an alternative embodiment of an electroacoustic driver 300 utilizing a coil holder 303 having a pair of magnetic negative spring elements 306*a*-306*b*. The coil holder 303 is shown in more detail in FIGS. 3B-3C.

As shown in FIG. 3A, there is just one magnetic air gap, a pair of magnetic negative spring moveable elements 306*a*-306*b*, and one voice coil (utilizing magnet wire coil 304). Coil holder 303 further includes non-magnetic/non-conductive material 305 (such as fiberglass) which can be attached to the sound panel (not shown) as well as to isolate the magnet wire coil 304 from the pair of magnetic negative spring moveable elements 306*a*-306*b*. By this arrangement, the entire magnet wire coil 304 is immersed in the magnetic field at all positions (by permanent magnets 302*a*-302*b*), which can increase efficiency and maintain a linear relationship between current and force (which results in low distortion music).

The entire magnetic circuit (permanent magnets 302*a*-302*b* plus element 301 (iron/steel) is required for the voice coil; the MNS moveable elements 306*a*-306*b* use this existing infrastructure and thus add very little cost/weight/size. Two separate magnetic negative spring moveable elements 306*a*-306*b* are used in electroacoustic driver 300 and this design reduces the number of ring magnet pairs from two (in electroacoustic driver 200) to one (in electroacoustic driver 300).

The addition of the pair of magnetic negative spring moveable elements 306*a*-306*b* increases the maximum force by an order of magnitude without increasing electrical power consumption (of the voice coil or other active driver) or delivers the same force with two orders of magnitude lower input power (or some combination of higher force and lower input power). These attributes are highly desirable for a battery-operated (portable) speaker.

Electroacoustic driver 300 can also include one or more force adjustment coils (such as coils 307*a*-307*b*). The force adjustment coils can increase or decrease the magnetic field in the air gap and thus increase or decrease both the voice coil force per unit current and the variable reluctance force per unit displacement (since the variable reluctance force is proportional to the square of the magnetic field in the air gap).

Since the pressure force depends on the sealed volume of the speaker air chamber and the mechanical stiffness of the sound panel support (each of these forces generally oppose the voice coil force and the variable reluctance force), it may be necessary to adjust the voice coil force per unit current along with the variable reluctance force per unit displacement to minimize the total electrical input power (which equals the voice coil power plus the adjustment coil power) due to manufacturing tolerance issues. A self-test can be used to optimize the adjustment coil current setting for each speaker.

Another benefit of the adjustment coil is that it can insure the variable reluctance force never exceeds the opposing forces (the mechanical stiffness plus the pressure forces) in which case the moveable elements might get "stuck" in one extreme position or another (in the negative and positive z-direction).

FIG. 3A further shows one way a RAD can dispense with permanent magnets if one assume the N and S permanent magnets (permanent magnets 302*a* and 302*b*, respectively) are replaced with magnetic steel (this would reduce material cost but increase the required electrical input power). Yet another option is that the N or S magnet ring can be replaced with magnetic steel (which would lower cost at the expense of performance).

Figure 4A:
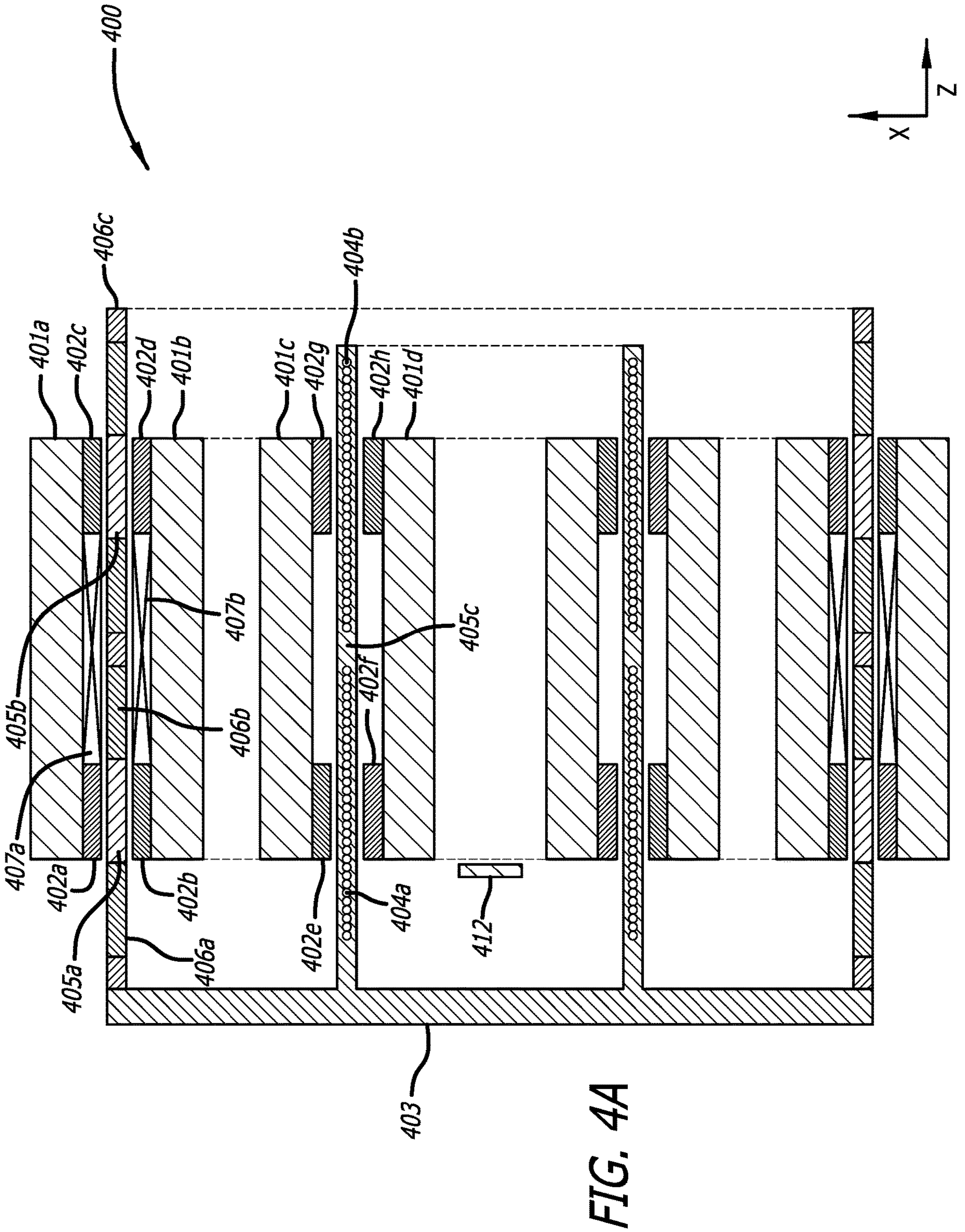
FIG. 4A is a schematic of a cross-sectional view of alternative embodiment of an electroacoustic driver utilizing a coil holder having a magnetic negative spring that utilizes a high permeability serrated cylindrical shell that is concentric with the coils of the coil holder.
Figure 4B:
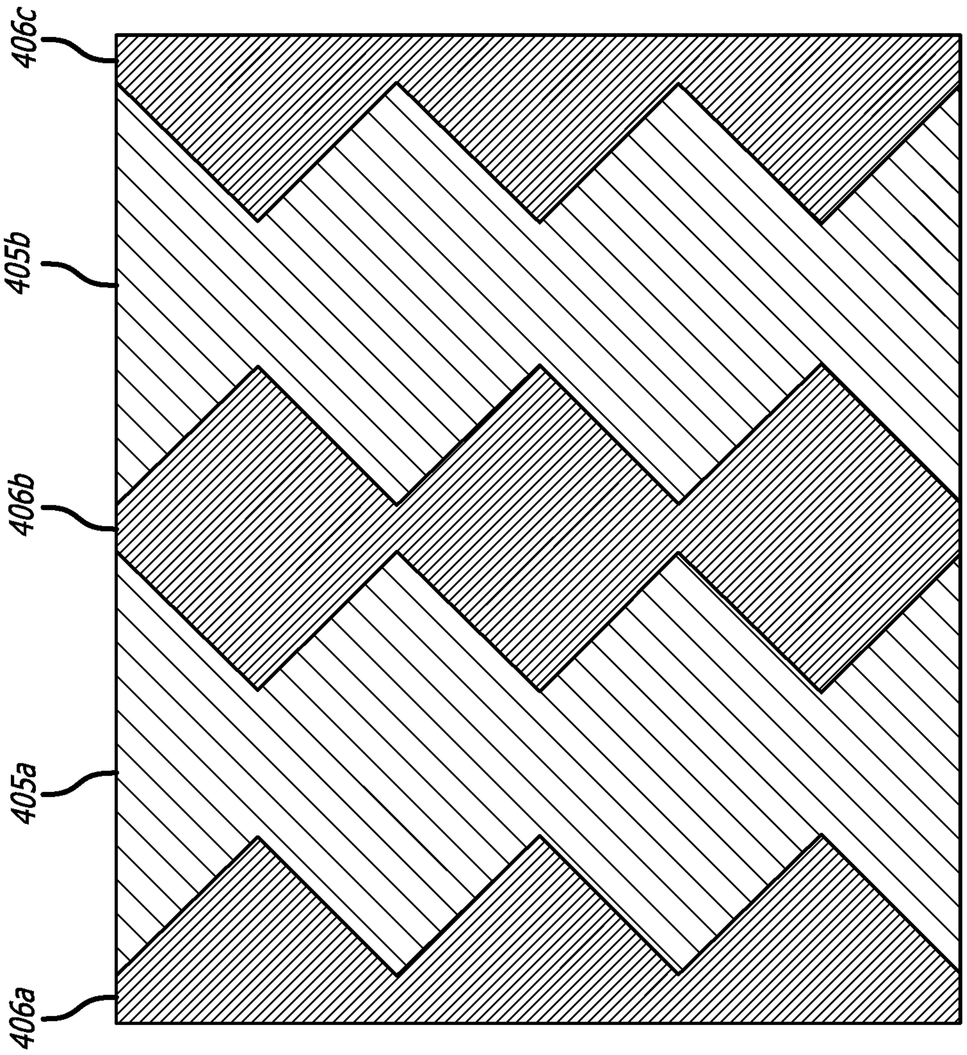
FIGS. 4B-4C are, respectively, a side view and a perspective view focusing in on the high permeability serrated cylindrical shell portion of the coil holder in FIG. 4A.
Figure 4C:
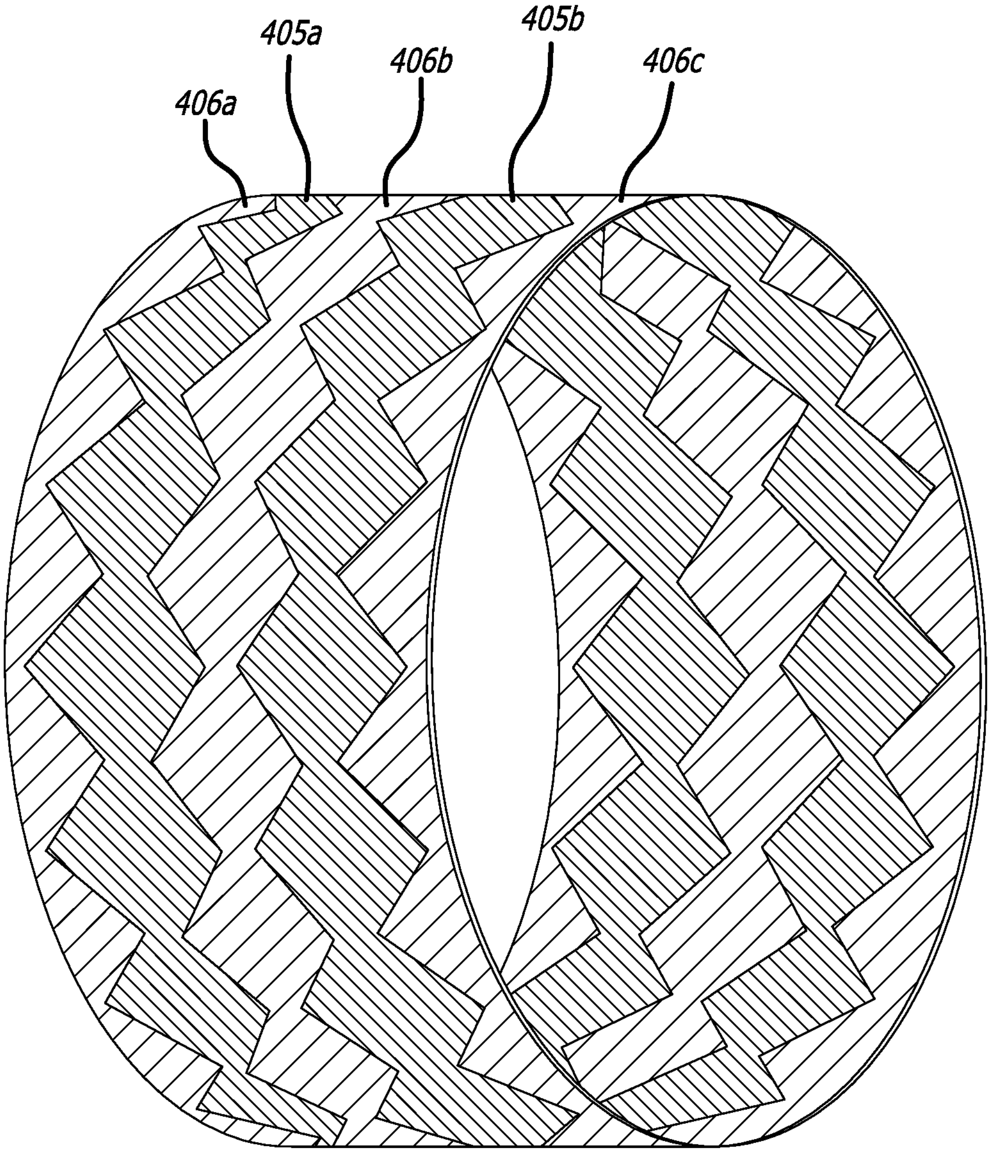
Figure 4D:
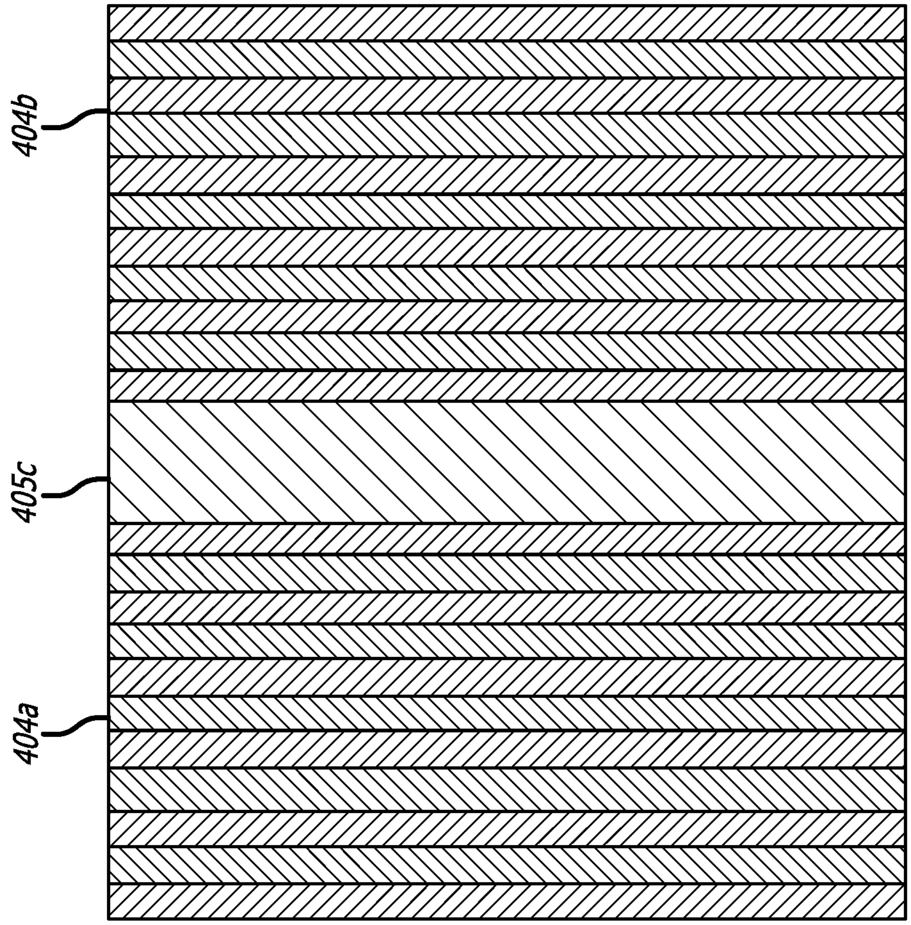
FIGS. 4D-4E are, respectively, a side view and a perspective view focusing in on the coil portion of the coil holder in FIG. 4A.
Figure 4E:
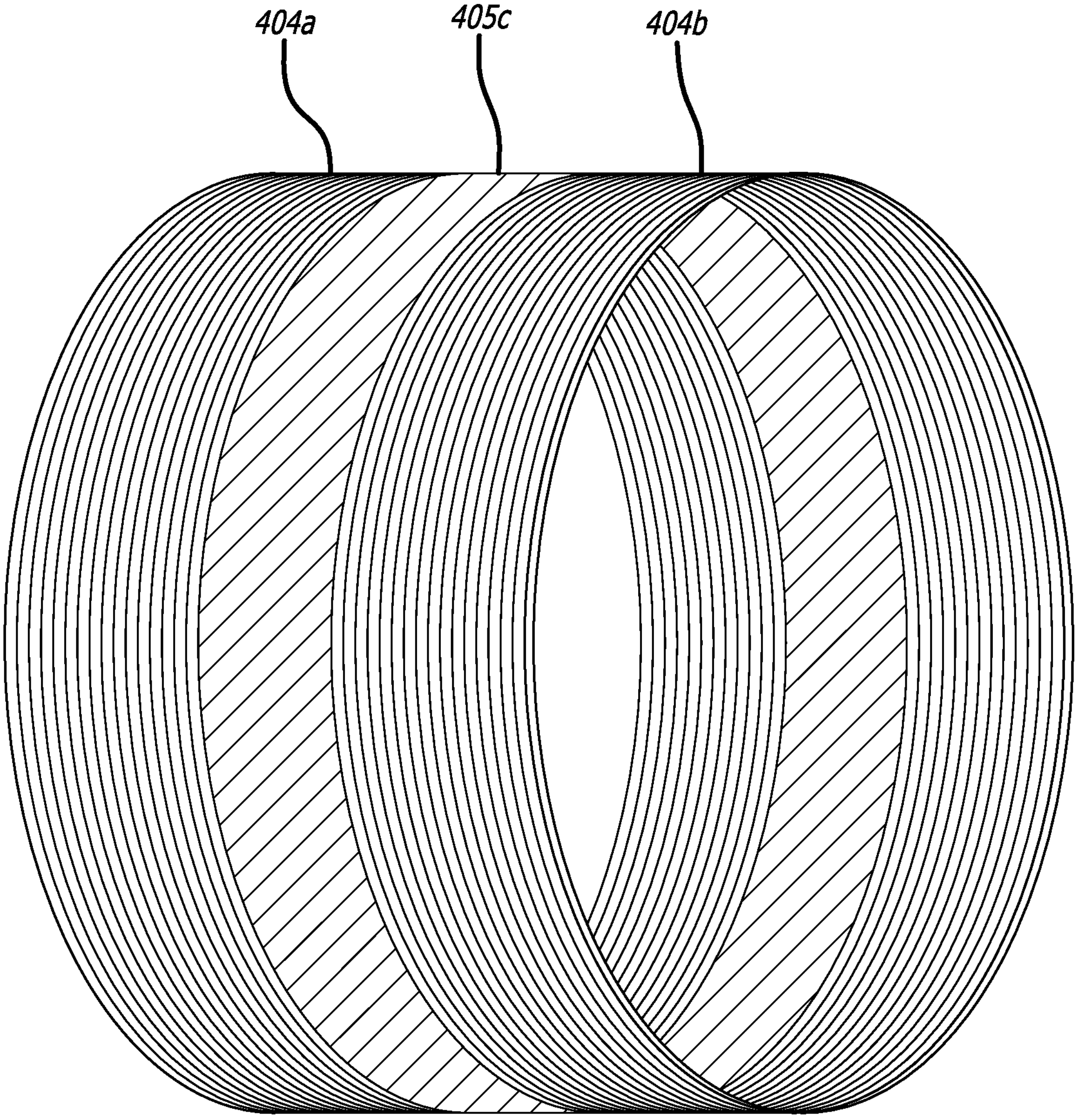

FIG. 4A is a schematic of electroacoustic driver 400 utilizing a coil holder 403 having a magnetic negative spring that utilizes a high permeability serrated cylindrical shell that is concentric with the magnet wire coils 404*a*-404*b* of the coil holder. The high permeability serrated cylindrical shell portion of the coil holder 403 is shown in more detail in FIGS. 4B-4C, and the voice coil portion of the coil holder 403 is shown in more detail in FIGS. 4D-4E. High permeability serrated cylindrical shell has magnetic negative spring moveable elements 406*a*-406*c* near permanent magnets 402*a*-402*d* and can also include one or more force adjustment coils (such as coils 407*a*-407*b*). Permanent magnets 402*e*-402*h* are nearby metal wire coils 404*a*-404*b*. The coil holder 403 also includes non-magnetic/non-conductive material, such as non-magnetic/non-conductive material 405*a*-405*c*. Electroacoustic driver 400 further includes elements 401*a*-401*d* (iron/steel).

One or more sound panels (not shown) can be connected to the moving coil holder 403. The arrangement of electroacoustic driver 400 roughly doubles the amount of force produced by the MNS for a given radius (relative to electroacoustic driver 300) since motion in the positive/negative z-direction engages two magnetic negative spring moveable elements instead of one.

The magnet wire coils 404*a*-404*b* of electroacoustic driver 400 also produces more than twice the force for a given radius (relative to electroacoustic driver 300) because there are always two full magnet widths of coil engaged at all positions. Metal wire coils 404*a* of the voice coil are wound in the opposite direction as metal wire coils 404*b* since the first half of voice coil is immersed in a magnetic field having a polarity that is opposite relative to the second half of the voice coil.

Optionally, driver 400 can include a position and/or velocity sensor 412 (such as an optical or inductive position sensor) that can be used to provide position feedback to a control circuit that adjusts the current in the force adjustment coils 407*a*-407*b*. To the extreme, the control circuit (using position feedback from position sensor 412) can adjust the current in the force adjustment coils 407*a*-407*b* in real time (every millisecond or so) to minimize the total input power (which equals the voice coil power plus the adjustment coil power) and insure that the moveable coil holder 403 never gets magnetically stuck in either extreme position (the extreme positions in FIG. 4A are in the positive or negative z-direction).

As discussed above in 4A, magnetic negative spring moveable elements 406*a*-406*c* (which can also be called "crowns" 406*a*-406*c*) can be made of steel (or other ferromagnetic material) and stationary permanent magnets 402*a*-402*d* (which can also be called "poles" 402*a*-402*d*) are radially polarized permanent magnets. In alternative embodiments, crowns 406*a*-406*c* can be steel (or other ferromagnetic material) and poles 402*a*-402*d* can be steel (or other ferromagnetic material). In another alternative embodiment poles 402*a*-402*d* are radially polarized permanent magnets, crown 406*b* is made of steel (or other ferromagnetic material) and crowns 406*a* and 406*c* are made of radially polarized permanent magnet material. In yet another embodiment, poles 402*a*-402*d* are steel (or other ferromagnetic material) and crowns 406*a*-406*c* are made of radially polarized permanent magnet material.

Figure 5A:
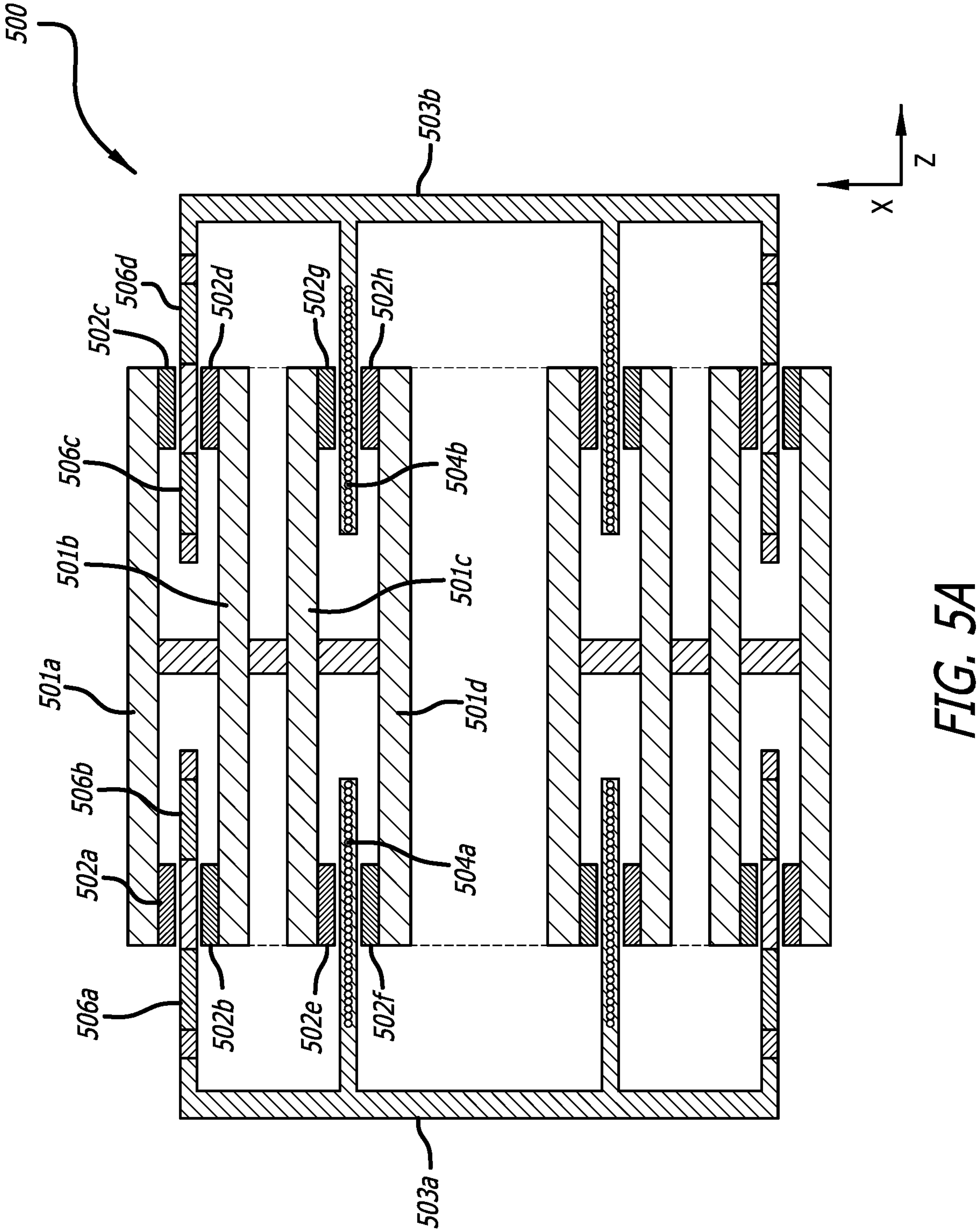
FIG. 5A is a schematic of a cross-sectional view of an alternative embodiment of an electroacoustic driver utilizing a coil holder having magnetic negative springs that can move sound panels in opposing directions.
Figure 5B:
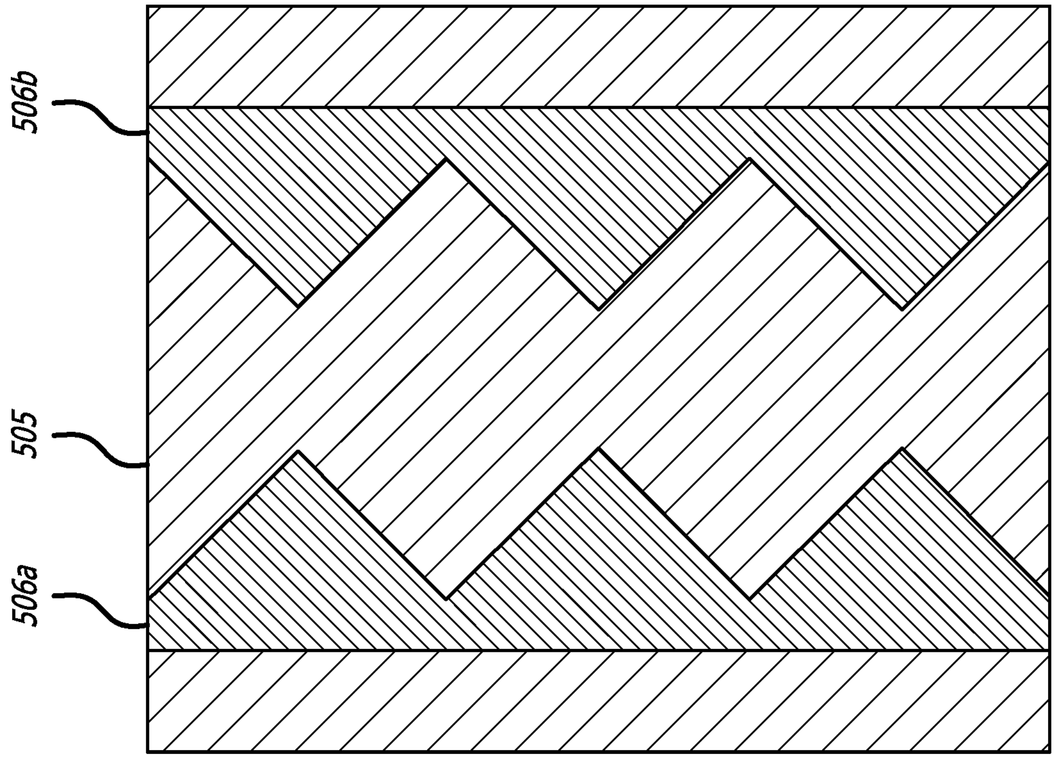
FIGS. 5B-5C are, respectively, a side view and a perspective view focusing in on the magnetic negative spring portion of the coil holder in FIG. 5A.
Figure 5C:
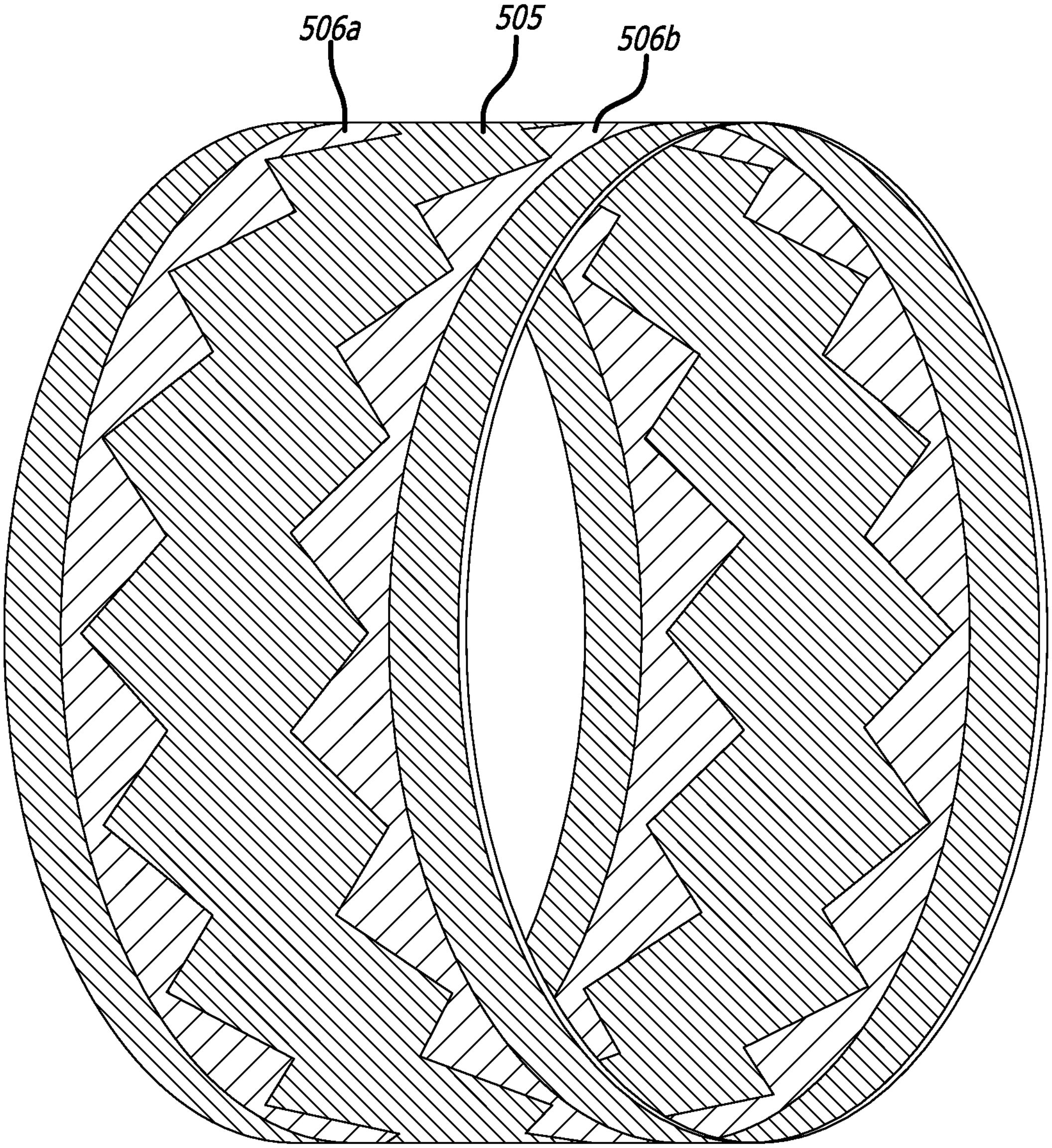
Figure 6:
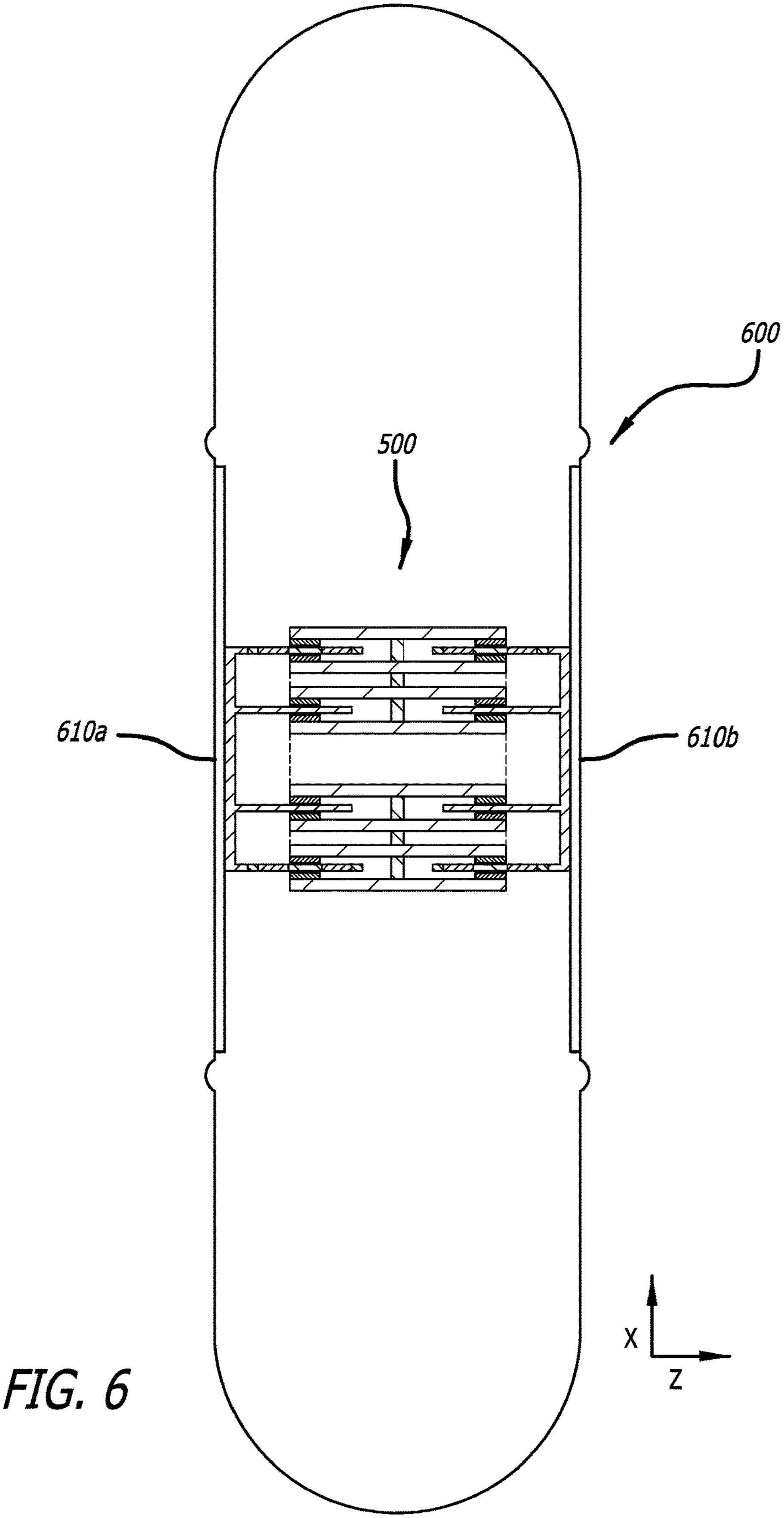
FIG. 6 is a schematic of a cross-sectional view of a sealed air chamber of a loudspeaker utilizing the electroacoustic driver shower in FIG. 5A.

FIG. 54 is a schematic of a further alternative embodiment of an electroacoustic driver 500 utilizing coil holders 503*a*-503*b* having magnetic negative springs that can move sound panels in opposing directions. FIGS. 5B-5C are, respectively, a side view and a perspective view focusing in on a portion of coil holder 503*a* (showing the magnetic negative spring moveable elements 506*a*-506*b*). FIG. 6 is a schematic of the electroacoustic driver 500 utilized in a sealed air chamber of a loudspeaker 600, in which electroacoustic driver 500 can move panels 610*a*-610*b* in opposite directions. I.e., electroacoustic driver 500 can move panel 610*a* in the negative z-direction when moving panel 610*b* in the positive z-direction, and visa versa. As with embodiments disclosed and taught in the Pinkerton '971 application and the Pinkerton '770 application, if these are so moved in opposite directions with the same magnitude, any inertial forces of the overall electroacoustic speaker 600 that apply to panels 610*a*-610*b* are equal but opposite in direction and thus will cancel each other so that the inertial forces for the overall electroacoustic speaker 600 are approximately zero. This force cancellation has important benefits that include preventing movement of the loudspeaker during use (by reducing vibration) and minimizing on-board microphone distortion for voice-control operations.

In electroacoustic driver 500, coil holder 503*a* has magnetic negative spring moveable elements 506*a*-506*b* (near permanent magnets 502*a*-502*b*), magnet wire coil 504*a* (near permanent magnets 502*e*-502*f*), and non-magnetic/non-conductive material 505. Coil holder 503*b* has magnetic negative spring moveable elements 506*c*-506*d* (near permanent magnets 502*c*-502*d*), magnet wire coil 504*b* (near permanent magnets 502*g*-502*h*), and non-magnetic/non-conductive material 505. Elements 501*a*-501*d* are fixed (with coil holder 503*a*-503*b* able to move with respect to these fixed elements). Permanent magnets 502*a*-502*h* are fixed to elements 501*a*-501*d*.

For each of the magnetic circuits, the magnetic circuit of the magnetic negative springs and voice coils are separate so that the position of the magnetic negative spring moveable elements does not change the magnetic field of the voice coil magnetic circuit (and thus cause the voice coil force to be dependent on the position of the magnetic negative spring moveable elements).

The magnetic steel is reduced in devices utilizing the electroacoustic driver 500 (relative to devices utilizing the electroacoustic driver 200 or electroacoustic driver 300) because the front/back RAD transducers can share part of the magnetic circuit.

Furthermore, relative to the electroacoustic driver 200 and electroacoustic driver 300, devices utilizing electroacoustic driver 500 separate out the voice coil and MNS functions and thus can use magnet rings that are just x wide (x=mechanical motion amplitude of the sound panel and 2× is the peak-to-peak motion) vs. 2.5× wide magnets required for devices utilizing electroacoustic driver 300 (which causes the back iron to be 2.5× thicker/heavier). This approach reduces the amount of steel and permanent magnet material required to produce a given force. Also, the optimal air gap for the voice coil is likely different than the optimal air gap for the MNS so separate magnetic circuits allow each to be optimized.

Figure 7A:
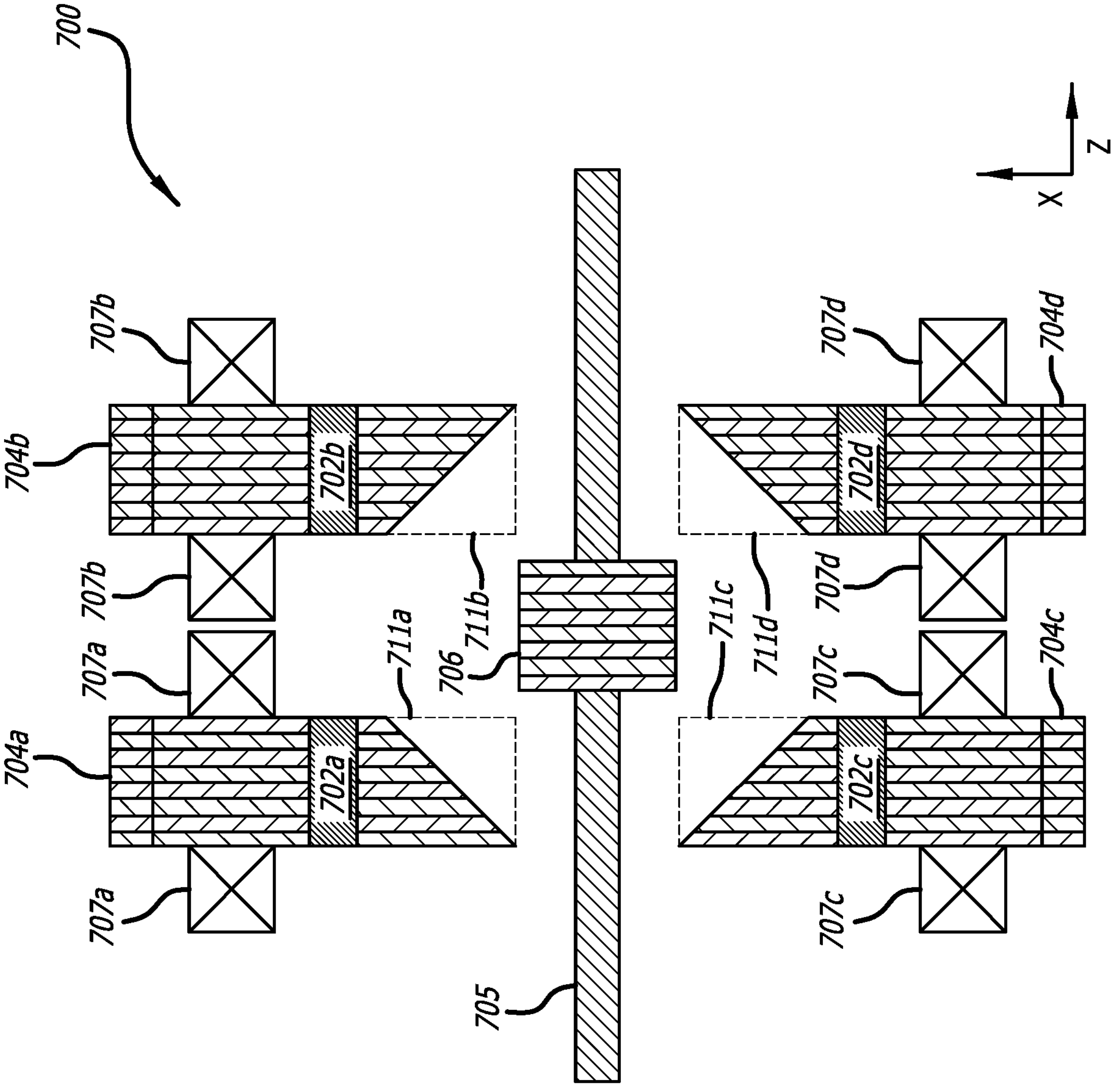
FIG. 7A is a schematic of a cross-sectional view of another alternative embodiment of an electroacoustic driver utilizing a coil holder having a magnetic negative spring that can move a sound panel in opposing directions.
Figure 7B:
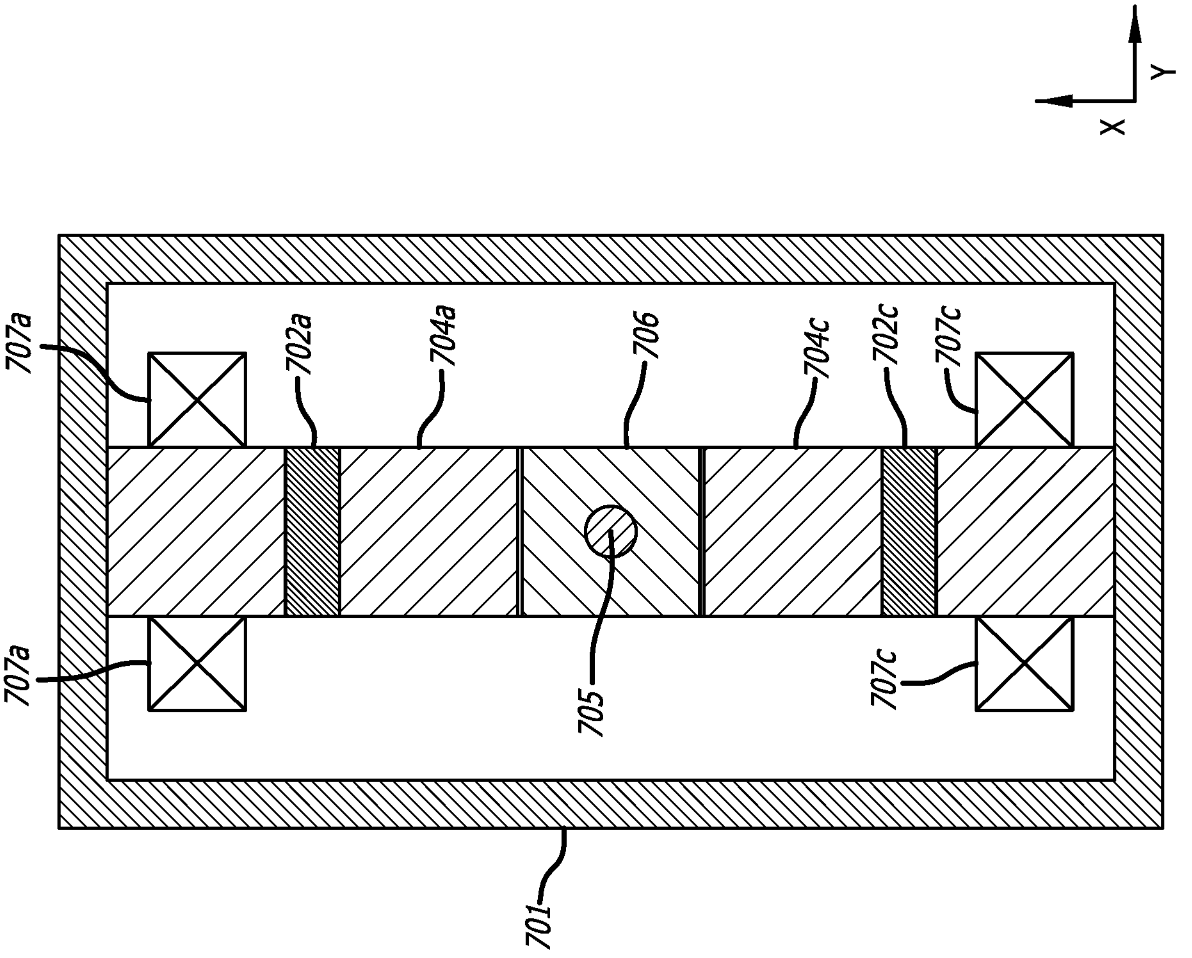
FIG. 7B is a cross-sectional view of the schematic of the electroacoustic driver shown in FIG. 7A (90 degrees with respect to the left part).

FIGS. 7A-7B show electroacoustic driver 700, which is an alternate embodiment of a magnetic negative spring. Electroacoustic driver 700 has a movable laminated structure 706, shaft 705 (non-magnetic/non-conductive material), stationary laminated structures 704*a*-704*d*, permanent magnets 702*a*-702*d*, and force adjustment coils 707*a*-707*h*. Electroacoustic driver 700 can be utilized to move a sound panel in opposing directions.

Shaft 705 is a moveable shaft (that is connected to both a sound panel and an active force driver such as a voice coil) that has moveable laminated structure 706 attached to it (this is the magnetic negative spring moveable element). When moveable laminated structure 706 moves in the negative/positive z-direction, it is attracted to the nearby stationary laminated structure (such as stationary laminated structures 704*a* and 704*c* is moving in a negative z-direction from the position shown in FIG. 7A). Because each of stationary laminated structures 704*a*-704*d* has an angle (as shown), the force will increase as the moveable laminated structure 706 moves in the z-direction (to compensate for increasing pressure and mechanical spring forces of the speaker). The magnetic fields produced by the permanent magnets 702*a*-702*d* can be adjusted with the force adjustment coils 707*a*-707*d*.

If permanent magnets 702*a*-702*d* are not used, each of stationary laminated structures 704*a*-704*d* do not need to have an angle but could be straight as shown by the lines 711*a*-711*d*. In such case, a position sensor and active feedback would be needed to produce the desired force profile.

FIG. 7B is a view that is 90 degrees with respect to the left part of FIG. 7A. In this view, the z-direction is in and out of the page (perpendicular to the x-direction and y-direction shown in FIG. 7B).

Laminations are used to reduce eddy-current losses but are not absolutely necessary (solid magnetic steel could alternatively be used).

Electroacoustic driver 700 uses variable reluctance forces to create a "magnetic negative spring" that partially or fully cancels the forces that a speaker electroacoustic transducer must overcome (primarily the sealed air chamber pressure forces and the spring forces of the electroacoustic transducer mechanical support). The variable reluctance forces can be fully passive (using permanent magnets), fully active (using active feedback and field coils) or a combination of active and passive. Fully or partially canceling the pressure/spring forces of an audio speaker allows the active force transducer (such as a voice coil) to be much smaller, lighter and lower cost while utilizing much less electrical power than prior art devices.

Figure 8:
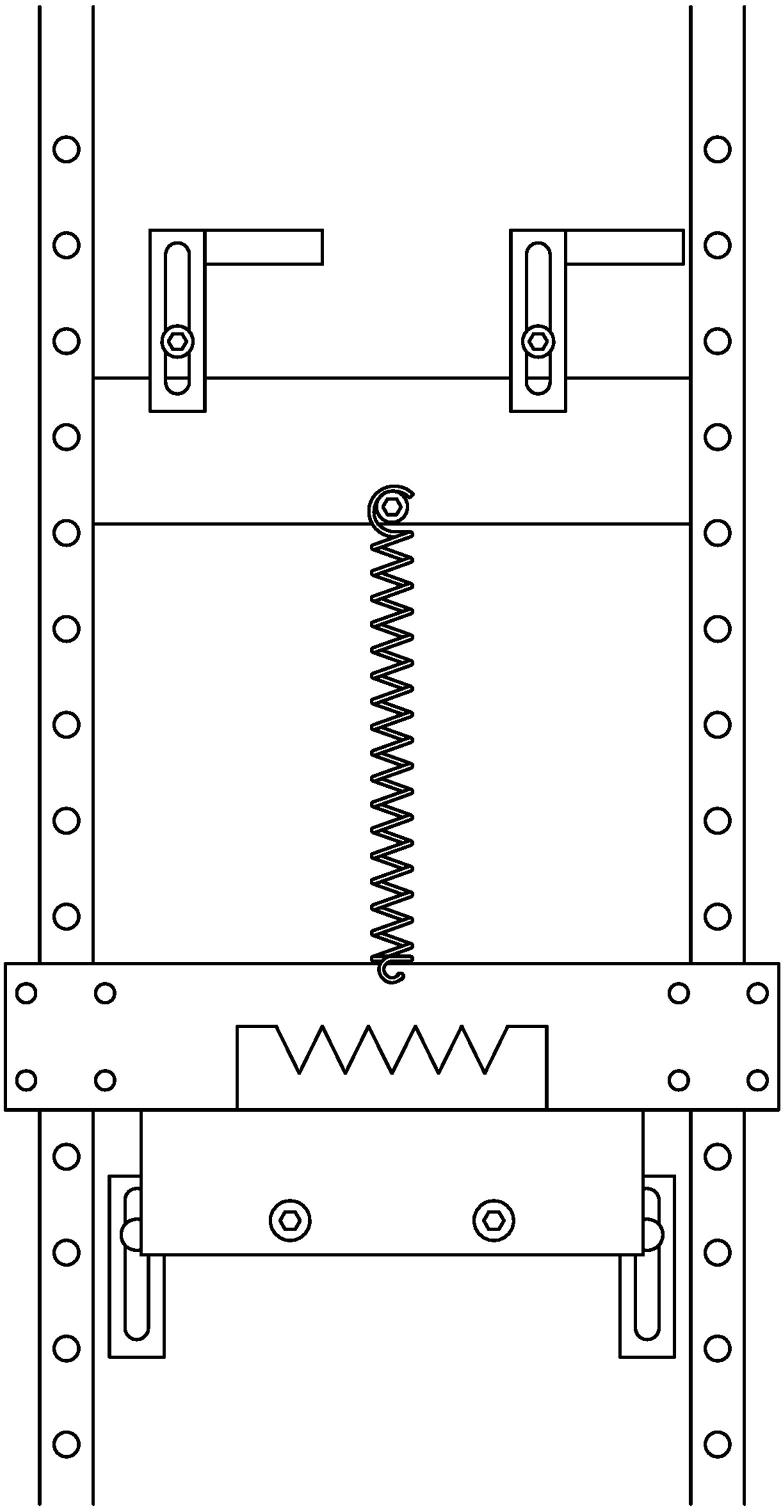
FIG. 8 is a photograph of a magnetic negative spring prototype of the present invention.

FIG. 8 is a photograph of prototype magnetic negative spring of the present invention. FIG. 8 shows a flat MNS that was tested to measure its force as a function of steel tooth position. The total width of the steel tooth member is 76 mm and the maximum measured force is 80 N (about 1 N per mm length of the steel tooth member). This force is significant for the size of the device and required no electrical input power.

Permanent Magnet Crown (PMC) Drivers

Referring again to FIG. 4A discussed above, permanent magnet crowns ("PMC") can be utilized in driver 400 (rather than crowns made of steel). In some embodiments, crowns 406*a*-406*c* are radially polarized permanent magnets (outside crowns 402*a* and 402*c* having opposite polarity as middle crown 402*b*) and poles 402*a*-402*d* are radially polarized permanent magnets. Further, for example. In some other embodiments, crowns 406*a*-406*c* can be radially polarized permanent magnets (outside crowns 402*a* and 402*c* having opposite polarity as middle crown 402*b*) and poles 402*a*-402*d* can be steel (or other ferromagnetic material).

In PMC drivers, when field coils 407*a*-407*b* (one or the other or both) are energized in one direction, the cylindrical shell of electroacoustic driver 400 moves in one axial direction; when this field current is reversed the direction of the axial force is reversed (even when crowns 406*a*-406*c* are in their centered positions). Because the force created by the field coil is bidirectional even in the centered position, metal wire coils 404*a*-404*b* are not required for such embodiments (which has benefits, such as reducing cost, weight, etc.). Thus, in these PMC embodiments, metal wire coils 404*a*-404*b* are optional. Also, in these PMC driver embodiments, less permanent magnet material is required to generate a given force (which has benefits such as reducing cost).

In addition, because permanent magnets have roughly the same permeability as air, the total effective air gap of the field coil magnetic circuit can be reduced (which has benefits, such as lowering the power requirement of the field coil). Still further, the amount of axial force generated per watt of field coil power is substantially higher than the force/watt ratio of a voice coil (increasing efficiency and battery runtime). As there is some inherent force instability in these PMC drivers (as the cylindrical shell of electroacoustic driver 400 will move to the right or left on its own), position and/or velocity sensor 412 should then be used in connection with a feedback control loop to stabilize and operate driver 400.

Since the crowns in PMC are made of permanent magnets (and permanent magnets have a permeability similar to air as mentioned above), PMC drivers are not reluctance force drivers but are magnetic negative springs. These can even be referred to as "a semi-active magnetic spring" when field coils are used. Moreover, permanent magnetic crowns can be used as a passive MNS when used with voice coils 404*a*-404*b* even though the device does not require voice coils when a field coil is utilized.

Figure 9A:
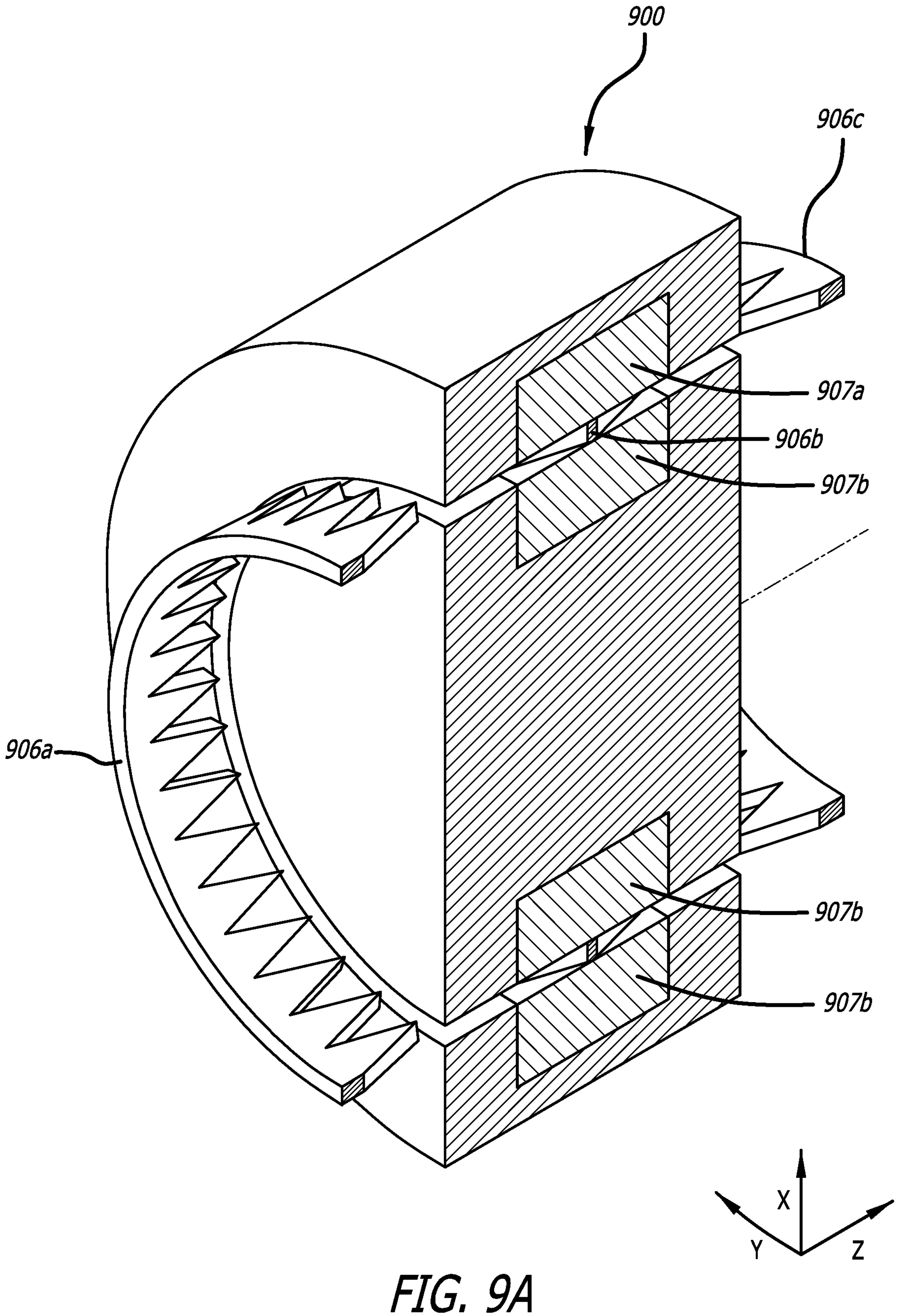
FIG. 9A is a cross-sectional perspective view of an electroacoustic driver utilizing a magnetic circuit having a magnetic negative spring (MNS) including permanent magnet crowns.
Figure 9B:
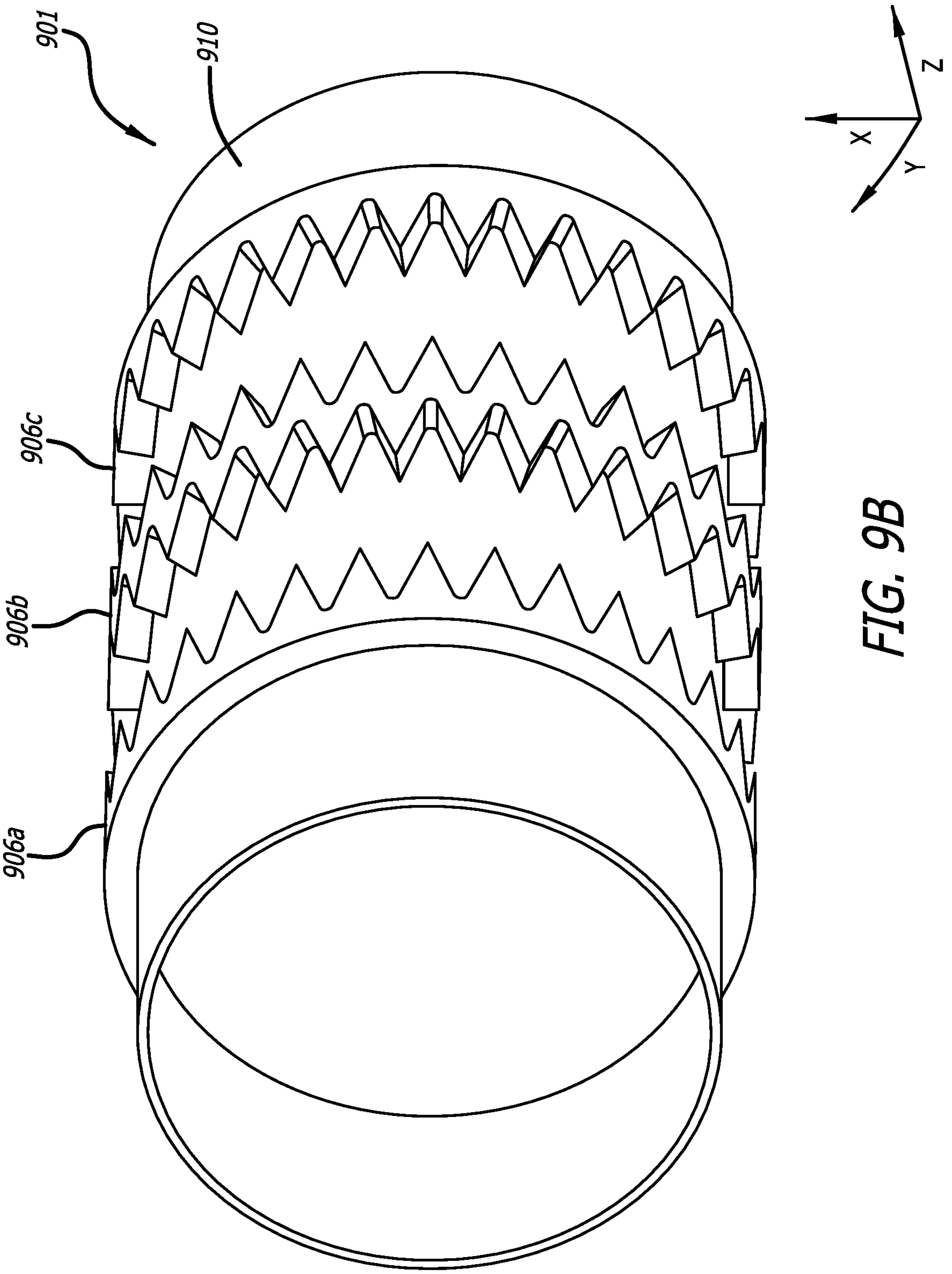
FIG. 9B is a perspective view of the coil holder shown in FIG. 9A.

FIG. 9A is a cross-sectional perspective view of an electroacoustic driver 900 utilizing a magnetic circuit having a magnetic negative spring (MNS) including permanent magnet crowns 906*a*-906*c*. FIG. 9B is a perspective view of crown assembly 901 (that includes the permanent magnet crowns 906*a*-906*c* and cylindrical shell 910).

As shown in FIG. 9A, there is no voice coil in electroacoustic driver 900, but there are two field coils, outer field coil 907*a* and inner field coil 907*b*. (Alternatively, one field coil can be utilized; however, generally, two field coils are more efficient). Field coils 907*a*-907*b* are encased in a ferromagnetic material, such as steel or ferrite. The coils and ferromagnetic material create an electromagnet with a left pole piece and a right pole piece. There are three permanent magnet crown (PMC) structures (outer crown 906*a*, middle crown 906*b*, and outer crown 906*c*) that are mechanically attached to a cylindrical shell 910 (such as a shell made of carbon-fiber-epoxy) and this shell is attached to a sound panel (not shown in FIG. 9A-9B).

The permanent magnetic fields of each of crowns 906*a*-906*c* are directed toward or away from the central axis. If the magnetic fields of the outer crowns 906*a* and 906*c* are directed toward the central axis, the magnetic fields of middle crown 906*b* is directed away from the central axis. Stated another way, if outer crowns 906*a* and 906*c* have a south magnetic pole on their outer diameter, middle crown 906*b* has a north pole on its OD.

Figure 10:
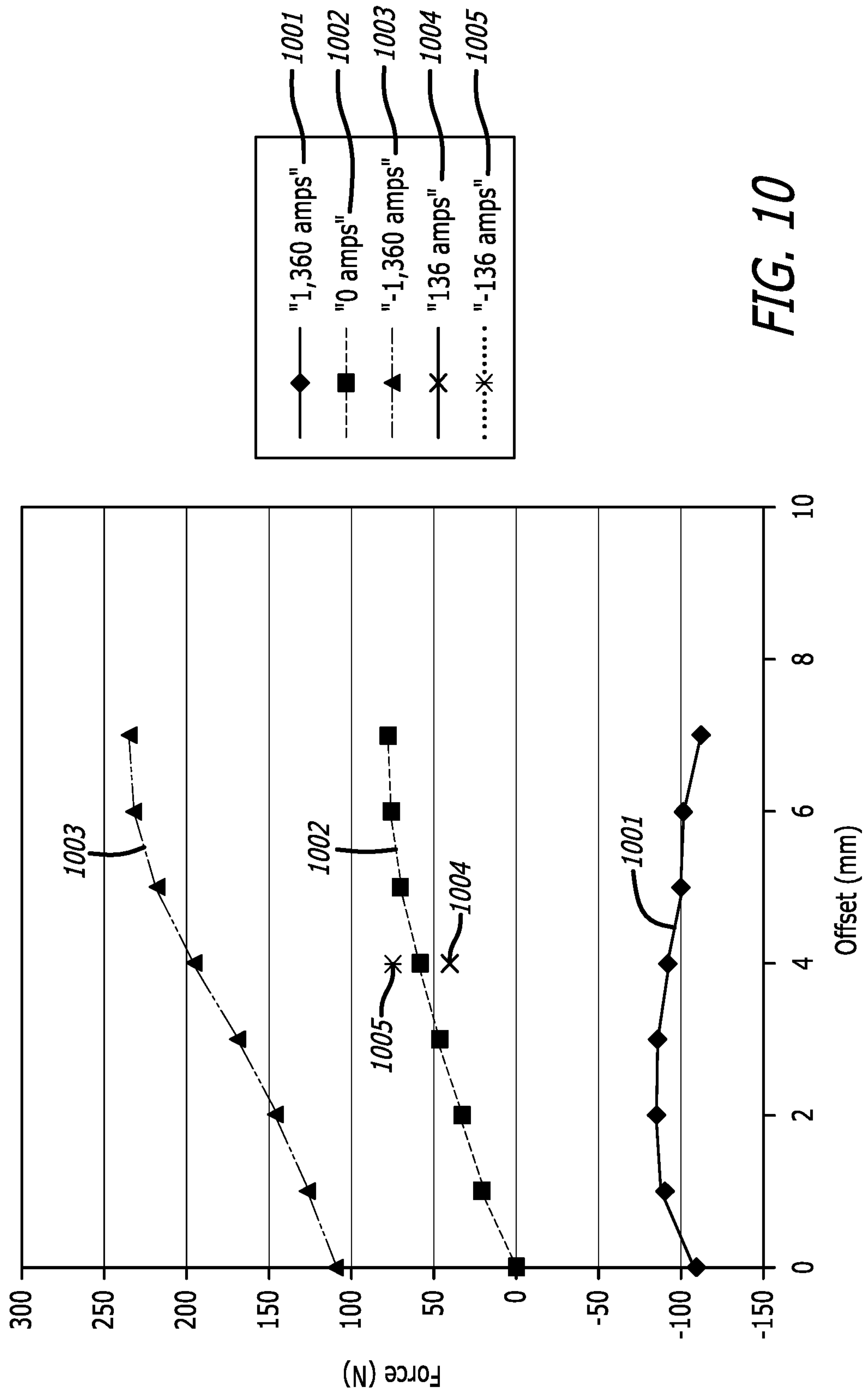
FIG. 10 is a graph showing the force versus displacement (for an armature movement in one direction).

When current in the field coils 907*a*-907*b* flows clockwise (in the orientation of FIGS. 9A-9B) in figure, this creates a north pole on the upper left pole piece and a south pole on the upper right pole piece. Assuming the PMC poles stated above in the orientation of FIGS. 9A-9B), the PMC-cylinder structure or "armature" will then move in the positive z-axis direction (since crown 906*a* with a south pole on its OD is attracted to the north pole of the upper left pole piece, etc.). If the field coil current is reversed (current flows counter clockwise in the orientation of FIGS. 9A-9B), the armature will move to the negative z-axis direction. These results are shown in the force vs current graph shown in FIG. 10 (which shows armature movement in one direction only, i.e., the positive z-axis direction).

Once the armature (cylindrical shell 910 with crowns 906*a*-906*c*) moves even 0.1 mm in the z-axis direction (positive or negative), there will be a passive magnetic negative spring (MNS) force that will move the armature even more along that z-axis direction (no field coil current required). Such passive negative spring force for movement in the positive z-axis direction is shown in line 1002 of FIG. 10. (Line 1002 is for zero current in the field coils).

Current in the field coil in one direction (−1,360 amps) produces forces shown by line 1003 and current in the opposite direction (+1,360 amps) produces forces shown by line 1001. The field coil current can produce bidirectional forces and can overcome the passive MNS force at any armature position (the armature cannot get "stuck" at one extreme position or the other). Plots 1004-1005 (which are for field currents of 136 amps and −136 amps, respectively) show how the force due to the field coils current can decrease or increase the total force on the armature.

As described previously, the passive MNS forces are used to overcome the air pressure forces acting on the sound panel and any mechanical spring forces acting on the armature. Field coil currents will be produced in response to position/velocity feedback from the position/velocity sensor(s) along with audio information from a music file to make sure the sound panel is in the proper position and at the right velocity at all times (producing the right sound at all times).

Repulsive/Attractive MNS

Figure 11:
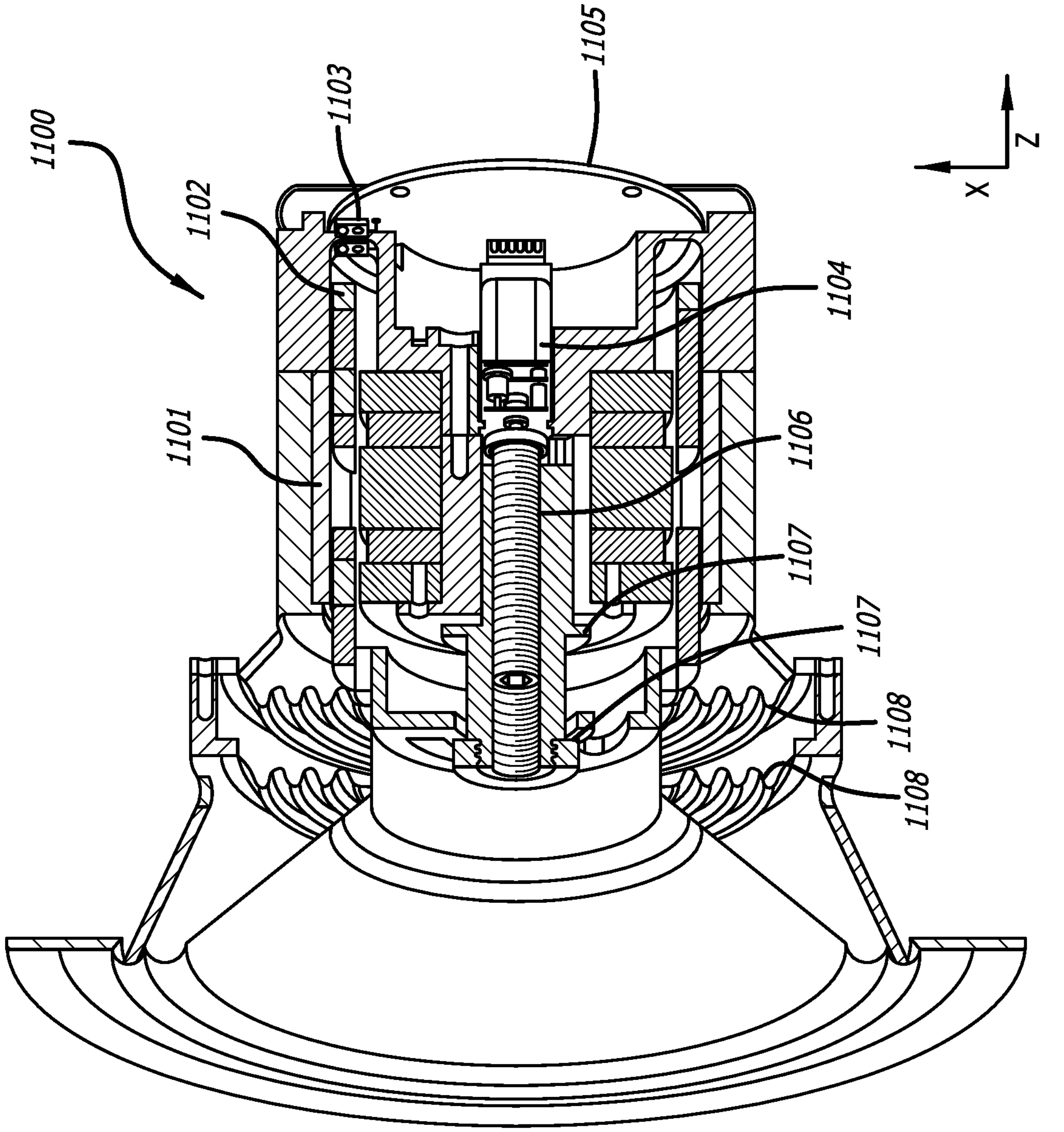
FIG. 11 is a schematic of a speaker driver assembly having a MNS having repulsive and attractive MNS features.

The magnetic negative spring (MNS) produces significant forces to offset the forces caused mainly by air pressure changes during large armature/cone displacements. When playing music, the armature is free to move in the space between the reset contacts. See FIG. 11 showing a speaker driver assembly 1100 having an MNS, which is described in more detail below (and incorporates repulsive and attractive MNS features of the present invention, i.e., a repulsive/attractive MNS). When the user pushes the off button on the speaker (or it turns off automatically due to non-use), the gear motor will turn the drive screw to make the reset contacts move right or left (in positive or negative z-direction) so that the disk (which is between the reset contacts) mounted to the armature can "land" on one of the reset contacts.

For example, if the reset contacts are moved to the left, the armature disk will land on the right reset contact. When the speaker is turned on the reset contacts return to their centered position to allow the armature/cone to have a full range of motion. In the event of an uncontrolled shutdown, the armature will drift significantly (a little more than the full amplitude of armature motion) right or left and land on one of the reset contacts.

Because the MNS can be inherently unstable (the armature will drift in the z-direction, without active control), there is a need for a mechanical stop that keeps the armature (the voice coil and moveable magnetic element array holder) approximately centered when the speaker is turned off (otherwise the armature will drift to an extreme position and be difficult to center with the voice coil alone). When the speaker is reset (for example by cycling the power), a centering mechanism will move the armature back to the centered position, the voice coil will take over the centering function and then the reset contacts will return to their centered position. This reset operation requires the centering mechanism to produce the full force of the MNS plus the back pressure associated with moving the cone (up to several hundred Newtons, which is more than 10 times the max force of a typical voice coil). A gear motor can be used to create the large forces required by the centering mechanism. Alternatively, a small air pump can be used to create a positive or negative pressure within the sealed enclosure that will create large outward or inward forces on the sound panel.

Figure 12:
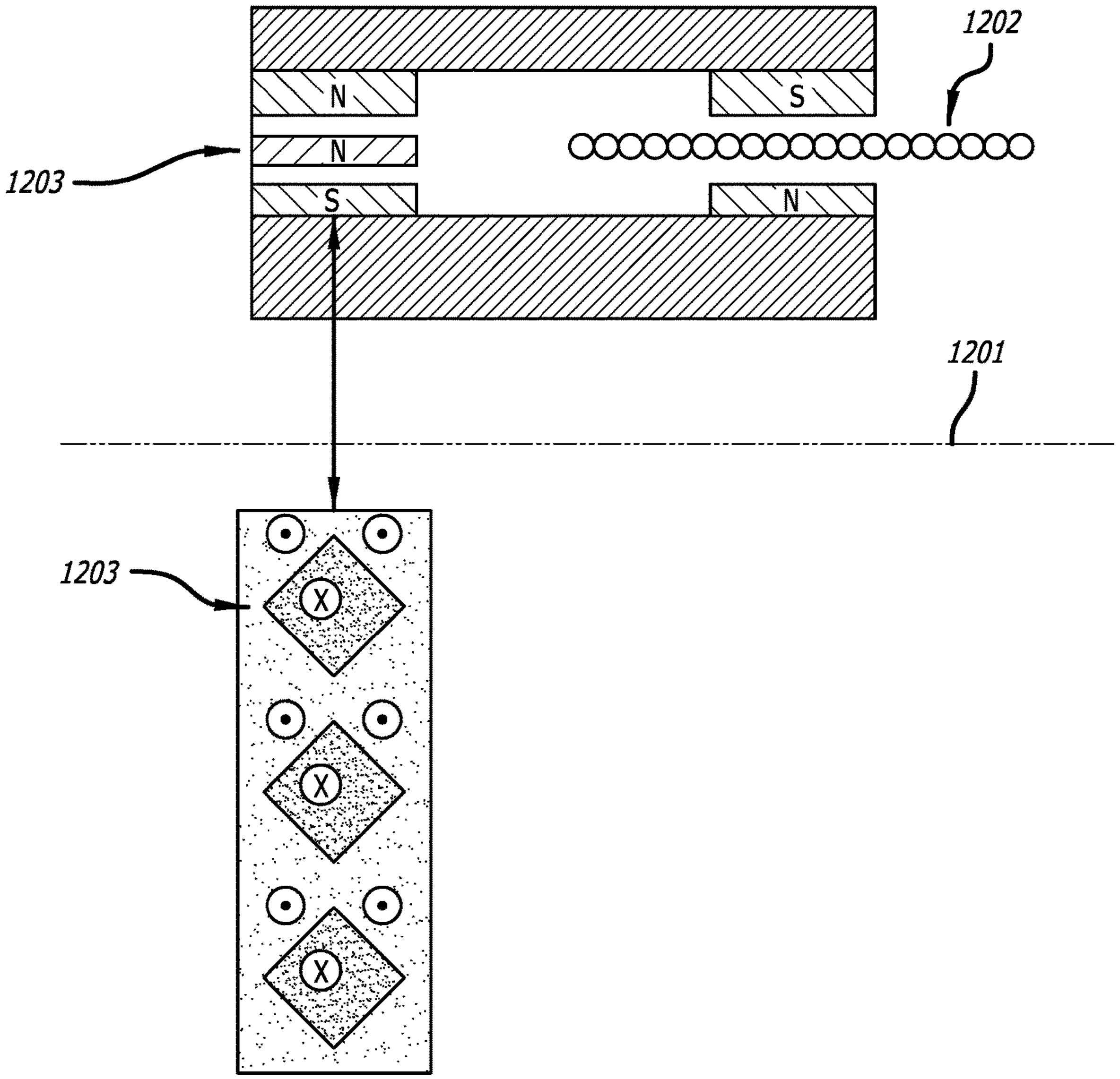
FIG. 12 is an illustration of a permanent magnet crown fully immersed in a repulsive magnetic field.

To counteract any unstable radial forces caused by the moveable magnetic element array, a stabilizer/centralizer can be used. In some embodiments, the stabilizers/centering mechanisms are stiff bushing supports; however, these can sometimes create friction and audible noise. In other embodiments, the permanent magnet crown (such as permanent magnet crowns **906*b* shown in FIG. 9B) is fully immersed in a repulsive magnetic field (such as shown in FIG. 12**). Such arrangements are referred to herein as "repulsive MNS." The permanent magnet crown can also be immersed in a magnetic field that will be both repulsive and attractive, with such arrangements referred to herein as "repulsive/attractive MNS."

FIG. 11 shows a speaker driver assembly 1100 having an MNS having repulsive and attractive MNS features (i.e., a repulsive/attractive MNS). The speaker driver can be used as a component in a loudspeaker. Speaker driver assembly 1100 includes an outer ring 1101, reflective surface 1102, photo sensors 1103, motor 1104 (such as 12GFN20E motor), PCA 1105 (for motor and photo sensors), drive screw 1106, and reset contacts 1107.

Conventional "spider" supports (in place of bushings), such as spiders 1108 shown in FIG. 11, can also work well with this stabilizing/centralizer design. Traditional speaker drivers typically utilize just one spider but for embodiments of the present invention that are stabilized/centered, it generally requires two or more spiders to make sure the armature does not move too much radially due to the small but non-zero radial forces produced by the permanent magnet elements mounted to the moveable armature. The gear motor 1104 can have an encoder for position feedback and can require some electronic elements to be mounted on the circular circuit board. The armature position "photosensor" 1103 can be mounted to the circuit board along with some associated electronic components.

Routing the two traditional driver leads to terminals near the circuit board (not shown) along with two input power leads (not shown) will make the speaker driver assemblies of the present invention operate like traditional drivers (but with approximately 10 times the force capability utilizing the same power, or, alternatively, while drawing approximately 10 times less power for the same force profile).

Repulsive/Attractive MNS

As shown in FIG. 12, in the repulsive MNS, when the PMC 1203 moves radially, the magnetic forces tend to push it away from centerline 1201. When the PMC 1203 moves axially in either direction, it experiences a repulsive force that increases with the axial distance moved (to a point). An overhung voice coil (VC) 1202 can be placed on a moveable armature next to the PMC 1203 in its own magnetic field as shown in FIG. 12.

Figure 13:
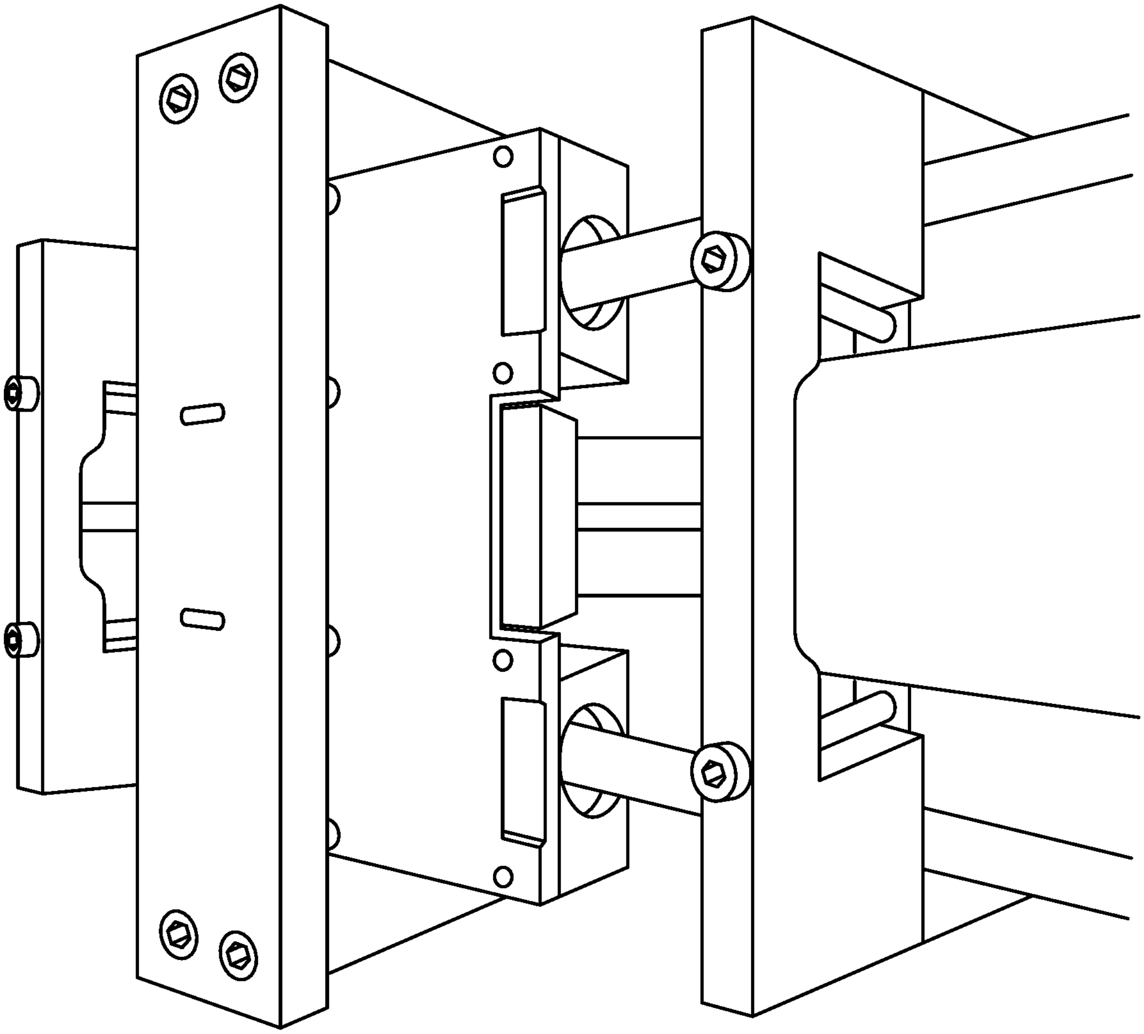
FIG. 13 is a photograph of a MNS prototype of the present invention.

FIG. 13 is a photograph showing an array of permanent magnet (PM) pucks embedded in an aluminum moveable armature. In this embodiment, there is one of the two stationary PM rectangles positioned above the puck array (such that, when the north magnetic pole of the stationary PM is facing down, the north poles of the PM pucks are facing up, so that they repel).

The repulsive forces produced by a repulsive MNS are more than twice the force for a given displacement (or stiffness) as compared to the comparable MNS made with moveable steel elements. The repulsive forces produced by a repulsive MNS are also higher than the attractive forces produced by an attractive MNS that also uses a permanent magnet armature but in an attractive orientation. One reason the repulsive MNS stiffness is higher than the attractive MNS stiffness is that smaller air gaps (magnetic forces between two PM elements increase with decreasing distance between the two PM elements) between the stationary and moving elements are possible with the repulsive device (the attractive armatures will bend and contact that stationary PM parts when the air gap is not relatively large).

The combination of higher stiffness (resulting in the production of higher sound pressure levels in a speaker) and improved radial stability (enables simple, low cost and quiet armature supports) enables the repulsive MNS to have the favorable properties noted above.

Figure 14A:
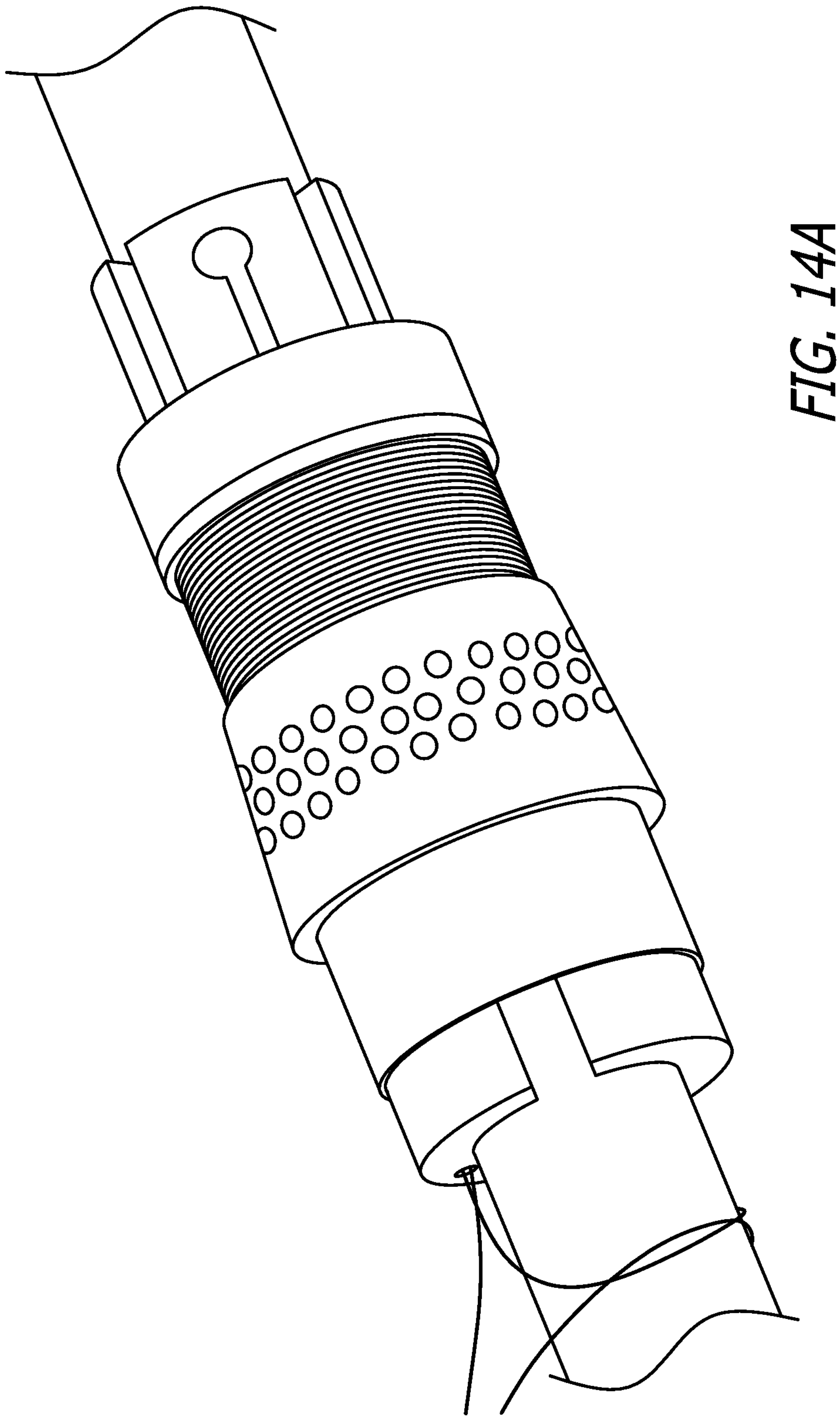
FIGS. 14A-14B are photographs of a repulsive MNS prototype.
Figure 14B:
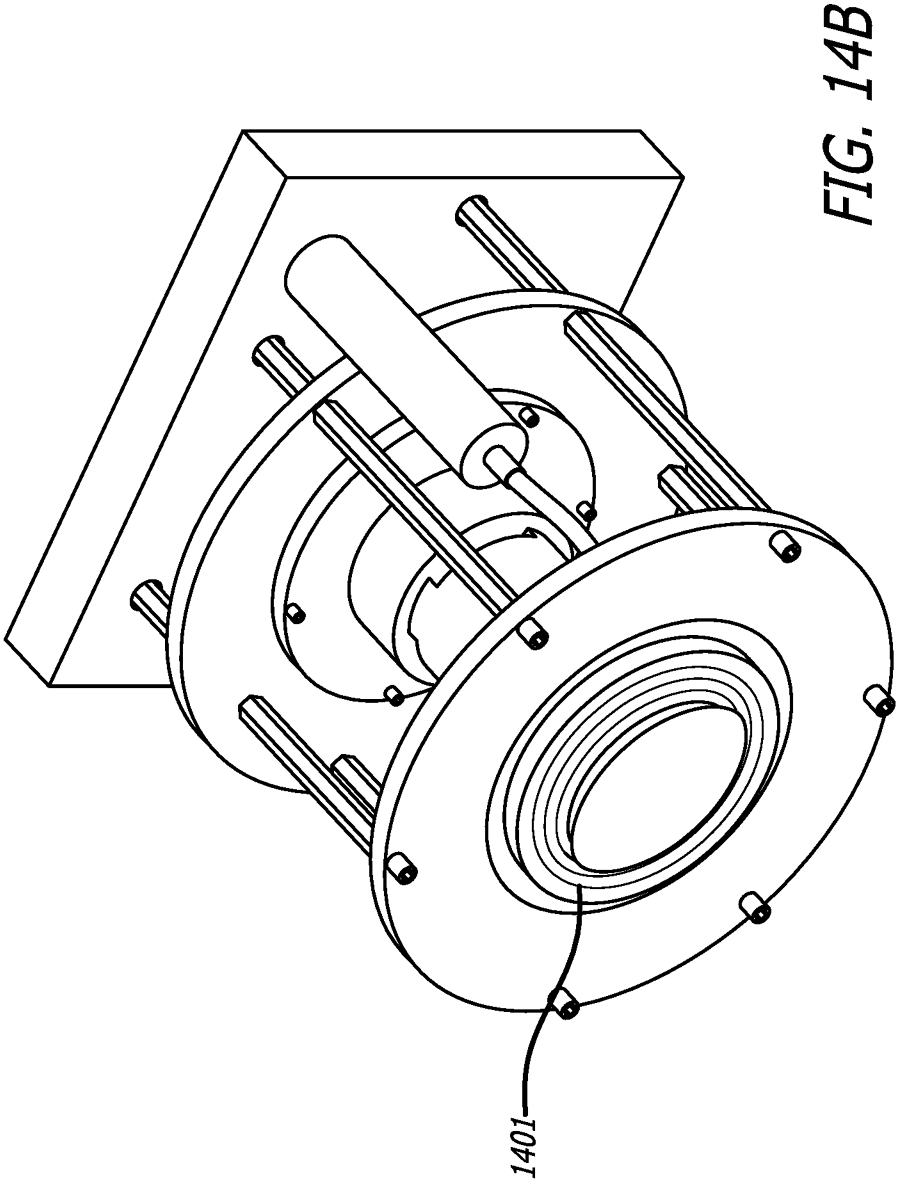

FIGS. 14A-14B show a further embodiment of a repulsive MNS that is capable of producing on the order of ten times as much sound pressure as compared to a conventional subwoofer of the same size used in prior art speakers, and does so while consuming less electrical power. By this design, linear bearings did not need to be used (avoiding high unwanted radial forces of the steel crowns) and operate with either one or two conventional "spider" supports 1401.

In the embodiment of FIGS. 14A-14B, dozens of off-the-shelf permanent magnet pucks in the rough shape of a crown were utilized and work well. Thus, there are some advantages (economical and otherwise) in using this type of standard magnet. Alternatively, custom permanent magnets can be made to realize even better performance.

Figure 15A:
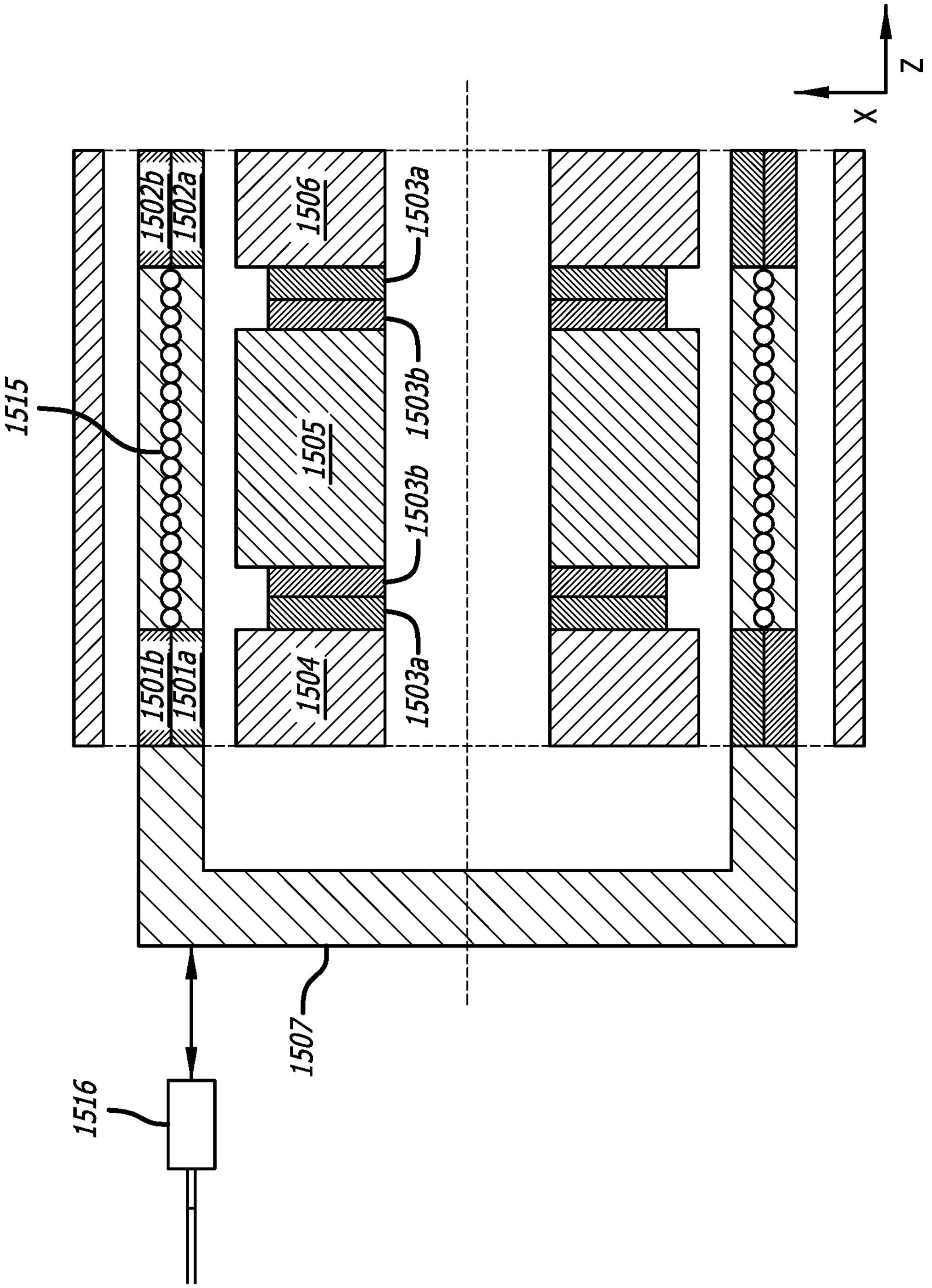
FIGS. 15A-15B are schematics of a cross-sectional view of embodiments of repulsive/attractive MNS with over-hung and under-hung voice coils, respectively.
Figure 15B:
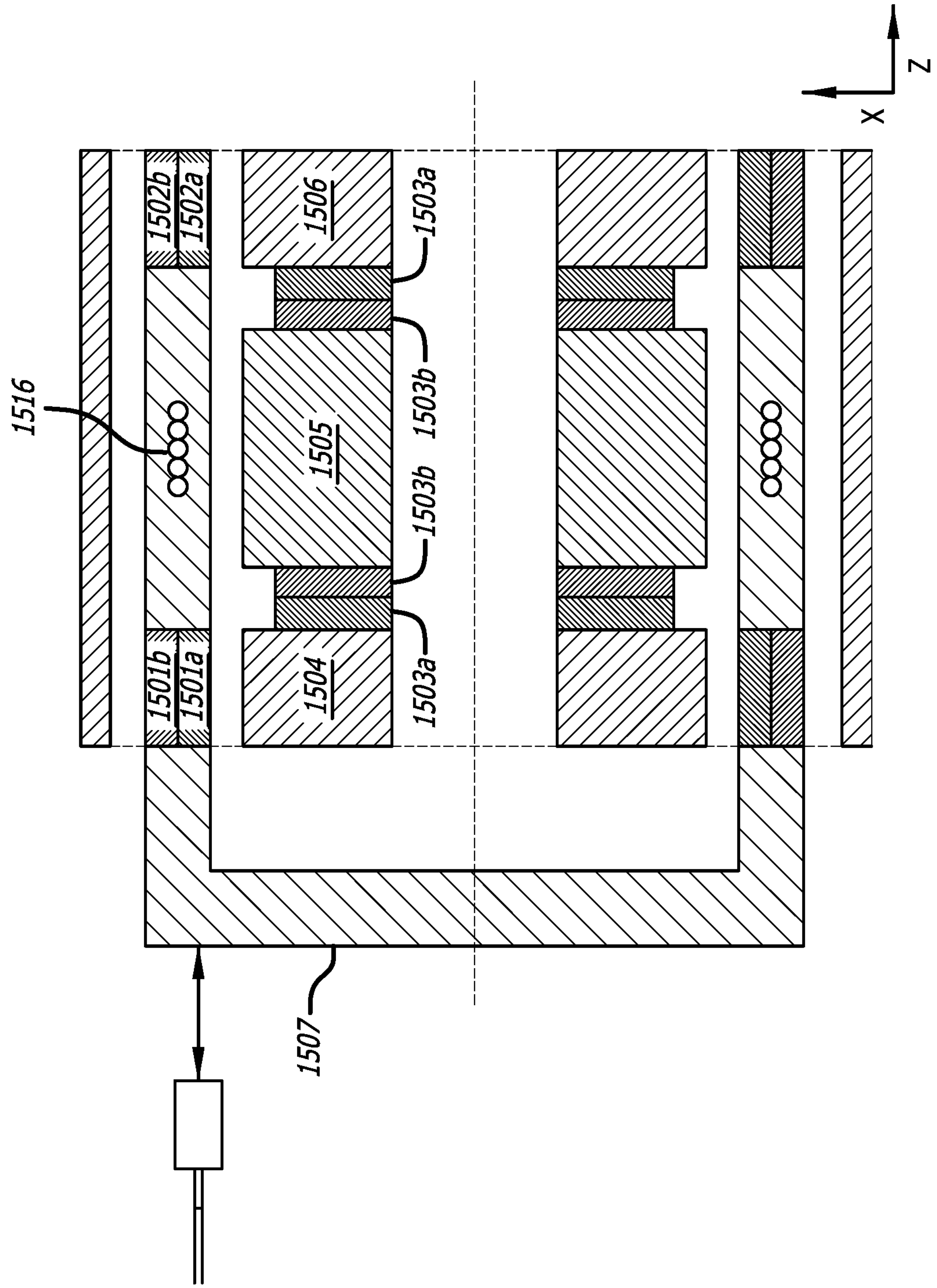

In still further embodiments, a combination of repulsive and attractive magnetic forces can be utilized in attractive/repulsive MNS devices, which are shown in FIGS. 15A-15B. Three stationary magnetic poles can be utilized along with two movable permanent magnet element arrays that are mounted to coil holder 1507 (with one movable permanent magnet array that has north pole 1501*a* and south pole 1501*b* and another moveable permanent magnet array that has north pole 1502*a* and south pole 1502*b*). The stationary poles include a permanent magnet having north pole 1503*a* and south pole 1503*b* with metal poles 1504-1506 (such as steel) disposed such that metal poles 1504 and 1506 are stationary north poles and metal pole 1505 is a stationary south pole. (In other embodiments, the north/south magnetic orientation can be reversed). Computer models and test results have shown that these three magnetic pole embodiments can produce high axial forces (and thus high sound pressure level) using a relatively small amount of permanent magnet material (which is one the highest cost line items in the loudspeaker device).

Embodiments can be have over-hung voice coils (such as voice coil 1515 shown in FIG. 15A) or under-hung voice coils (such as voice coil 1516 shown in FIG. 15B) and can include sensor 1516 (such as position and/or velocity sensor, that can be an optical or inductive sensor) used to provide position or velocity feedback to a control circuit.

For the orientation shown in FIGS. 15A-15B (with the permanent magnets have north poles 150*a*, 1502*a*, and 1503*a* and south poles 1501*b*, 1502*b*, and 1503*b* with metal poles 1504 and 1506 being north poles and metal pole 1505 being a south pole), the moveable PMC north/south poles are facing the stationary north/south poles and are thus in repulsive mode. The magnetic flux moves axially out of each stationary north pole 1503*a*, flows radially through each of the outer metal poles (metal poles 1504 and 1506), crosses the air gap through the PMCs, moves axially toward the center pole (metal pole 1505), flows radially inward across the voice coil (voice coils 1506 and 1516, respectively for FIGS. 15A-15B) and then moves axially toward the south poles 1503*b* to complete the magnetic circuit.

When the coil holder 1507 is centered all the axial magnet forces cancel. When the coil holder 1507 moves in the negative z-direction, both PM crowns will be repelled toward the negative z-direction by the metal poles and PMC pole 1502*a* will be attracted to metal pole 1505. When the coil holder 1507 moves in the positive z-direction, both PM crowns will be repelled toward the positive z-direction by the steel poles and PMC pole 1501*a* will be attracted to metal pole 1505. Otherwise, the repulsive/attractive MNS operates similar to as described above for MNS embodiments. Embodiments having the design shown in FIGS. 15A-15B exhibited the force profiles as described above, with a peak in excess of 200 N.

Figure 16:
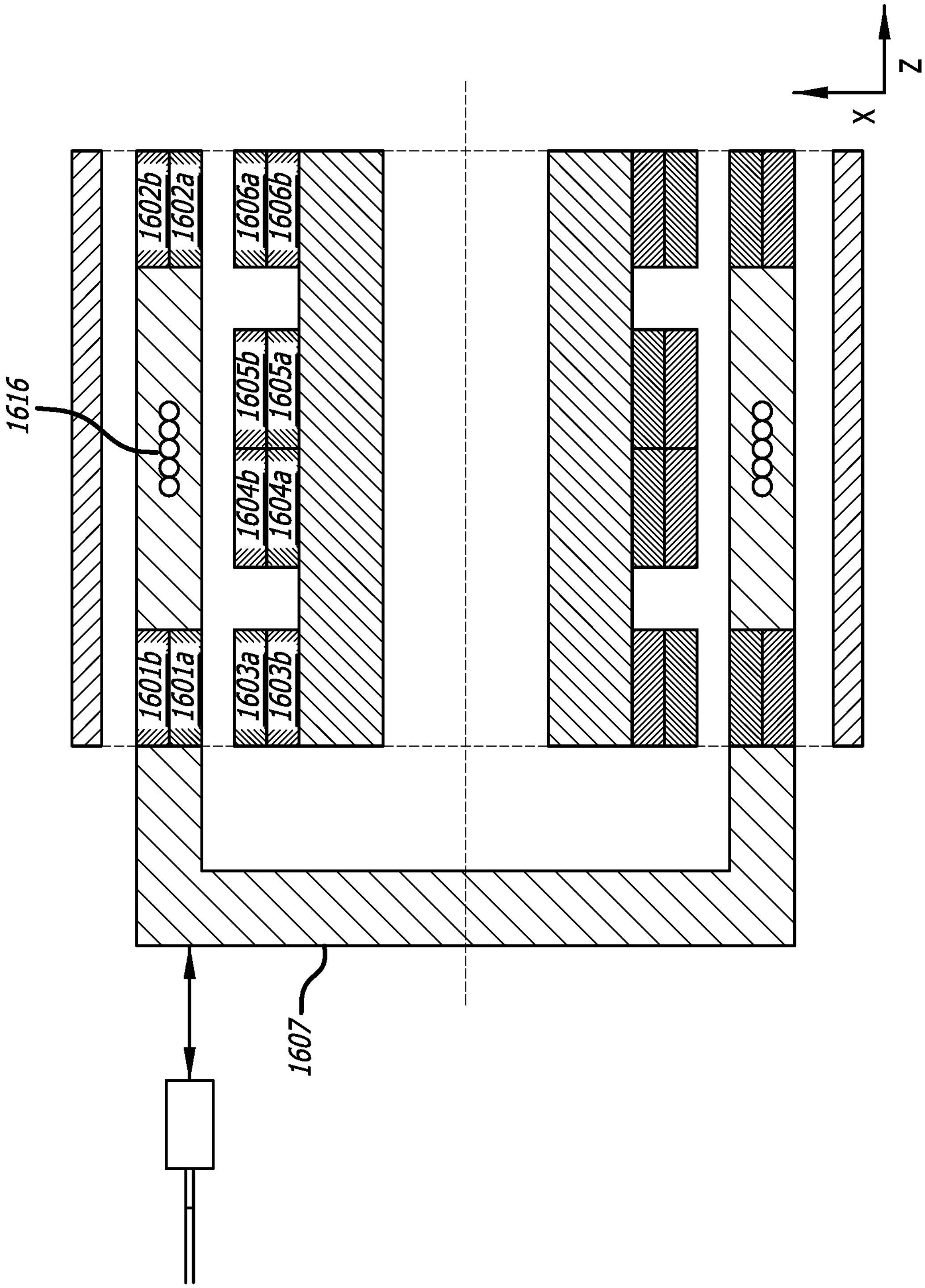
FIG. 16 is a schematic of a cross-sectional view of another embodiment of a repulsive/attractive MNS with under-hung voice coils.

FIG. 16 shows an embodiment of a repulsive/attractive MNS (which has an under-hung voice coil 1616). This embodiment has movable permanent magnets with north poles 1601*a* and 1602*a* and south poles 1601*b* and 1602*b* and has stationary permanent magnets with north poles 1603*a*, 1604*a*, 1605*a*, and 1606*a* and south poles 1603*b*, 1604*b*, 1605*b*, and 1606*b*. (Again, this polar orientation can be reversed). This arrangement of FIG. 16 exhibits a combination of permanent magnet repulsion and attraction (shown in FIG. 17) that significantly increases peak magnetic force and also the amplitude of armature motion (both of which contribute to an increase in sound pressure level).

Figure 17:
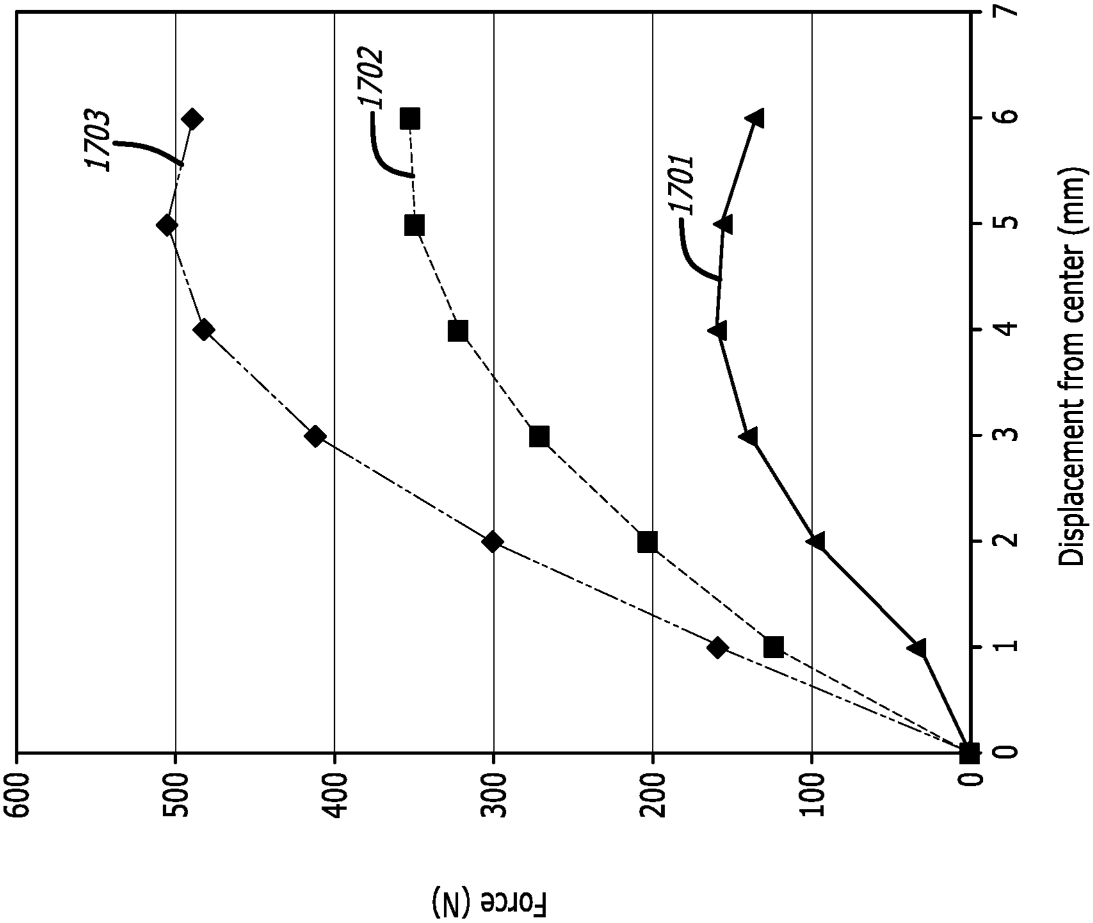
FIG. 17 is a graph showing the force versus displacement (for an armature movement in one direction) of the repulsive/attractive MNS embodiment shown in FIG. 16 (total and components due to each movable array of permanent magnets).

FIG. 17 shows the forces acting upon the repulsive/attractive MNS armature. When the armature moves in the negative z-direction, the north pole 1601*a* of the movable permanent magnet is repelled away from the north pole 1603*a* of the stationary permanent magnet just below it. This force is shown in plot 1701 in FIG. 17. Similarly, the north pole 1602*a* of the other movable permanent magnet is also repelled by the north pole 1606*a* of the stationary permanent magnet just below it, and is also attracted to the south pole 1605*b* of the central permanent magnet. Instead of just a pushing/repelling magnetic force this device also has a pulling/attractive magnetic force. This force is shown in plot 1702 in FIG. 17. The total force (repulsion and attraction) is shown in plot 1703 in FIG. 17. FIG. 17 reveals the significant contribution that the attractive forces have on the total magnetic force.

Stabilization/Centralizing

As discussed above, the MNS can exhibit radial instability. It has been discovered that the MNS can be radially unstable when steel iron poles (such as shown in FIG. 15B) are utilized because the moving permanent magnets (located on the coil holder 1507 that includes the moving voice coils 1516) can be attracted to that steel in a radial direction when the coil holder 1507 is not perfectly centered. It has further been discovered that, even when using permanent magnet poles (like 1603*a* in FIG. 16), radial instability can be created when the coil holder magnets move outside of the PM pole. This effect can be worse when, for example, poles 1601*a*/1601*b* move in the negative z-direction in FIG. 16 rather than to the positive z-direction due to some magnetic field cancellation between opposite poles 1603*a* and 1604*b*.

In some embodiments, the armature 1102 shown in FIG. 11 can exhibit instability that could be addressed by using stiffer materials for spiders 1108. Radially stability can be alternatively (or additionally) achieved even without the use of spiders 1108.

Figure 18A:
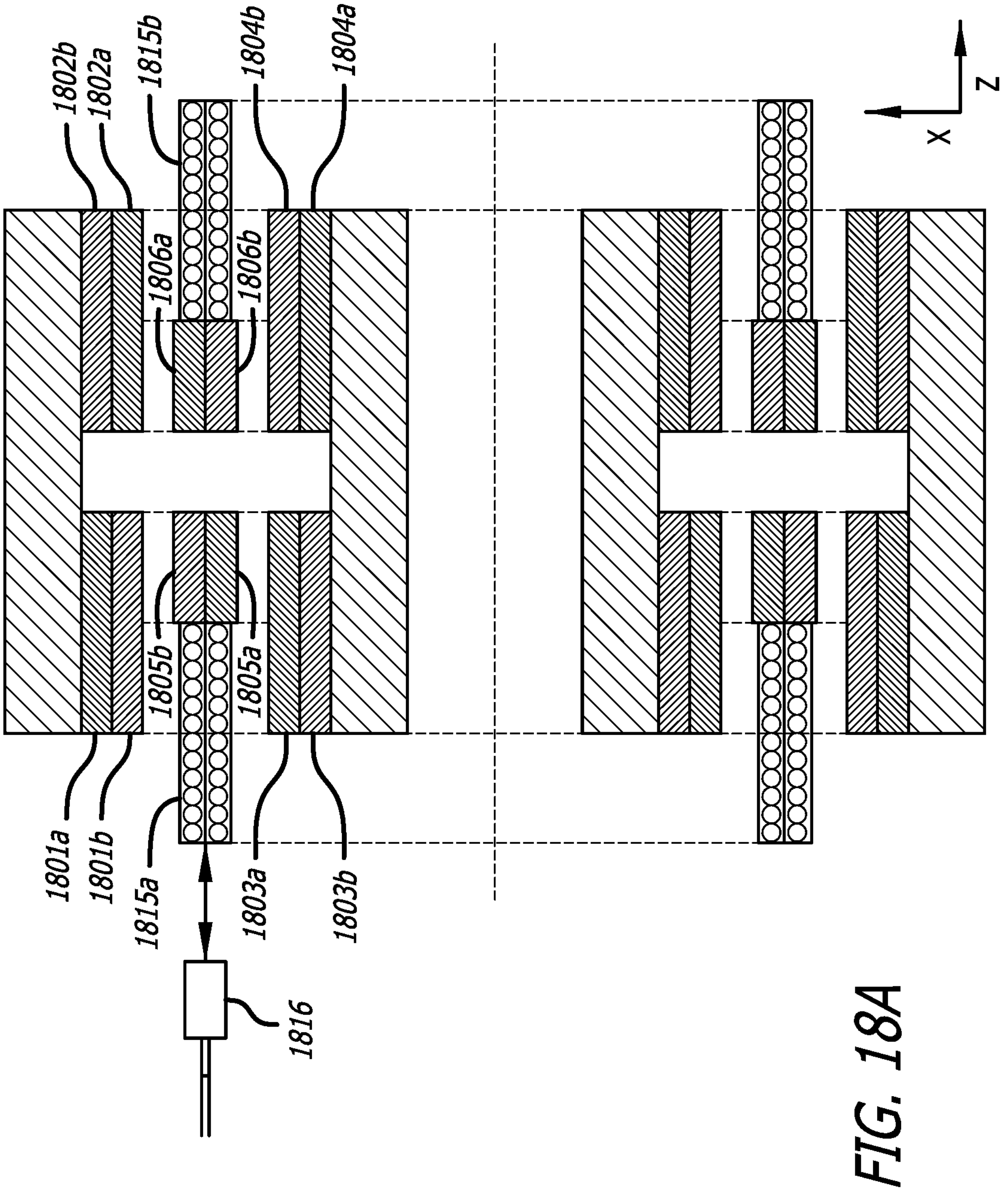
FIGS. 18A-18C are schematics of a cross-sectional view of another embodiment of a repulsive/attractive MNS with the voice coil armature in various positions (centered, partial negative z-direction, centered, and full negative z-direction, respectively).
Figure 18B:
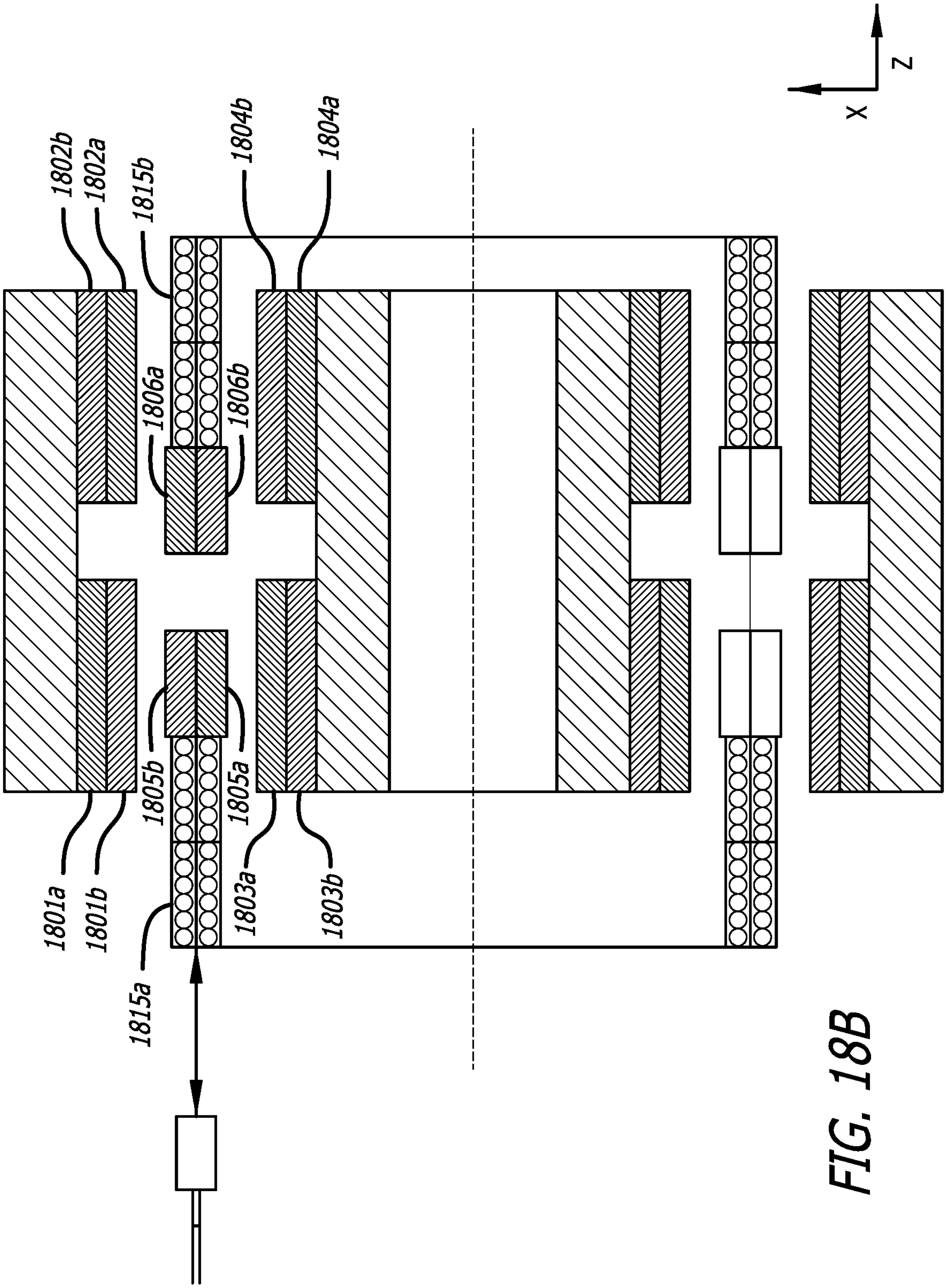
Figure 18C:
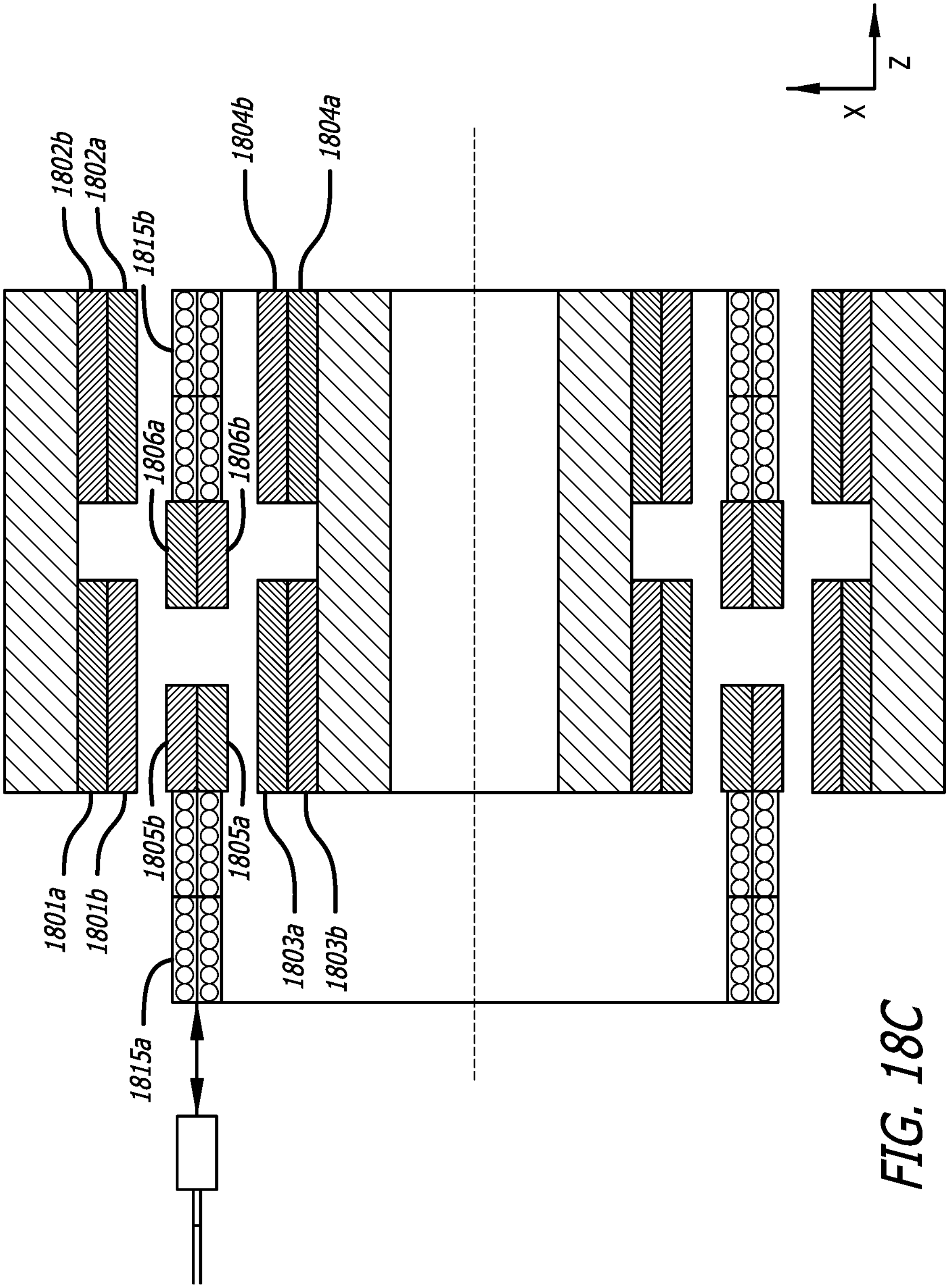
Figure 18D:
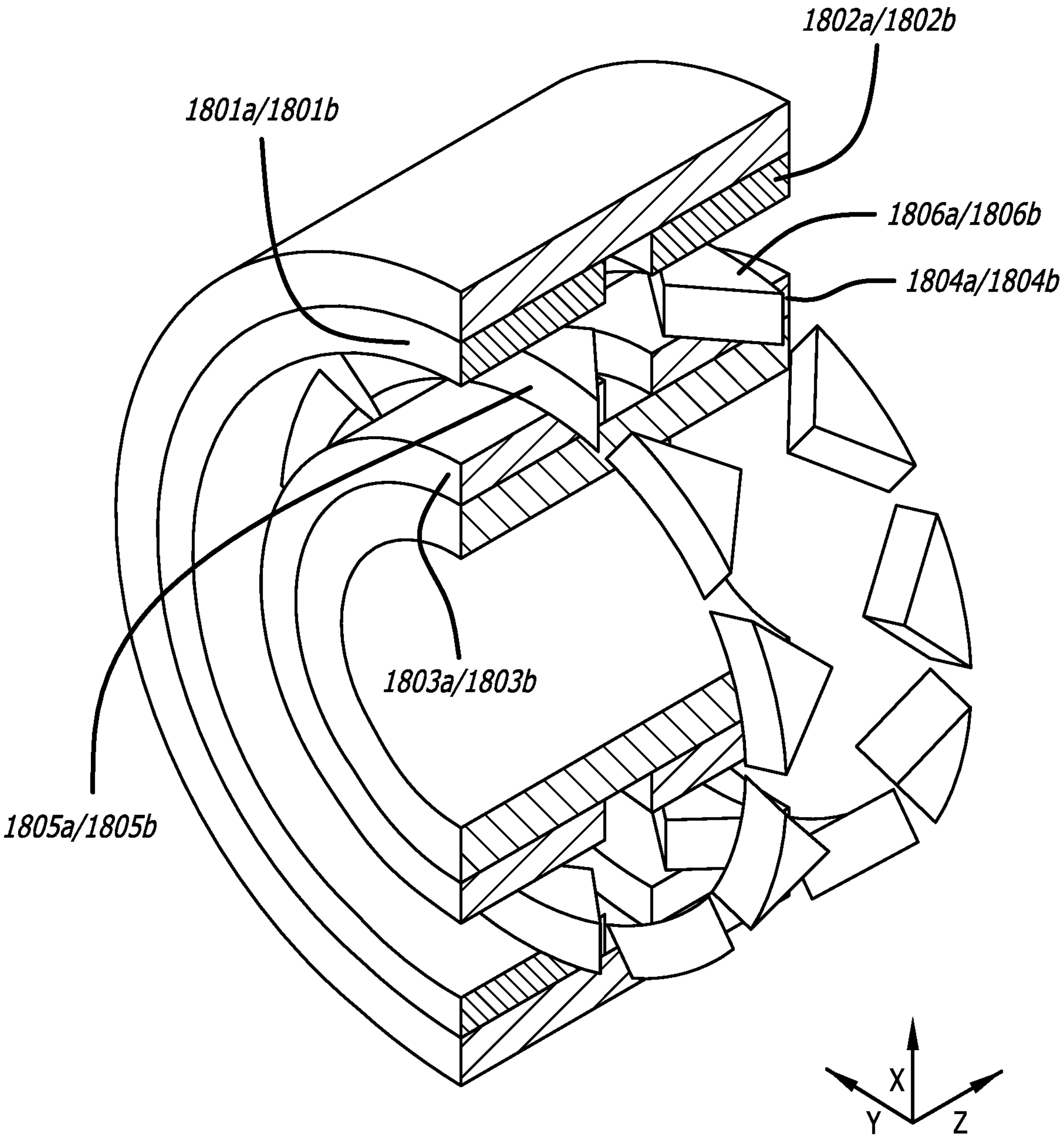
FIG. 18D is an illustration of a perspective view showing certain parts (mainly the permanent magnets) of the repulsive/attractive MNS shown in FIGS. 18A-18C.

FIGS. 18A-18C shows another embodiment of a repulsive/attractive MNS having voice coils 1815*a*-1815*b* and can include sensor 1816 (such as position and/or velocity sensor, that can be an optical or inductive sensor) used to provide position or velocity feedback to a control circuit. This embodiment has stationary magnetic poles (such as stationary magnetic north poles 1801*a*-1804*a* and stationary magnetic south poles 1801*b*-1804*b*), which are made with permanent magnets (in place of steel) and so the oppositely polarized moving magnets (such as moving magnetic north poles 1805*a*-1806*a* and moving magnetic south poles 1805*b*-1806*b*) on the armature are radially repelled by the stationary magnet poles (which provides radial stability). As shown in FIGS. 18A-18C, the stationary magnetic poles are permanent magnet rings (PMRs) and the moving magnetic poles are permanent magnetic triangles (PMTs). (The PMR could be an assemblage of arc segments that, when combined, create a ring magnet structure). FIG. 18D is a perspective view showing the arrangement of PMRs and PMTs of this embodiment.

Another advantageous feature of the MNS shown in FIGS. 18A-18C is that the moving permanent magnet elements (such as moving magnetic north poles 1805*a*-1806*a* and moving magnetic south poles 1805*b*-1806*b*) on the armature do not leave the "open" permanent magnet pole edges and so there is always a repulsive force between the permanent magnet pole and armature permanent magnets that makes the armature radially stable (which can be viewed as a permanent magnet-based radial passive magnetic bearing).

As shown in FIGS. 18A-18C (which show movement from the central position to the full negative z-direction), there is always one pole width of voice coil immersed in the magnetic field (which makes the force per unit current input constant at all armature positions). Regardless of the positioning of the armature when in the negative z-direction (such as shown in FIGS. 18A-18C), the negative z-direction array of armature permanent magnets (i.e., moving magnetic north pole 1805*a* and moving magnetic south pole 1805*b*) are always immersed in the oppositely directed (repulsive) magnetic field of the negative z-direction stationary permanent magnets (stationary magnetic north poles 1801*a* and 1803*a* and stationary magnetic south poles 1801*b* and 1803*b*). This provides a radial stabilizing force that helps to keep the armature centered within the air gap between the inner and outer permanent magnet rings.

When the armature is in the position shown in FIG. 18A (the centered position), the positive z-direction array of PMT (moving magnetic north pole 1806*a* and moving magnetic south pole 1806*b*) is immersed in the oppositely directed magnetic field of the positive z-direction PMR (stationary magnetic north poles 1802*a* and 1804*a* and stationary magnetic south poles 1802*b* and 1804*b*) and thus is radially stable.

When the armature is in the position shown in FIG. 18B (the partial negative z-direction), this position the positive z-direction array of PMT (moving magnetic north pole 1806*a* and moving magnetic south pole 1806*b*) is partially immersed in the oppositely directed magnetic field of the positive z-direction PMR (stationary magnetic north poles 1802*a* and 1804*a* and stationary magnetic south poles 1802*b* and 1804*b*) and still radially stable. The axial/desired force in this position is high because the positive z-direction array of PMT (moving magnetic north pole 1806*a* and moving magnetic south pole 1806*b*) is being repelled by the positive z-direction PMR (stationary magnetic north poles 1802*a* and 1804*a* and stationary magnetic south poles 1802*b* and 1804*b*) and attracted by the magnetic fringing fields of negative z-direction PMR (stationary magnetic north poles 1801*a* and 1803*a* and stationary magnetic south poles 1801*b* and 1803*b*).

When the armature is in the position shown in FIG. 18C (the full negative z-direction), the positive z-direction array of PMT (moving magnetic north pole 1806*a* and moving magnetic south pole 1806*b*) is not immersed in the oppositely directed magnetic field of the positive z-direction PMR (stationary magnetic north poles 1802*a* and 1804*a* and stationary magnetic south poles 1802*b* and 180*b*), but is partially immersed in the magnetic fringing field of the negative z-direction PMR (stationary magnetic north poles 1801*a* and 1803*a* and stationary magnetic south poles 1801*b* and 1803*b*) and this position still provides some radially stability. The axial/desired force in the position shown in FIG. 18C is also high because the positive z-direction array of PMTs is being repelled by the positive z-direction PMR magnetic fringing field and attracted by the negative z-direction PMR.

By symmetry, this same stability will be provided when the armature moves from the position shown in FIG. 18A in the positive z-direction.

The armature PMTs only take up about half the PMR pole axial width, which provides enough room for the two overhung voice coils, as shown in FIGS. 18A-18C. Moreover, maintaining net magnetic stability in the radial direction at all armature positions is an advantageous feature of this MNS embodiment shown in FIGS. 18A-18C because it allows it to use conventional (low cost, proven, etc.) rubber surrounds and "spider" supports.

Figure 19A:
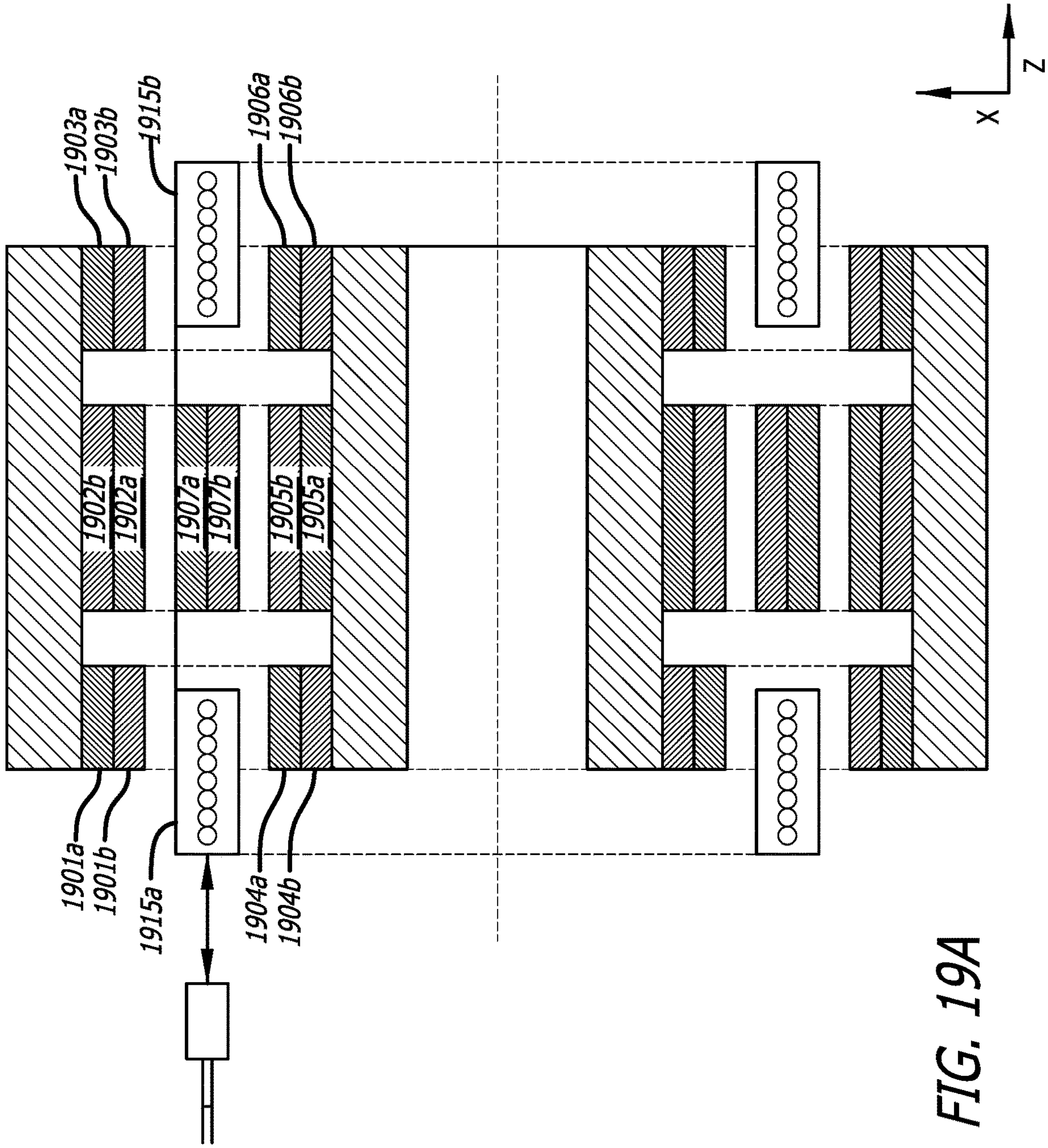
FIG. 19A is a schematic of a cross-sectional view of another embodiment of a repulsive/attractive MNS with the voice coil armature in the centered position.
Figure 19B:
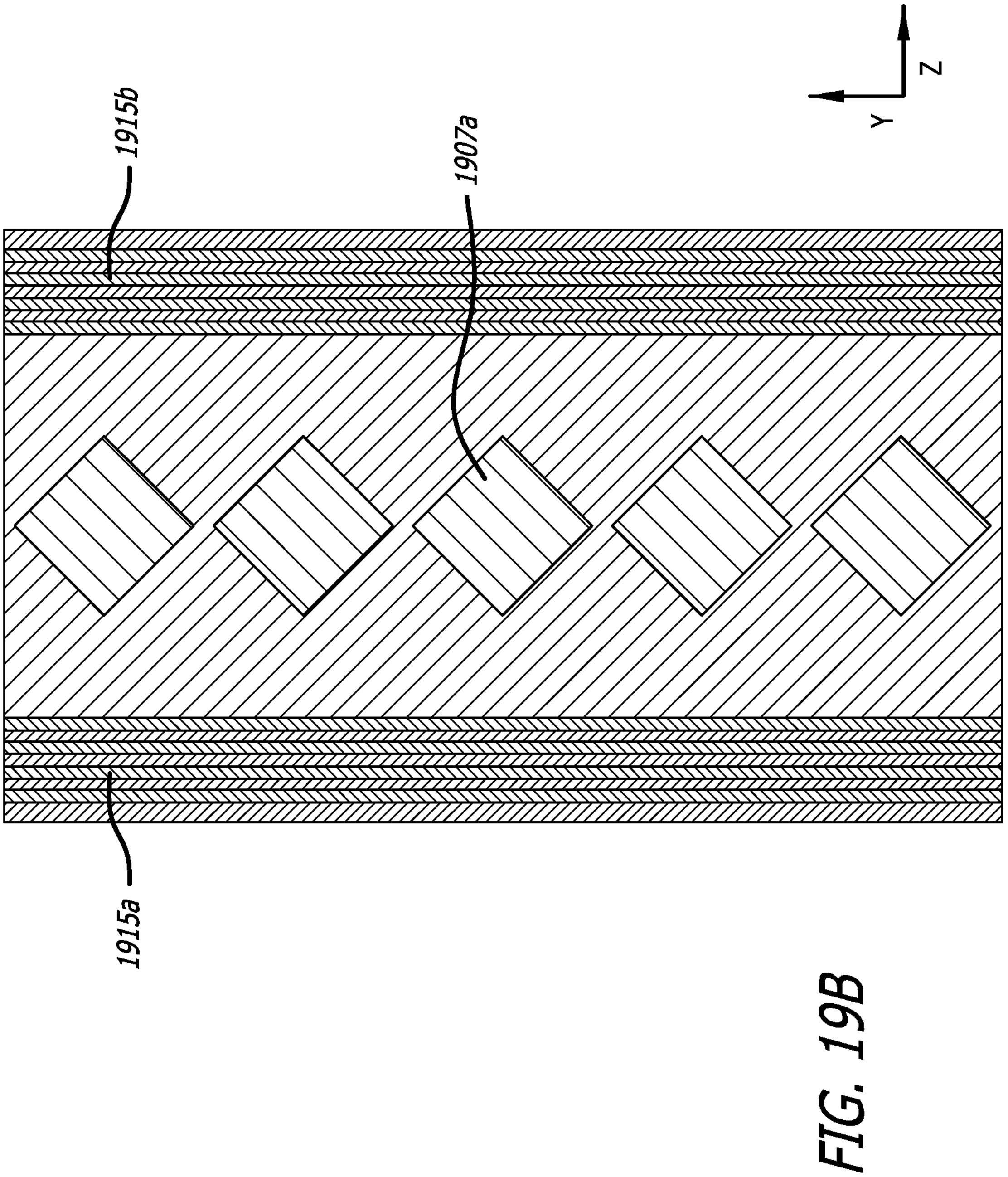
FIG. 19B is a top view of the coil holder in FIG. 19A.

FIGS. 19A-19B show another MNS embodiment that shares many of the attributes of the MNS embodiment of FIGS. 18A-18C (i.e., radially stability, high axial force, etc.). In the embodiment of FIGS. 19A-19B, there are now three stationary outer PMRs (with stationary magnetic north poles 1901*a*-1903*a* and stationary magnetic south poles 1901*b*-1903*b*) and three inner PMRs (with stationary magnetic north poles 1904*a*-1906*a* and stationary magnetic south poles 1904*b*-1906*b*). And instead of two arrays of PMTs the armature (with voice coils 1915*a*-1915*b*) has just one array of moving permanent magnets (moving magnetic north pole 1907*a* and moving magnetic south pole 1907*b*), which are diamond shaped.

Utilization in a Loudspeaker

Figure 20:
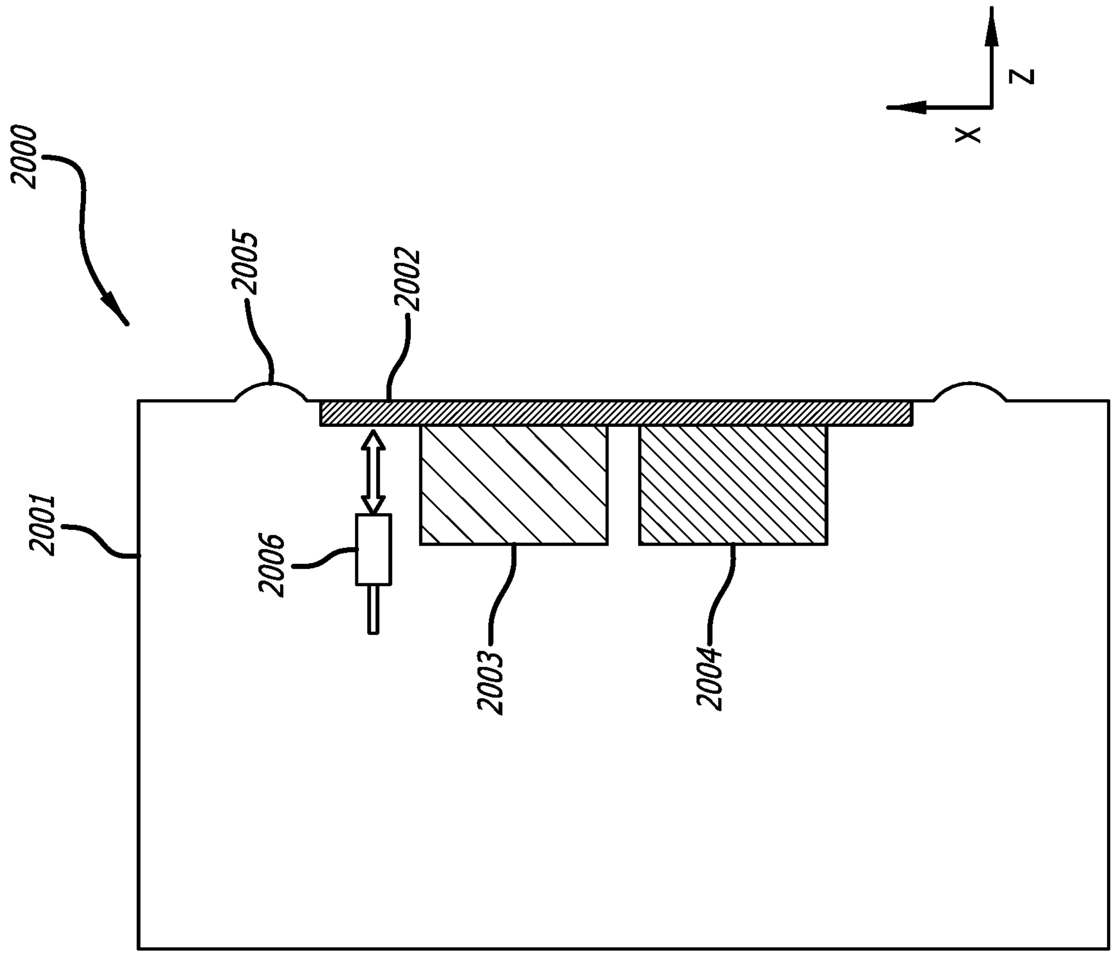
FIG. 20 is a schematic of a sealed cabinet that shows a loudspeaker in which the MNS embodiments of the present invention can be utilized.

The repulsive/attractive MNS as described above can be used in a loudspeaker, such as the schematic of the loudspeaker 2000 shown in FIG. 20. Loudspeaker 2000 has a sealed chamber 2001, a movable panel 2002 (which is connected to a flexible "surround" element 2005, such as made from rubber to allow movable panel 2002 to move in the positive and negative z-direction). Loudspeaker 2000 further includes MNS 2003, and voice coil 2004, which are positioned for moving movable panel 2002 in the positive and negative z-direction. Loudspeaker 2000 further includes sensor 2006 (such as position and/or velocity sensor, that can be an optical or inductive sensor) used to provide position or velocity feedback to a control circuit).

Figure 21:
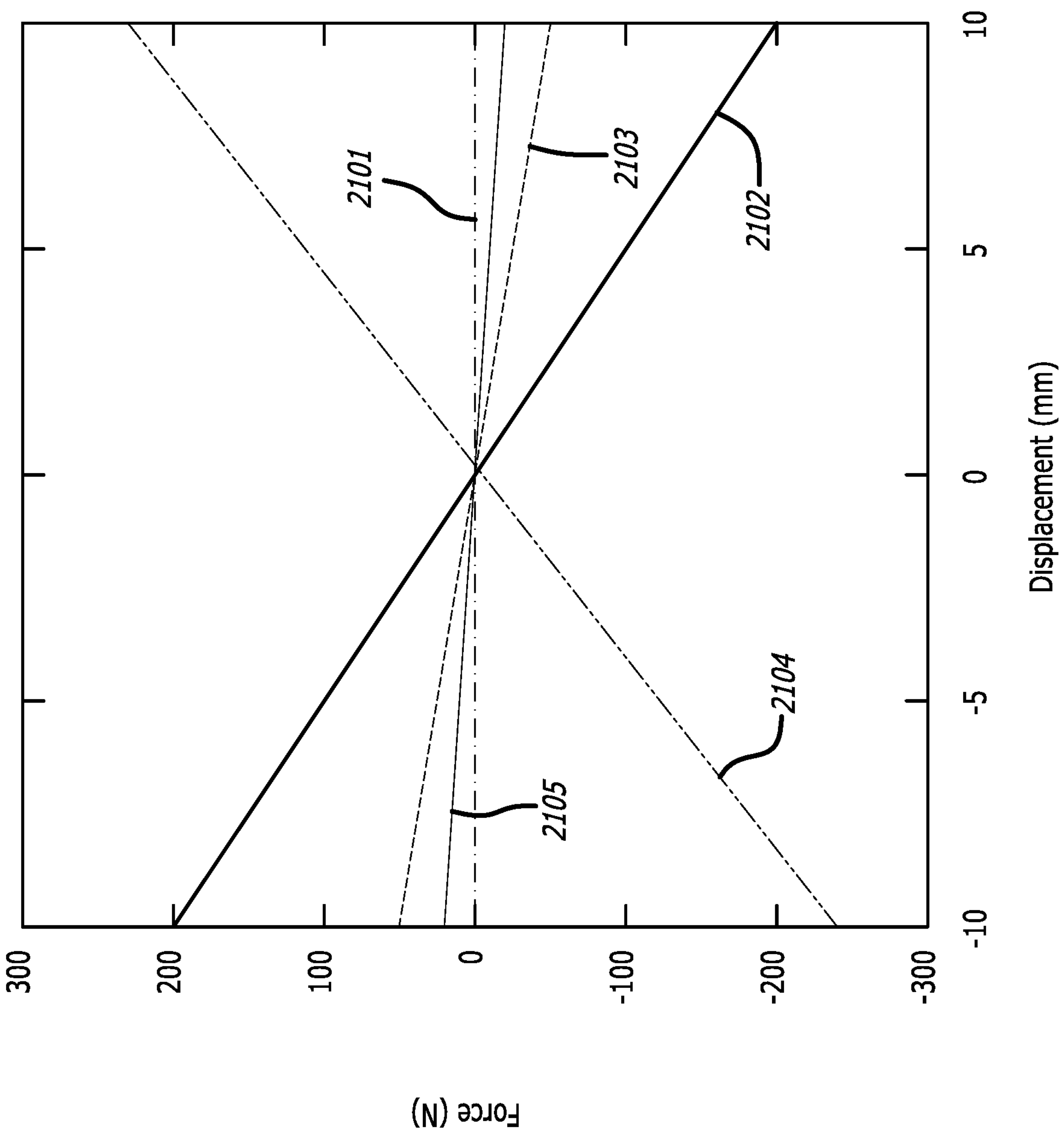
FIG. 21 is a graph showing the force versus displacement reflecting how the MNS of FIGS. 18A-18C and 19A-19B can be used to nearly cancel the force on the sound panel.

FIG. 21 is a graph showing the force versus displacement reflecting how the MNS of FIG. 20 can be used to nearly cancel the force on the sound panel. Line 2101 is the zero line. The main force on sound panel 2002 is the air pressure force when the sound panel moves in the z-direction and is shown by line 2102. (Since the chamber is a sealed chamber 2001, when the movable panel 2002 moves outward in the positive z direction, a force due to a vacuum/negative pressure is produced). Flexible support 2005 also creates a force in the same negative z-direction as the sealed chamber pressure and is shown by line 2103. However, the MNS force is always in the opposite direction of pressure force and flexible support force and is shown by line 2104. The total force (otherwise referred to as the net force) is the sum of the pressure force 2102, MNS force 2104 and flexible support force 2103 and is shown by line 2105. As shown by line 2105, the net force is relatively close to zero line 2101 regardless of the direction of displacement of the movable panel (which is because the MNS provides forces in the opposite direction to the forces produced by the sealed chamber air pressure and the flexible support). For this reason, loudspeaker 2000 need only produce a maximum of approximately 20 N of force, as compared to a maximum of 200 N-250 N, for complete motion of the movable panel. Hence, the MNS renders the loudspeaker significantly more efficient.

Figure 22:
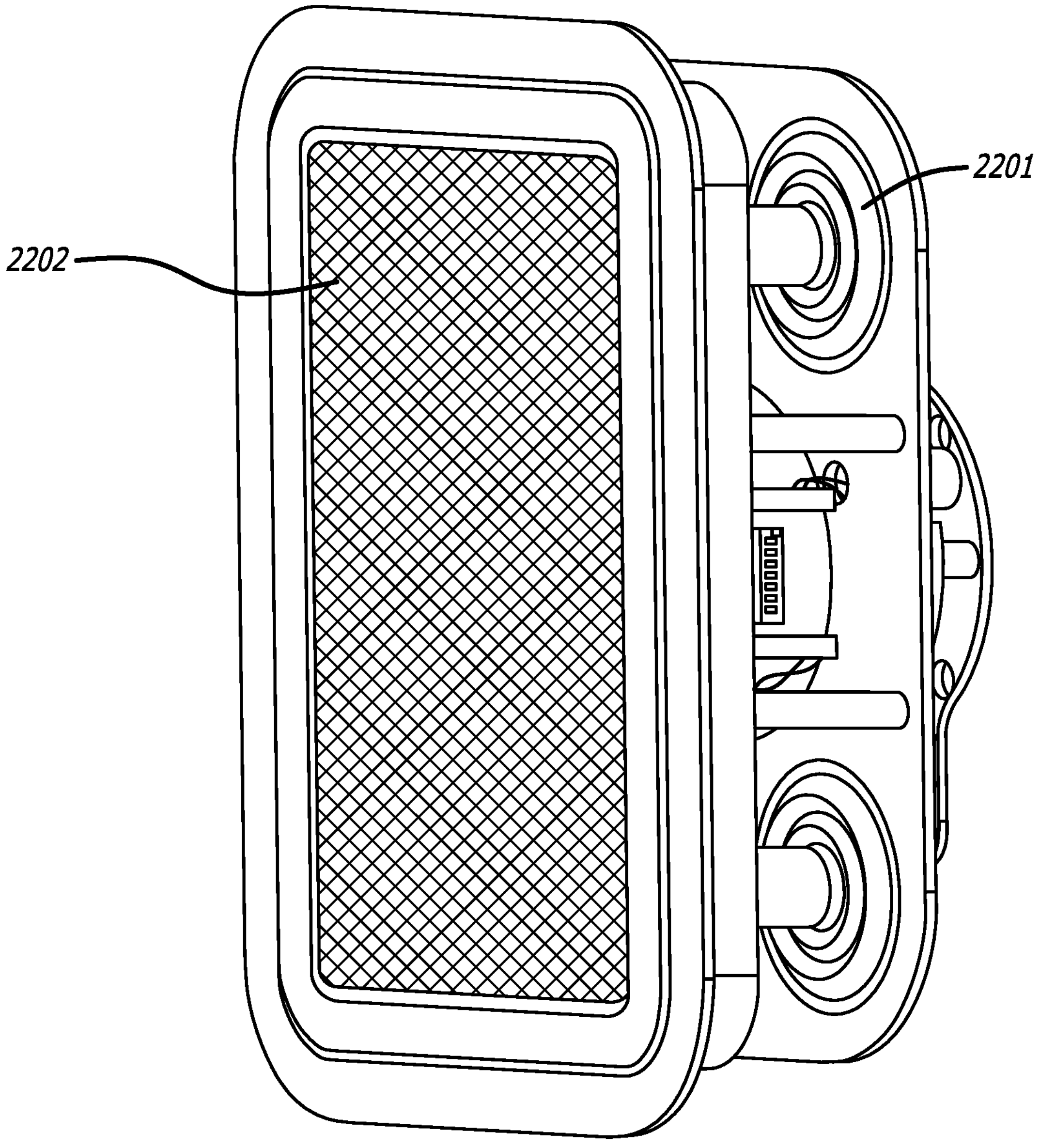
FIGS. 22-23 are illustrations of MNS drivers of the present invention.
Figure 23:
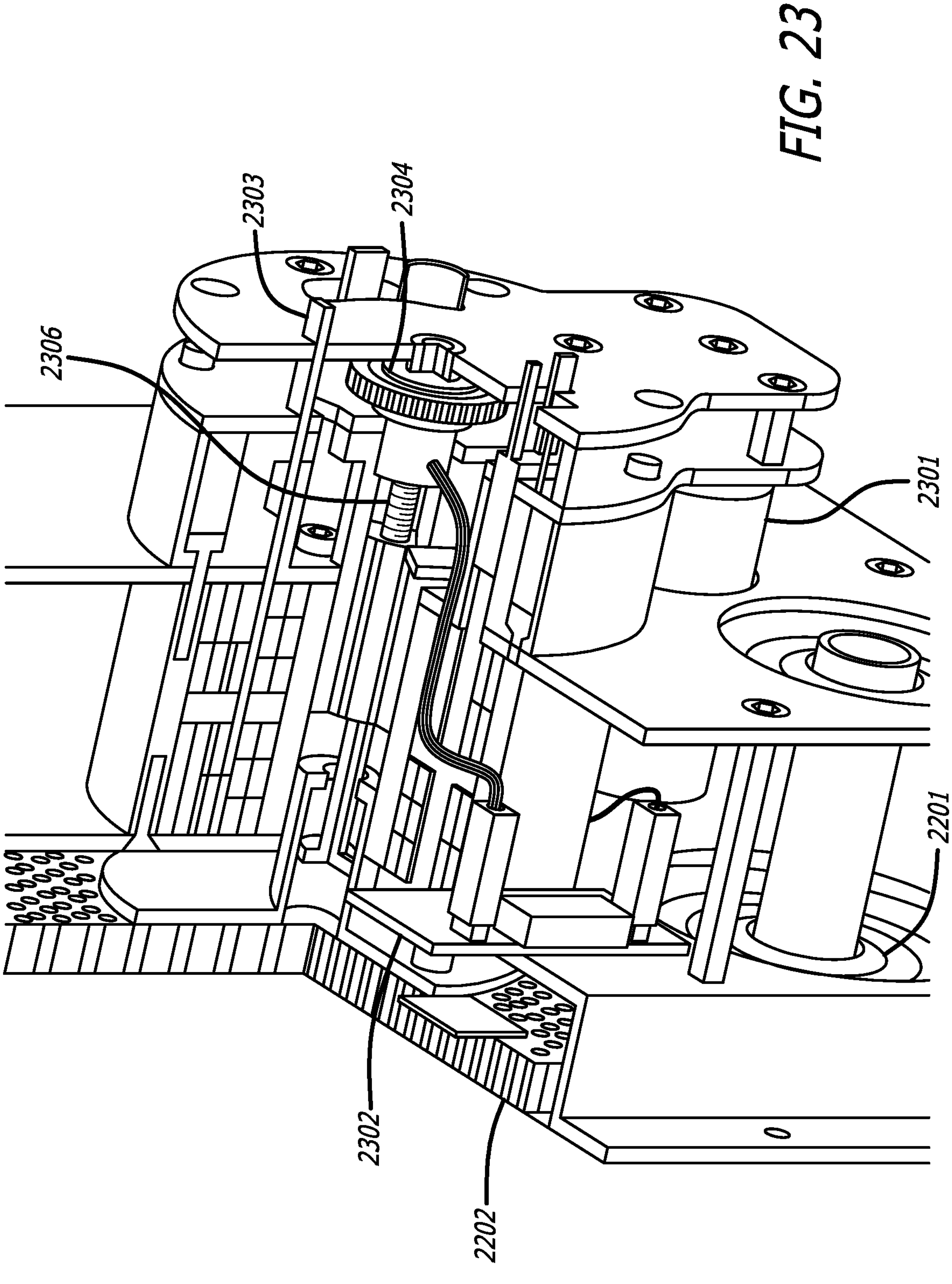

FIGS. 22-23 provide further details of MNS drivers as discussed above. As shown in FIG. 22, the driver is more axially compact than previous MNS drivers because the spiders 2201 are no longer mounted on the same axis as the armature. The device shown can have an axial length of approximately 8 cm and yet has an active sound panel area of approximately 150 $cm^2$. A flat honeycomb panel 2202 can be used in place of a traditional cone and this also makes the device axially compact.

As shown in FIG. 23, this device also uses a gear motor 2301 (for the centering mechanism described previously) that is not aligned on the same axis as the armature and this also saves axial space. Since embodiments of the loudspeaker can use two oppositely directed MNS drivers (to cancel the large vibrations due to the moving armatures), it is much easier to fit two drivers into a speaker case when they are each axially compact. The position sensor can be an infrared sensor 2302 and it senses the position of a reflective element mounted to the honeycomb panel 2202. The device further has gear train 2304 to transmit torque from gear motor 2301 to threaded element 2306. Temporary spacers 2303 are used during assembly to make sure the armature is centered in the magnetic air gap while the spiders 2201 and sound panel 2202 are adhered to their respective mounts.

The loudspeaker can further include a control function in the armature position controller that is constantly adjusting the average armature axial position to minimize voice coil current (and thus minimize voice coil electrical power). As previously described, the MNS creates a very powerful unstable equilibrium; accordingly, if the armature moves (in an axial direction) slightly off the zero MNS force point, it can accelerate in the direction that it is being displaced. The control function of the controller keeps the armature at this zero force point even when this point does not correspond to the exact mechanical center point. Thus, if the loudspeaker is tilted 90 degrees, there would be a new force due to gravity and the controller having the control function will automatically adjust the armature position so the MNS force is used to offset the forces due to gravity (so that electrical power need not be wasted resisting forces due to gravity). The controller can also compensate for any temperature drift in the position sensor and for any manufacturing imperfections.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so firth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A loudspeaker comprising:

(a) an enclosure;

(b) a sound panel mechanically connected to the enclosure;

(c) a moveable armature mechanically connected to the sound panel comprising an actuator operable to convert electrical energy into mechanical energy, wherein the moveable armature is operable for moving the sound panel toward the enclosure to create a first air pressure force and away from the enclosure to create a second air pressure force;

(d) a magnetic negative spring (MNS) that has a first magnetic negative spring portion that is mechanically connected to the moveable armature and a second magnetic negative spring portion that is stationary relative to the enclosure, wherein (i) the MNS is operable to provide a first magnetic negative spring force when the sound panel is moving toward the enclosure and a second magnetic negative spring force when the sound panel is moving away from the enclosure, (ii) the first magnetic negative spring force is oppositely directed to the first air pressure force, (iii) the second magnetic negative spring force is oppositely directed to the second air pressure force, (iv) the first magnetic negative spring portion is a radially polarized armature magnet, (v) the second magnetic negative spring portion comprises a first radially polarized ring magnet having a first polarity and a second radially polarized ring magnet having a second polarity, wherein the first radially polarized ring magnet and the second radially polarized ring magnet are oppositely polarized, and (vi) the armature magnet is repelled by the first ring magnet and attracted to the second ring magnet.

2. The loudspeaker of claim 1, wherein the actuator is a voice coil.

3. The loudspeaker of claim 2, wherein the voice coil and the MNS share a same magnetic circuit.

4. The loudspeaker of claim 1, wherein the actuator is an electromagnet.

5. The loudspeaker of claim 1 further comprising a position sensor that senses the position of the sound panel.

6. The loudspeaker of claim 5, wherein the position sensor is an infrared position sensor.

7. The loudspeaker of claim 1 further comprising an armature centering mechanism.

8. The loudspeaker of claim 7, wherein the armature centering mechanism comprises a motor.

9. The loudspeaker of claim 7, wherein the armature centering mechanism comprises a gear motor.

10. The loudspeaker of claim 7, wherein the armature centering mechanism comprises an air pump.

11. The loudspeaker of claim 1 further comprising a flexible mechanical armature support.

12. The loudspeaker of claim 7, wherein the armature centering mechanism comprises a gear motor and an air pump.

13. The loudspeaker of claim 1, wherein the first radially polarized ring magnet comprises an inner first radially polarized ring magnet and an outer first radially polarized ring magnet, wherein the inner first radially polarized ring magnet has a smaller radius than the outer first radially polarized ring magnet.

14. The loudspeaker of claim 1, wherein the second radially polarized ring magnet comprises an inner second radially polarized ring magnet and an outer second radially polarized ring magnet, wherein the inner second radially polarized ring magnet has a smaller radius than the outer second radially polarized ring magnet.

15. The loudspeaker of claim 1, wherein the armature permanent magnet comprises an array of arc-shaped elements.

16. The loudspeaker of claim 1, wherein the armature permanent magnet comprises a first armature permanent magnet and a second armature permanent magnet wherein the first armature permanent magnet and the second armature permanent magnet are oppositely polarized.

17. The loudspeaker of claim 16, wherein (a) the first armature permanent magnet is repelled by the first radially polarized ring magnet and attracted to the second radially polarized ring magnet, and (b) the second armature permanent magnet is attracted to the first radially polarized ring magnet and repelled by the second radially polarized ring magnet.

18. The loudspeaker of claim 1 wherein the magnetic negative spring produces a peak force of over 50 Newtons.

19. The loudspeaker of claim 1 wherein the magnetic negative spring produces a peak force of over 100 Newtons.

20. The loudspeaker of claim 1 wherein the magnetic negative spring produces a peak force of over 200 Newtons.

* * * * *